(12) United States Patent
Shigeoka

(10) Patent No.: US 6,860,634 B2
(45) Date of Patent: Mar. 1, 2005

(54) TEMPERATURE MEASURING METHOD, HEAT TREATING DEVICE AND METHOD, COMPUTER PROGRAM, AND RADIATION THERMOMETER

(75) Inventor: Takashi Shigeoka, Nirasaki (JP)

(73) Assignee: Tokyo Electron Limited, Tokyo (JP)

( * ) Notice: Subject to any disclaimer, the term of this patent is extended or adjusted under 35 U.S.C. 154(b) by 0 days.

(21) Appl. No.: 10/399,758

(22) PCT Filed: Oct. 23, 2001

(86) PCT No.: PCT/JP01/09302

§ 371 (c)(1),
(2), (4) Date: Apr. 22, 2003

(87) PCT Pub. No.: WO02/35195

PCT Pub. Date: May 2, 2002

(65) Prior Publication Data

US 2004/0004989 A1 Jan. 8, 2004

(30) Foreign Application Priority Data

| Oct. 24, 2000 | (JP) | ................................... 2000-324605 |
| Oct. 25, 2000 | (JP) | ................................... 2000-326163 |
| Apr. 5, 2001 | (JP) | ................................... 2001-106697 |

(51) Int. Cl.$^7$ .............................. G01J 5/00; G01K 11/00
(52) U.S. Cl. ...................... 374/131; 374/121; 374/161
(58) Field of Search .......................... 374/121, 131, 374/126, 161

(56) References Cited

U.S. PATENT DOCUMENTS

| 5,488,407 A | * | 1/1996 | Tachibana ................... 347/264 |
| 5,624,590 A |  | 4/1997 | Hamano et al. |
| 5,660,472 A | * | 8/1997 | Peuse et al. ................. 374/128 |
| 6,027,244 A | * | 2/2000 | Champetier et al. ........ 374/130 |
| 6,479,801 B1 | * | 11/2002 | Shigeoka et al. ........... 219/502 |

FOREIGN PATENT DOCUMENTS

| EP | 718610 | 6/1996 |
| JP | 2000-266603 | 9/2000 |
| JP | 2001-208610 | 8/2001 |
| WO | 00/08429 | 2/2000 |

* cited by examiner

Primary Examiner—Christopher W. Fulton
Assistant Examiner—Mirellys Jagan
(74) Attorney, Agent, or Firm—Crowell & Moring LLP

(57) ABSTRACT

A method of temperature measurement for measuring a temperature of an object to be measured that is heated by a heating source in a multiplex-reflection environment by using two radiation thermometers provided at a measurement part separated from the object to be measured is provided. In the method, two of the radiation thermometers have a rod that is embedded in the measurement part and can receive radiation light from the object to be measured, and an optical fiber connected to the rod; numerical apertures of the radiation thermometers are different; the multiplex-reflection environment is formed between a surface of the measurement part facing the object to be measured and the measurement part; a radiation rate $\epsilon$ of the object to be measured based on a result of a measurement of two of the thermometers and the temperature of the object to be measured is calculated by the following equations $$\alpha = 1 - (1 - NA \cdot N1)^{N2/(D1/D2)}$$

$$\epsilon_{eff} = (1-\alpha) \cdot \epsilon + \alpha \cdot \epsilon / \{1 - F \cdot r \cdot (1-\epsilon)\}$$

wherein D1 represents a diameter of the rod of the radiation thermometers, NA represents the numerical aperture, D2 represents a distance between the object to be measured and the surface of the measurement part, r represents a reflectivity of the surface of the measurement part, F represents a view factor, $\alpha$ represents a multiplex reflection coefficient, $\epsilon_{eff}$ represents an effective radiation rate of the object to be measured, and N1 and N2 are parameters.

9 Claims, 44 Drawing Sheets

TEMPERATURE MEASURING METHOD, HEAT TREATING DEVICE AND METHOD, COMPUTER PROGRAM, AND RADIATION THERMOMETER

TECHNICAL FIELD

The present invention generally relates to heat treatment apparatuses and methods for applying a heating process to an object to be processed such as a single crystal substrate or a glass substrate, methods of temperature measurement of the object to be processed, temperature measurement programs, and radiation thermometers.

The present invention is suitable for rapid thermal processing (RTP: Rapid Thermal Processing) used for manufacturing semiconductor devices, such as a memory or an integrated circuit (IC). The rapid thermal processing (RTP) includes rapid thermal annealing (RTA), rapid thermal cleaning (RTC), rapid thermal chemical vapor deposition (RTCVD), rapid thermal oxidization (RTO) and rapid thermal nitriding (RTN).

BACKGROUND ART

Generally, in order to manufacture a semiconductor integrated circuit, various kinds of heat treatment, such as a film deposition process, an annealing process, an oxidization diffusion process, a sputtering process, an etching process and a nitriding process may be performed on a silicon substrate such as a semiconductor wafer a plurality of times.

Since yield rate and quality of semiconductor manufacturing processes can be improved, the RTP technology to raise and lower the temperature of the wafer (object to be processed) has attracted attention. A conventional RTP apparatus generally comprises: a single-wafer chamber (process chamber) for accommodating an object (for example, a semiconductor wafer, a glass substrate for photograph masks, a glass substrate for a liquid-crystal display or a substrate for optical disks) to be processed; a quartz window disposed in the process chamber; heating lamps (for example, halogen lamps) arranged above or above and under the quartz window; and a reflector (reflective board) arranged at the opposite side of the object to be processed with respect to the quartz window.

The reflector is made of aluminum, for example, and gold plating is typically given to a reflective part thereof. A cooling mechanism (a cooling pipe, etc.) is provided so as to prevent thermal cracking breakage of the reflector (for example, exfoliation of gold plating due to a high temperature) and also to prevent the reflector from being an obstacle to cooling the object to be processed at the time of cooling.

Rapid temperature rising required for the RTP technology depends on power density of the lamp and directivity of a light irradiation from the lamp. The directivity and energy efficiency of the lamp become maximum against the object to be processed provided below when an inclination angle α of the reflector 4 is 45 degrees as shown in FIG. 1, in a case of a single end lamp 2 having one electrode 3 like a valve. Here, FIG. 1 is a cross sectional view for explaining the inclination angle of the reflector 4 when the directivity and the energy efficiency are best, in a case where the object to be processed that is provided below is heated by a radiation light of the single end lamp 2.

The quartz window may be in the shape of a board or in the shape of a pipe where the object to be processed is arranged inside thereof. When a negative pressure environment in the process chamber is maintained by evacuating gasses in the process chamber by a vacuum pump, the quartz window has a thickness of several tens of millimeters (for example, 30 to 40 mm) so as to maintain the pressure difference between the internal pressure and the atmospheric pressure. The quartz window may be formed in a pressure-resistant curved shape having a reduced thickness so as to prevent generation of a thermal stress due to temperature difference generated by a temperature rise.

A plurality of halogen lamps are arranged so as to uniformly heat the object to be processed, and the reflector reflects the infrared rays irradiated from the halogen lamps toward the object to be processed. The process chamber is typically connected to a gate valve on a sidewall thereof so as to carry in and out the object to be processed, and is also connected to a gas supply nozzle at the sidewall for introducing a process gas used for heat treatment.

Since the temperature of the object to be processed affects the quality of process (for example, the thickness of a film in a film deposition process, etc.), it is necessary to know the correct temperature of the object to be processed. In order to attain high-speed heating and high-speed cooling, a temperature measuring device which measures the temperature of the object to be processed is provided in the process chamber. Although the temperature measuring device can be constituted by a thermocouple, there is a possibility of the processed body becoming polluted with the metal which constitutes the thermocouple since it is necessary to bring the thermocouple into contact with the object to be processed. Therefore, there is proposed a pyrometer as a temperature measuring device which detects an infrared intensity emitted and computes the temperature of an object to be processed from the back side thereof based on the detected infrared intensity. The pyrometer computes the temperature of the object to be processed by carrying out a temperature conversion by a rate of radiation of the object to be processed according to the following equation 1:

$$E_m(T) = \epsilon E_{BB} \qquad \text{(EQUATION 1)}$$

In the above mentioned equation 1, $E_{BB}(T)$ expresses a radiation intensity from a black body having the temperature T; $E_m(T)$ expresses a radiation intensity measured from the object to be processed having the temperature T; and $\epsilon$ expresses a rate of radiation of the object to be processed.

In operation, the object to be processed is introduced into the process chamber through the gate valve, and the peripheral portion of the object to be processed is supported by a holder. At the time of heat treatment, process gases such as nitrogen gas and oxygen gas are introduced into the process chamber through the gas supply nozzle. On the other hand, the infrared ray irradiated from the halogen lamps is absorbed by the object to be processed, thereby, raising the temperature of the object to be processed.

However, according to the conventional method of temperature measurement for the object to be processed defined by the above mentioned equation 1, there is an error of approximately 20 through 40 degrees centigrade as compared with an actual temperature of the object to be processed. Hence, there is a disadvantage of the conventional method of temperature measurement in that heat treatment with a high quality cannot be implemented. Inventors of the present application studied reasons for this advantage diligently and realized the following points. That is, in a case where the equation 1 is applied to the temperature measurement of the actual object to be processed, some errors should be considered, and the radiation light from the object to be processed is multiplex-reflected at a surface facing to the object to be processed so that some of these errors are caused. Particularly, there is a big influence of the measurement error due to the multiplex-reflection in a single-wafer process chamber having a large reflectivity of members situated at periphery of the object to be processed for improving heat efficiency.

DISCLOSURE OF INVENTION

Accordingly, it is a general object of the present invention is to provide a novel and useful method of temperature measurement, heat treatment apparatus and method, computer program, and radiation thermometer.

Another and more specific object of the present invention is to provide a method of temperature measurement, heat treatment apparatus and method, computer program, and radiation thermometer, whereby a temperature of an object to be processed can be measured with high precision.

The above objects are achieved by a method of temperature measurement for measuring a temperature of an object to be measured that is heated by a heating source in a multiplex-reflection environment by using two of radiation thermometers provided at a measurement part separated from the object to be measured, wherein two of the radiation thermometers respectively include a rod that is embedded in the measurement part and can receive radiation light from the object to be measured, and an optical fiber connected to the rod;

numerical apertures of the radiation thermometers are different;

the multiplex-reflection environment is formed between a surface facing the object to be measured of the measurement part and the object to be measured;

a radiation rate $\epsilon$ of the object to be measured based on a result of a measurement of two of the radiation thermometers and the temperature of the object to be measured is calculated by the following equations $$\alpha = 1 - (1 - NA \cdot N1)^{N2/(D1/D2)}$$

$$\epsilon_{eff}(1-\alpha) \cdot \epsilon + \alpha \cdot \epsilon / \{1 - F \cdot r \cdot (1-\epsilon)\}$$

wherein D1 represents a diameter of the rod of the radiation thermometers, NA represents the numerical aperture, D2 represents a distance between the object to be measured and the surface of the measurement part, r represents a reflectivity of the surface of the measurement part, F represents a view factor, $\alpha$ represents a multiplex reflection coefficient, $\epsilon_{eff}$ represents an effective radiation rate of the object to be measured, and N1 and N2 are parameters.

In the above mentioned method of temperature measurement, the above mentioned equation 1 is corrected by $\alpha$, F, and r, so that the object to be measured can be measured with a higher precision. A program for implementing the above mentioned method of temperature measurement and a computer readable medium where the method is stored as a part of the program are independent transaction objects.

A heat treatment apparatus of another aspect of the present invention includes a process chamber where a designated heat treatment is implemented for an object to be treated; a heating source for heating the object to be measured, and radiation thermometers connected to a measurement part of the process chamber, by which a temperature of the object to be treated is measured; and a control part for controlling heating power of the heating source based on the temperature of the object to be treated that is measured by the radiation thermometers. The control part uses the above mentioned equations under the above mentioned conditions. Furthermore, a heat treatment method of another aspect of the present invention uses the above mentioned equations under the above mentioned conditions. The above mentioned heat treatment apparatus and method of operation can achieve the same effect.

Furthermore, another aspect of the present invention is a method of temperature measurement for measuring a temperature of an object to be measured that is heated by a heating source in a multiplex-reflection environment by using a radiation thermometer provided at a measurement part separated from the object to be measured, wherein the radiation thermometer includes a rod that is embedded in the measurement part and can receive radiation light from the object to be measured, a first optical fiber connected to the rod, a second optical fiber having a different numerical aperture from the first optical fiber and connected to the rod, a first detector detecting the radiation light passing through the first optical fiber, and a second detector detecting the radiation light passing through the second optical fiber. The above mentioned equations are used under the above mentioned conditions. According to the method, only half of numbers of the rod of the radiation thermometer used in the above described method needed to be used. In addition, a program for implementing the above mentioned method of temperature measurement is an independent transaction object. Furthermore, a heat treatment method of another aspect of the present invention uses the above mentioned equations under the above mentioned conditions. The above mentioned heat treatment apparatus and method of operation can achieve the same effect.

Furthermore, another aspect of the present invention is a radiation thermometer, including a rod that is provided at a measurement part separated from the object to be measured and can receive radiation light from the object to be measured; a first optical fiber connected to the rod; a second optical fiber having a different numerical aperture from the first optical fiber and connected to the rod; a first detector detecting the radiation light passing through the first optical fiber; and a second detector detecting the radiation light passing through the second optical fiber.

In the above mentioned radiation thermometer, two kinds of the optical fiber having different numerical apertures hold one rod in common. Hence, the radiation thermometer is suitable for using for the above mentioned method.

In addition, the radiation thermometer may be a bundled fiber where first and second optical fibers are knitted as being separated at a center and an exterior circumference part respectively. The first and second optical fibers may be a bundled fiber where the first and second optical fibers are knitted randomly. A material proper for the first and second optical fibers is quartz, plastic and glass. However, in a case where the optical fibers forms a bundled fiber where the optical fibers are knitted, it is preferable that the first and second optical fibers be a combination of quartz and quartz or a combination of quartz and glass.

BEST MODE FOR CARRYING OUT THE INVENTION

Figure 1:
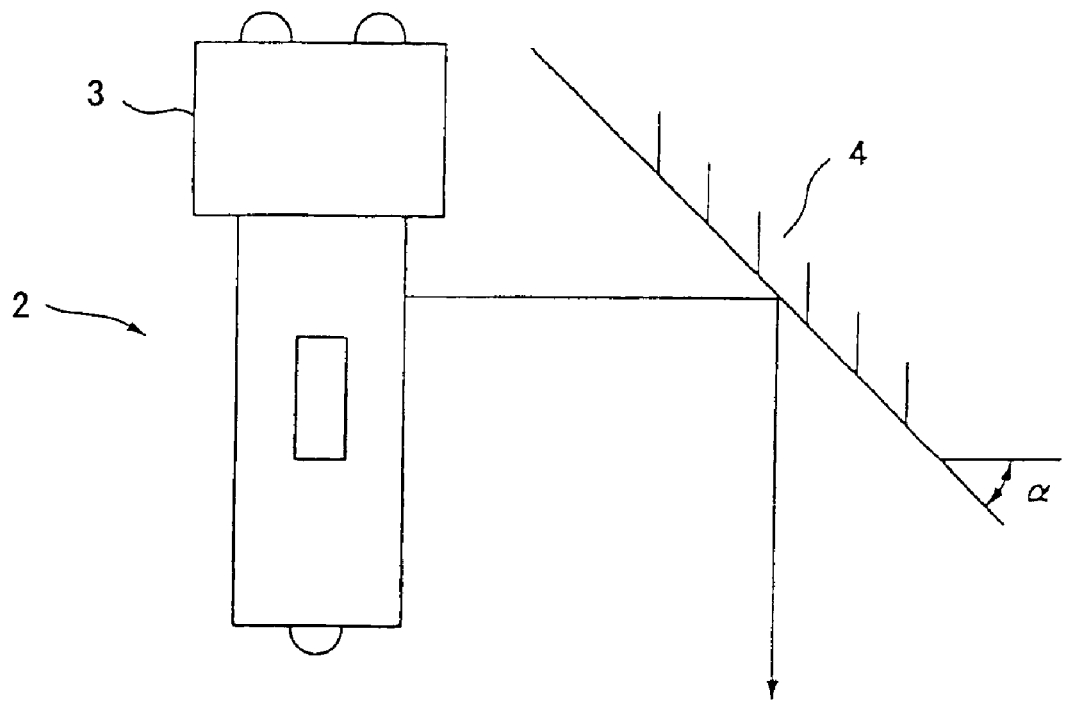
FIG. 1 is a cross sectional view for explaining the inclination angle of the reflector 4 when the directivity and the energy efficiency is best, in a case where the object to be processed that is provided below is heated by a radiation light of the single end lamp 2.

A description will now be given, with reference to figures, of a heat treatment apparatus 100 of embodiments of the present invention. In the figures, parts that are the same as the parts shown in other figures are given the same reference numerals. Furthermore, in a case where a reference numeral also has an upper case alphabetic character, it is a modified example of a reference numeral not having the alphabetic character. Hence, principally the reference numeral not having the alphabetic character generalizes the reference numeral having the alphabetic character.

Figure 2:
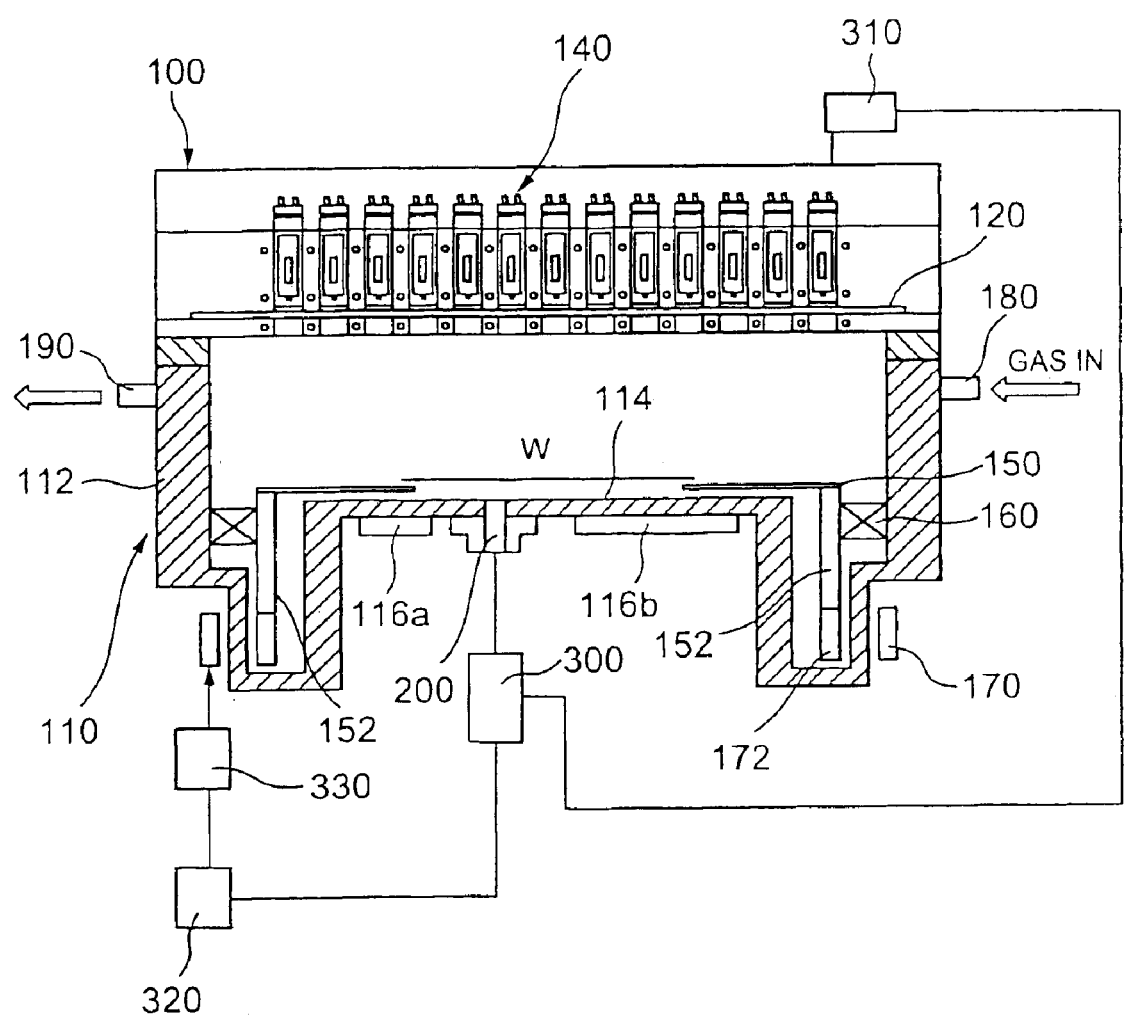
FIG. 2 is a schematic cross-sectional view of a heat treatment apparatus 100 according to the embodiment of the present invention.

FIG. 2 is a schematic cross-sectional view of a heat treatment apparatus 100 according to the embodiment of the present invention. As shown in FIG. 2, the heat treatment apparatus 100 includes a process chamber 110, a quartz window 120, a heating part 140, a support ring 150, a bearing 160, a permanent magnet 170, a gas introducing part 180, an exhausting part 190, a radiation thermometer 200 and a control part 300.

The process chamber 110 is formed of, for example, stainless steel or aluminum, and is connected to the quartz window 120. A sidewall 112 having a cylinder configuration of the process chamber 110 and the quartz window 120 define a process space in which an object W to be processed (for example a semiconductor wafer: hereinafter referred to as a wafer W) is subjected to a heat treatment. The support ring 150 on which the wafer W is placed and a support part 152 connected to the support ring 150 are arranged in the process space. The process space is maintained to be at a predetermined negative pressure by the exhaust part 190. The wafer W is carried into or out from the process chamber through a gate valve not shown in FIG. 2.

A bottom part 114 of the process chamber 110 is connected to cooling pipes 116a and 116b (hereinafter simply referred to as cooling pipe 116) so that the bottom part 114 serves as a cooling plate. If necessary, the cooling plate 114 may have a temperature control arrangement. The temperature control arrangement may include a control part 300, a temperature sensor and a heater. Cooling water is supplied to the temperature control arrangement from a water supply source such as a water line. A coolant such as alcohol, gurden or flon may be used instead of the cooling water. As for the temperature sensor, a known sensor such as a PTC thermistor, an infrared sensor, a thermocouple, etc. may be used. The heater can be a heater line wound on the outer surface of cooling pipe 116. The temperature of the cooling water flowing through the cooling pipe 116 can be adjusted by controlling an electric current flowing through the heater line.

The quartz window 120 is attached to the process chamber in an airtight manner so as to maintain the negative pressure environment inside the process chamber 110 and transmit a heat radiation light emitted from lamps 130. As shown in FIGS. 3–6, the quartz window 120 includes a cylindrical quartz plate 121 having a radius of about 400 mm and a thickness of about 33 mm and a plurality of quartz lens assemblies 122 comprising a plurality of lens elements 123.

Figure 3:
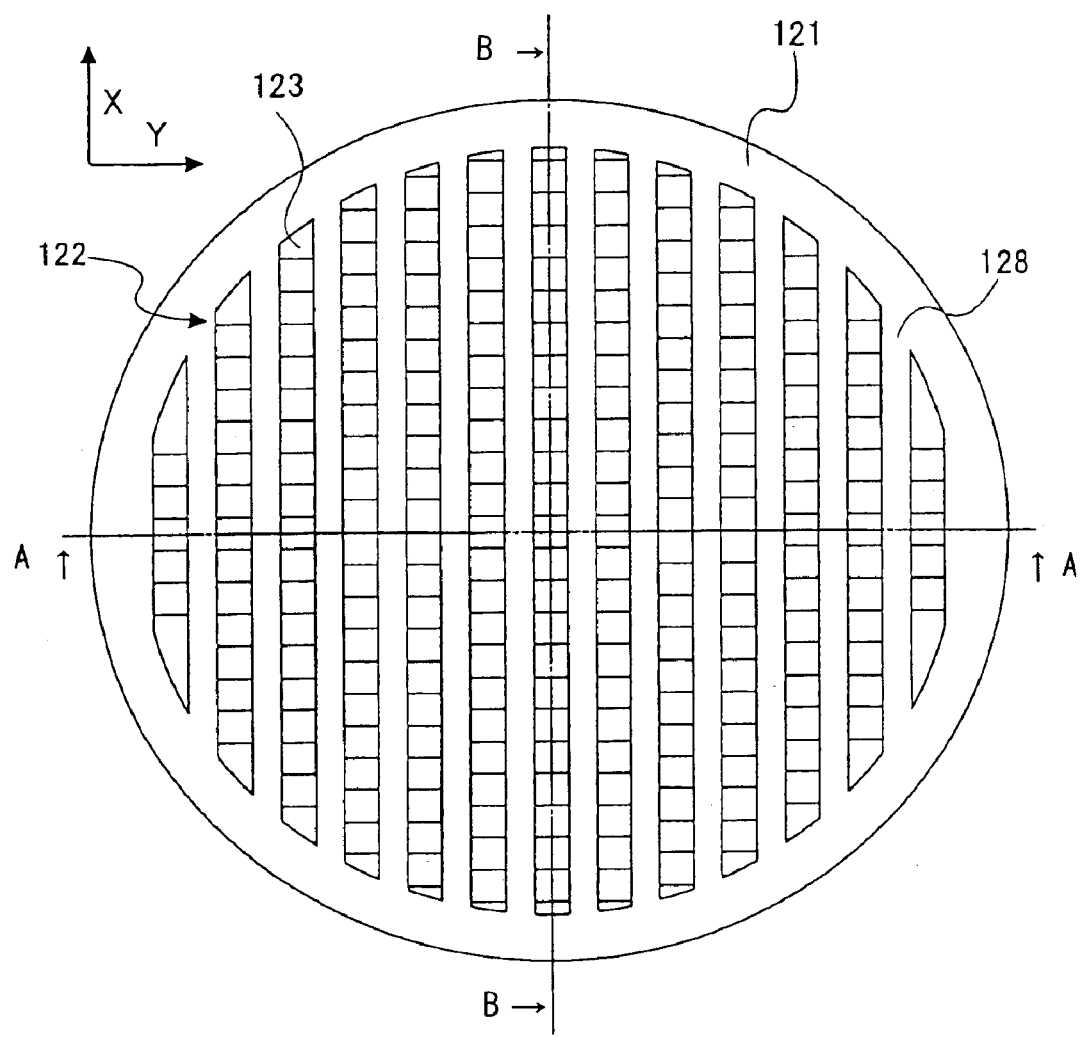
FIG. 3 is a plan view of the quartz window 120.
Figure 4:
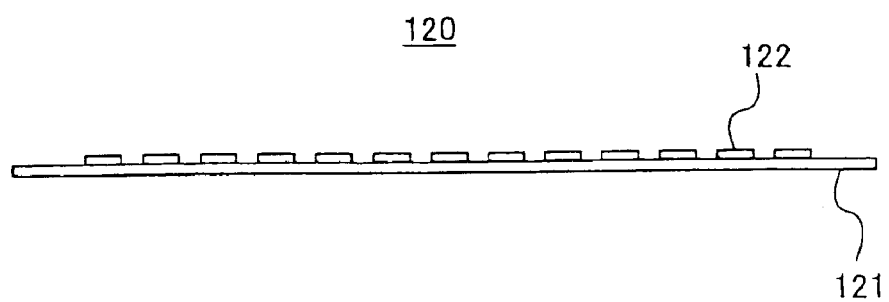
FIG. 4 is a cross-sectional view of the quartz window 120 taken along a line A—A of FIG. 3.
Figure 5:
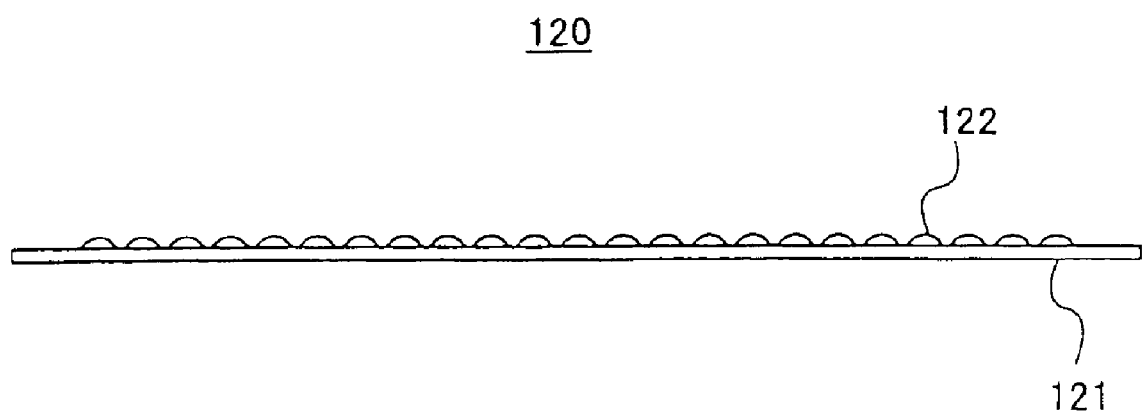
FIG. 5 is a cross-sectional view of the quartz window 120 taken along a line B—B of FIG. 3.
Figure 6:
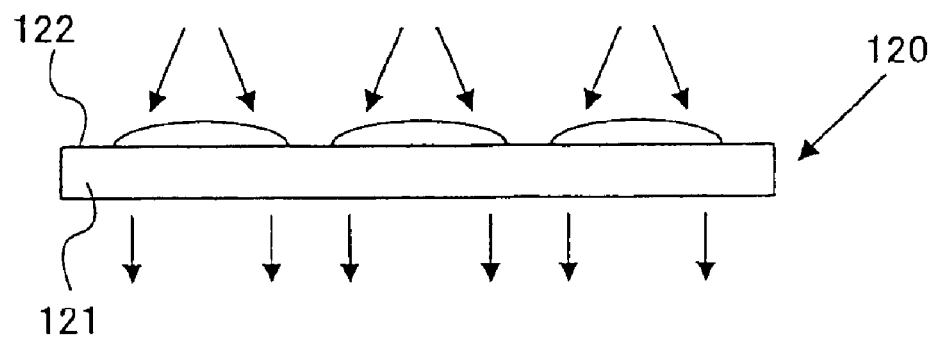
FIG. 6 is an enlarged cross-sectional view of a part of the quartz window 120 shown in FIG. 5.
Figure 7:
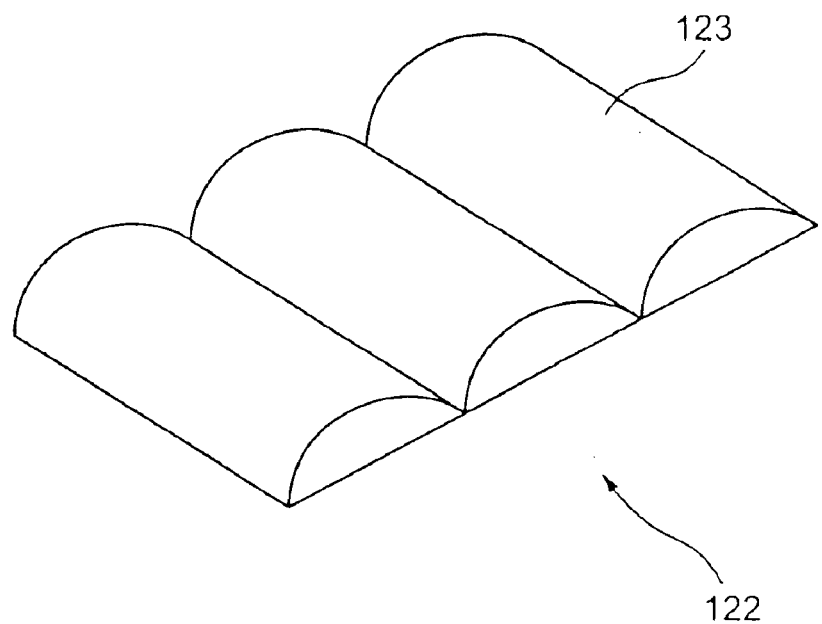
FIG. 7 is an enlarged perspective view of a part of a lens assembly 122 used in the quartz window 120.

FIG. 3 is a plan view of the quartz window 120. FIG. 4 is a cross-sectional view of the quartz window 120 taken along a line A—A of FIG. 3. FIG. 5 is a cross-sectional view of the quartz window 120 taken along a line B—B of FIG. 3. FIG. 6 is an enlarged cross-sectional view of a part of the quartz window 120 shown in FIG. 5. FIG. 7 is an enlarged perspective view of a part of a lens assembly 122 used in the quartz window 120.

The lens assembly 122 serves to strengthen the quartz window 120 and increase the directivity of the radiation light from the lamps of the heating part 140. As shown in FIG. 3, each of the lens assemblies 122 has a plurality of lens elements 123 having a light converging function. The lens assemblies 122 are arranged parallel to the direction X since the lamps of the lamps 130 are arranged in the direction X. That is, the direction of arrangement of the lens assemblies 122 is dependent on the direction of arrangement of the lamps 130. In the present embodiment, although each of the lens elements 123 is curved only in the direction X in FIG. 3, the orientation of each of the lens elements 123 is not limited to that shown in FIG. 3, and each of the lens elements 123 may be curved in the direction Y or both directions X and Y. In the present embodiment, the lens assemblies 122 (the lens element 123 of the lens assemblies 122 and the lamps 130) are arranged so as to uniformly heat the entire wafer W having a circular shape.

Figure 15:
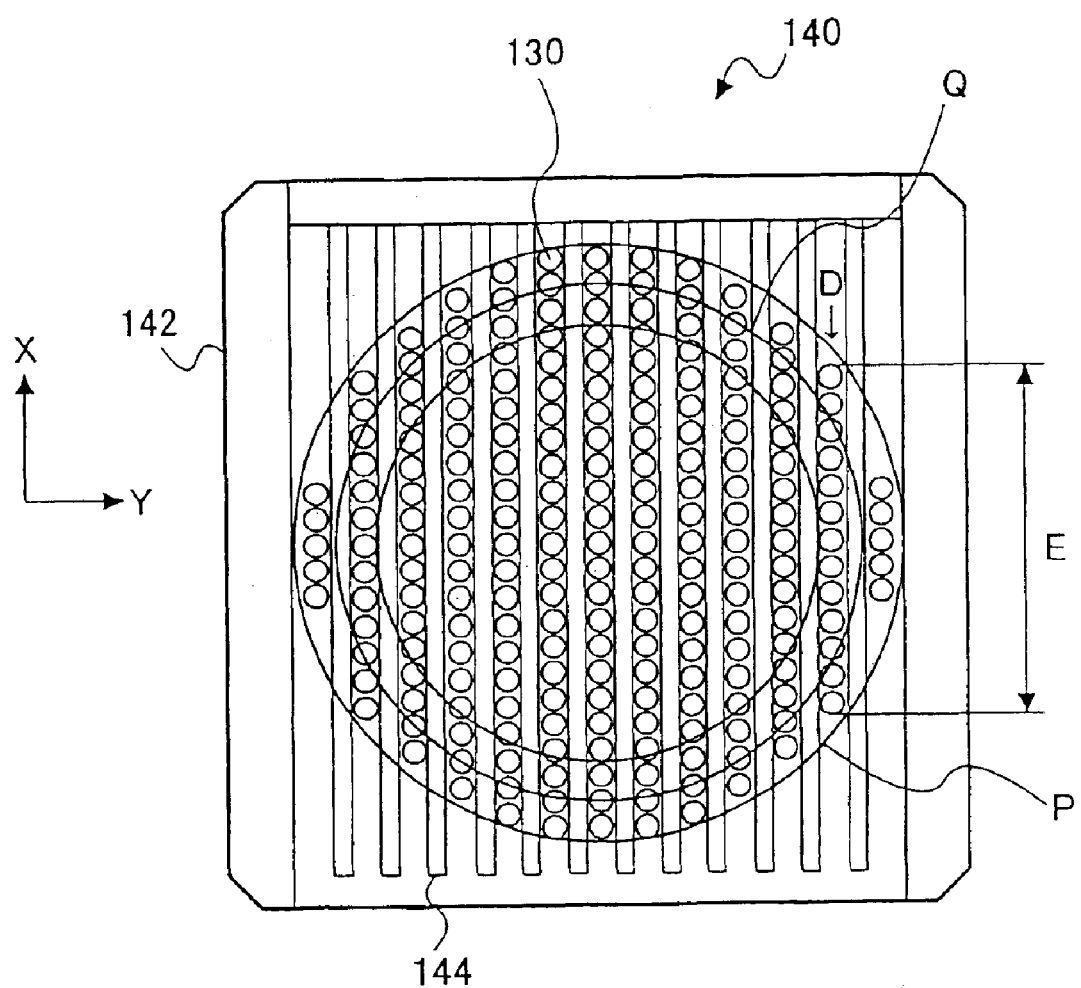
FIG. 15 is a bottom enlarged view showing a more detailed structure of the heating part 140 of the heat treatment apparatus of FIG. 2.

The lens assemblies 122 serve as an air passages AF for cooling the lens assemblies 122, the quartz window 120 and the lamps 130. Additionally, a gap between the adjacent lens assemblies 122 serves as a contact part 128 which contacts a separation wall 144 (See. FIG. 15) which cools the quartz plate 121 by heat conduction.

In the present embodiment, as described above, the thickness of the quartz plate 121 is set equal to or less than 30 mm to 40 mm, for example, about 30 mm. Although the present invention does not exclude the thickness being in the range of 30 mm to 40 mm so as to use only the light converging action of the lens assemblies 122, the use of the thin quartz plate 121 according to the present embodiment can provide an effect described later. Additionally, although the lens assemblies 122 according to the present embodiment have a height of about 3 mm and a width equal to or less than 21 mm in FIG. 4, the height and width are not limited to such dimensions. Further, although the lens elements 123 according to the present embodiment have a length about 18 mm and a radius about 10 mm in FIG. 5, the length and radius are not limited to such dimensions.

In the present embodiment, although the window lens assemblies 122 are provided only on one side of the quartz plate 121 which side is opposite to the lamps 130 of the heating part 140, the window lens assemblies 122 may be provided on both sides or on the other side which is not opposite to the lamps 130.

Since the strength with respect to thermal deformation of the quartz plate 121 is increased by the lens assemblies 122, there is no need to form the quartz plate 121 in a domal shape which curves in a direction protruding from the process chamber 110 as in the conventional apparatus. Accordingly, the quartz plate 121 has a flat shape. Since the quartz window formed in a domal shape increases a distance between the wafer W and the lamps 130 of the heating part 140, there is a problem in that the directivity of the lamps is degraded. The present embodiment solves such a problem relating to the directivity of the lamps. Although the quartz plate 121 and the lens assemblies 122 are joined by welding in the present embodiment, the quartz plate 121 and the lens assemblies 122 may be joined by other methods or integrally formed with each other.

The thickness of the quartz plate 121 is about 30 mm, which is less than the thickness of the conventional quartz plate which ranges from 30 mm to 40 mm.

Consequently, the quartz window 120 according to the present embodiment absorbs a smaller amount of the light emitted by the lamps 130 than the conventional quartz window. Thus, the quartz window 120 has the following advantages over the conventional quartz window.

First, a high rate temperature rise can be achieved with low power consumption since the irradiation efficiency of the lamps 130 to the wafer W can be improved. That is, the present embodiment solves the problem of the lamp light being absorbed by the quartz window which results in reduction of the irradiation efficiency.

Second, the quartz window is prevented from being damaged due to a difference in temperature between the front surface and the back surface of the quartz window 121 since the difference can be maintained smaller than that of the conventional quartz window. That is, the present embodiment solves the problem of the conventional quartz window being easily destroyed due to a difference in the thermal stress between the front surface facing the lamps and the back surface opposite to the front surface when a rapid thermal process is performed as in a rapid thermal process (RTP) apparatus.

Third, the quartz window is prevented from forming a deposition film or a byproduct on a surface thereof during a film deposition process because the temperature of the quartz window 120 is lower than the conventional quartz window. Thus, a good repeatability can be maintained and a frequency of cleaning operations applied to the process chamber 110 can be decreased.

That is, the present embodiment solves the problem of the temperature of the conventional window being high especially when a film deposition process is performed, which results in deposition of a deposition film or a byproduct on the surface of the quartz window and an increase in the frequency of cleaning operations of the process chamber.

Additionally, a quartz window 120 solely constituted only by the quartz plate 121, which does not have the lens assemblies 122, may reduce an amount of light absorbed by the quartz plate 121 when the thickness of the quartz plate 121 is small as in the present embodiment, it is possible that such a quartz window 120 is easily destroyed since the quartz plate 120 cannot withstand a pressure difference between the negative pressure in the process chamber and the atmospheric pressure. Accordingly, there is a problem in that such a quartz window cannot be used with a process, which must be performed under a negative pressure environment. The lens assemblies 122 solve such a problem since the lens assemblies 122 reinforces the quartz plate 121.

Figure 49:
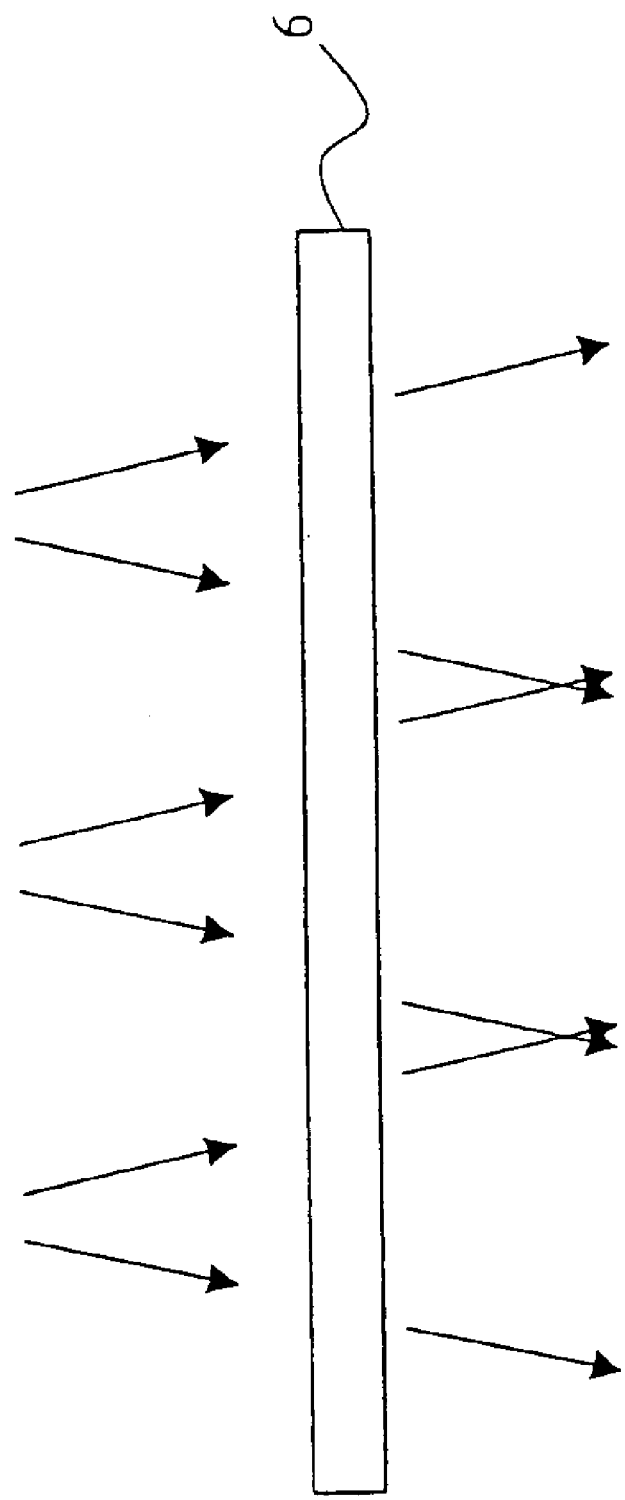
FIG. 49 is a cross-sectional view of a circular quartz window for explaining the directivity of the light passing through the circular quartz window as shown in FIG. 6.

A description will now be given, with reference to FIGS. 6, 7 and 49, of a light converging action of the lens assemblies 122 of the quartz window 120. Referring to FIG. 49, the light emitted from a single end lamp (not shown in the figure) positioned above the quartz window and transmitting the quartz window 6 is spread, and, thus, the directivity of the light passing through the quartz window 6 with respect to the wafer W, which is placed under the quartz window, is dull. Here, FIG. 49 is a cross-sectional view of a circular quartz window for explaining the directivity of the light passing through the circular quartz window 6.

On the other hand, as shown in FIGS. 6 and 7, the quartz window 120 according to the present embodiment colli- mates the light emitted from the lamps 130 by the lens assemblies 122 having the convex lens elements 123 so that the light is irradiated on the wafer W with a good directivity. It should be noted that the structure of each lens element 123 is not limited to the specifically disclosed shape and curvature which collimate the light from the lamps 130, and the lens element may provide a directivity the same as the conventional quartz window. That is, even if the directivity is the same as that of the conventional quartz window, the lens assemblies 122 have the above-mentioned reinforcing function.

Figure 8:
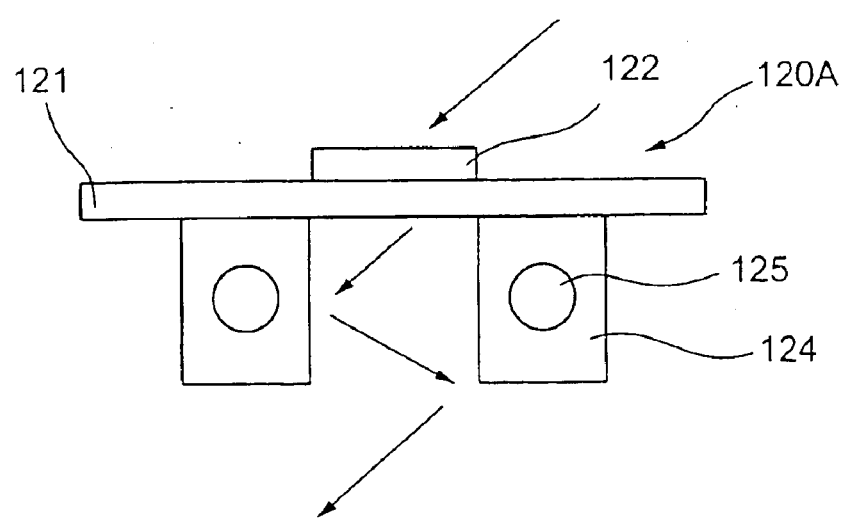
FIG. 8 illustrates a quartz window 120A which is a variation of the quartz window 120 shown in FIG. 4 and is an enlarged cross-sectional view of a part of the quartz window 120A.

A description will now be given, with reference to FIG. 8, of a quartz window 120A which is a variation of the quartz window 120 according to the present embodiment. FIG. 8 is an enlarged cross-sectional view of a part of the quartz window 120A of FIG. 4. The quartz window 120A has reinforcing members (or columns) 124, which are formed under the lens assembly 122 and parallel to the lens assembly 122. Each of the reinforcing members 124 is made of aluminum or stainless steel, and has a square cross section. The reinforcing members 124 have cooling pipes 125 therein, and increase the strength of the quartz window 120A.

Figure 12:
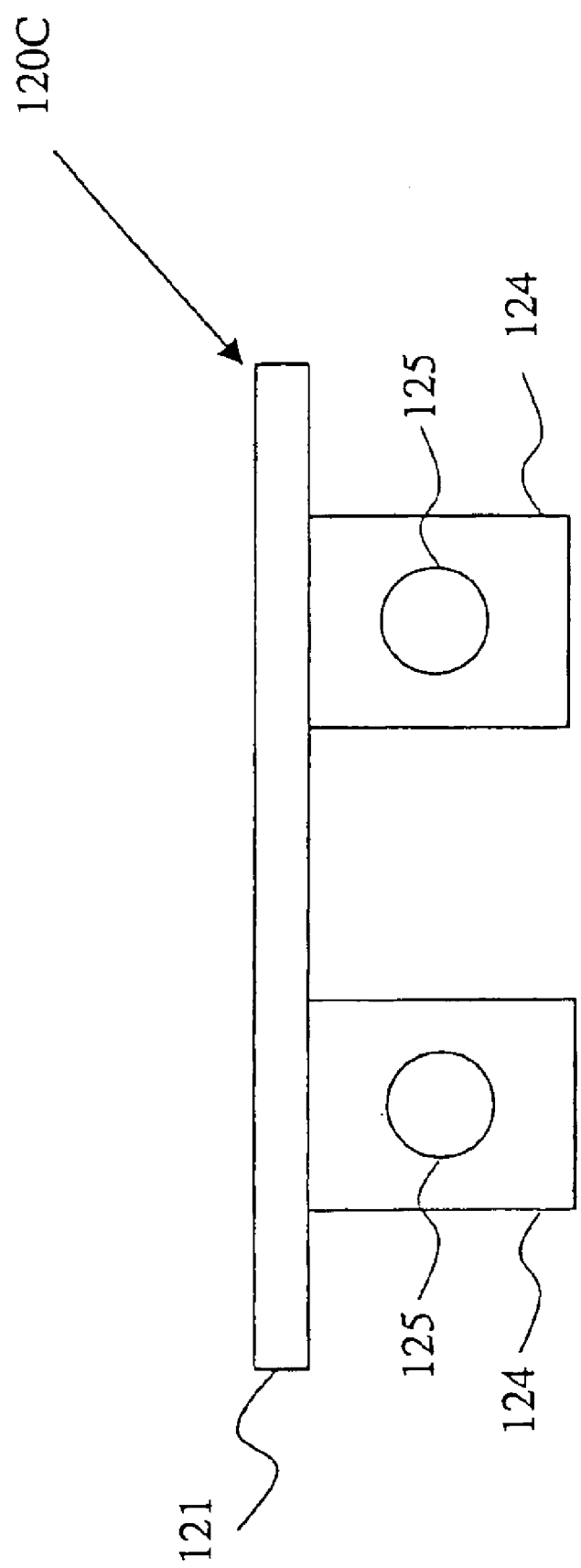
FIG. 12 illustrates a quartz window 120C which is another variation of the quartz window 120 shown in FIG. 4 and is an enlarged cross sectional view of the quartz window 120B.

The reinforcing members 124 have a good heat conductivity. Additionally, the reinforcing members 124 cannot be a source of pollution with respect to the wafer W because the reinforcing members 124 are formed of the same material as the process chamber 110. Due to the provision of the reinforcing members 124, the thickness of the quartz plate 121 can be equal to or smaller than 10 mm, preferably equal to or smaller than 7 mm, and, more preferably, about 5 mm. In the present embodiment, the dimensions of the cross section of each reinforcing member 124 is 18 mm in height and about 12 mm in width. The diameter of the cooling pipe 125 is not limited to but is about 6 mm. Additionally, the cross-section of each reinforcing member 124 is not limited to a rectangle, and an arbitrary shape such as a wave shape may be used. The present invention encompasses a quartz window 120C which is a combination of the quartz plate 121 and the reinforcing members 124 as shown in FIG. 12. As shown by arrows in FIG. 8, the radiation light from the lamps 130 is reflected by sidewalls of reinforcing members 124, and reaches the wafer W placed under the quartz window. The cooling pipe 125 has a cooling function which cools both the reinforcing members 124 and the quartz plate 121. If the reinforcing members 124 are made of aluminum, an appropriate temperature control (cooling) is needed since the aluminum may be deformed or melted at a temperature in the range of 200 to 700 degrees centigrade. The temperature control by the cooling pipe 125 may be the same as the cooling pipe 116, or other known methods may be applied.

Figure 9:
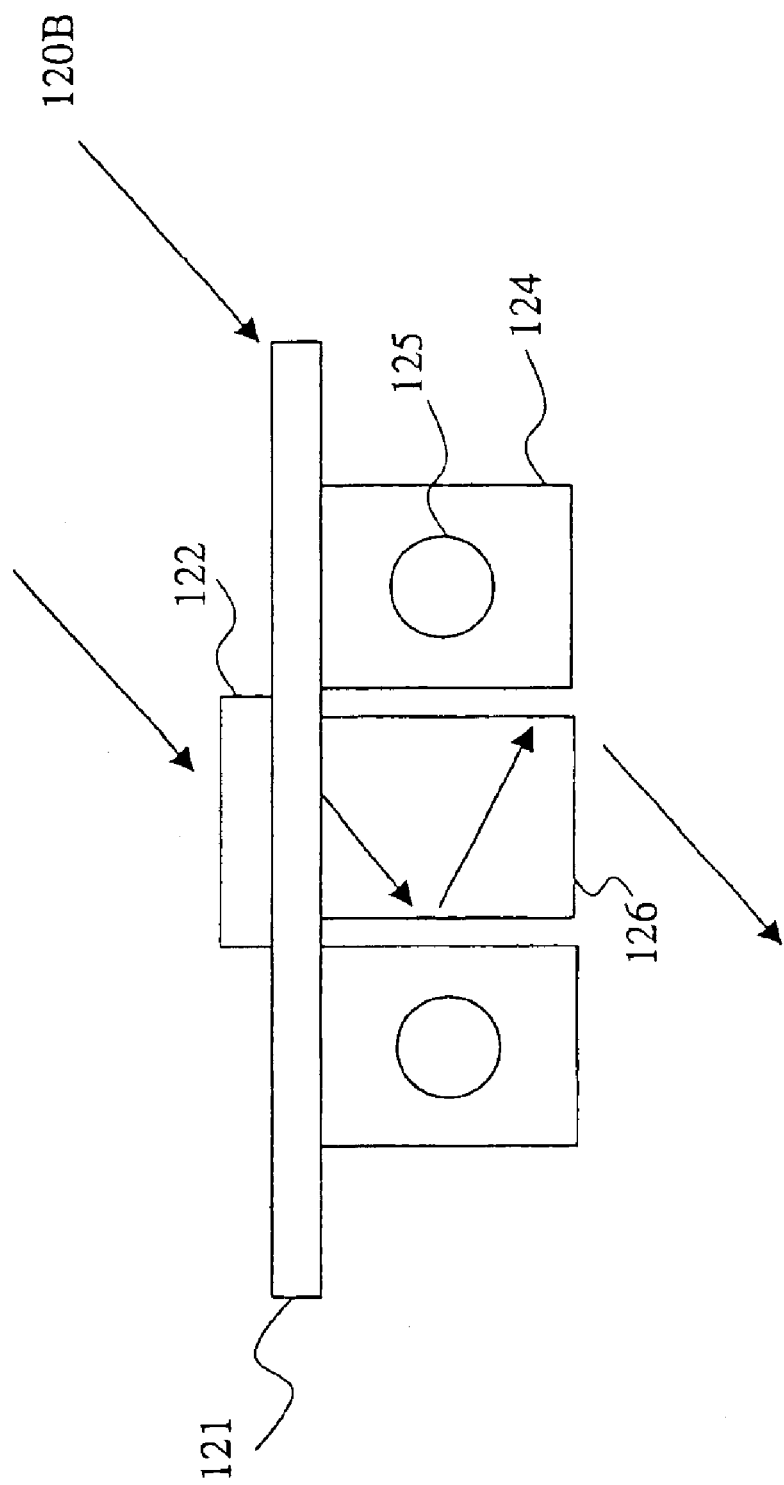
FIG. 9 illustrates a quartz window 120B which is another variation of the quartz window 120 shown in FIG. 4 and is an enlarged cross sectional view of the quartz window 120B.

A description will now be given, with reference to FIG. 9, of a quartz window 120B which is another variation of the quartz window 120 according to the present embodiment. FIG. 9 is an enlarged cross sectional view of the quartz window 120B. The quartz window 120B has the same structure as the quartz window 120A shown in FIG. 12 except for wave-guiding parts 126 having a square cross section being provided under the respective lens assemblies 122. The quartz window 120B can provide an improved irradiation efficiency compared to the quartz window 120A due to the wave-guiding parts 126. Referring to FIG. 8, the radiation light emitted by the lamps 130 indicated by arrows generate energy loss of about 10% when the radiation light is reflected by the reinforcing members 124. The rate of energy loss depends on the height of the reinforcing members 124 and other parameters. The energy loss can be decreased by forming a metal film having a high reflective index on the surface of the reinforcing members 124 by, for example, gold plating. However, such a metal film is not preferable since it may become a source of pollution with respect to the wafer W. Additionally, there is no material which is applicable to the reinforcing members 124 and has no reflective loss.

In order to reduce such an energy loss, the quartz window 120B is provided with the wave-guiding parts 126 which have a rectangular cross section and extending in parallel to the respective lens assemblies 122. The wave-guiding parts 126 may be bonded to the quartz plate 121 by welding or they may be integrally formed with each other. The wave-guiding parts 126 are preferably made of quartz, and have a refractive index of about 1.4. Since the refractive index of vacuum and air is about 1.0, the radiation light is totally reflected within the quartz made wave-guiding parts 126 according to the relationship between the refractive indexes of quartz and vacuum or air. Thus, the energy loss of the quartz window 120B is reduced to zero in theory.

The quartz window 120B is more preferable than a quartz window in which the reinforcing member 124 is removed and the thickness thereof is set to be equal to a sum of the thickness of the plate 121 and the thickness of the wave-guiding part 126. This is because, in such a case, the same problems as the conventional thick quartz window may occur due to an increase in the thickness of the quartz window.

Figure 10:
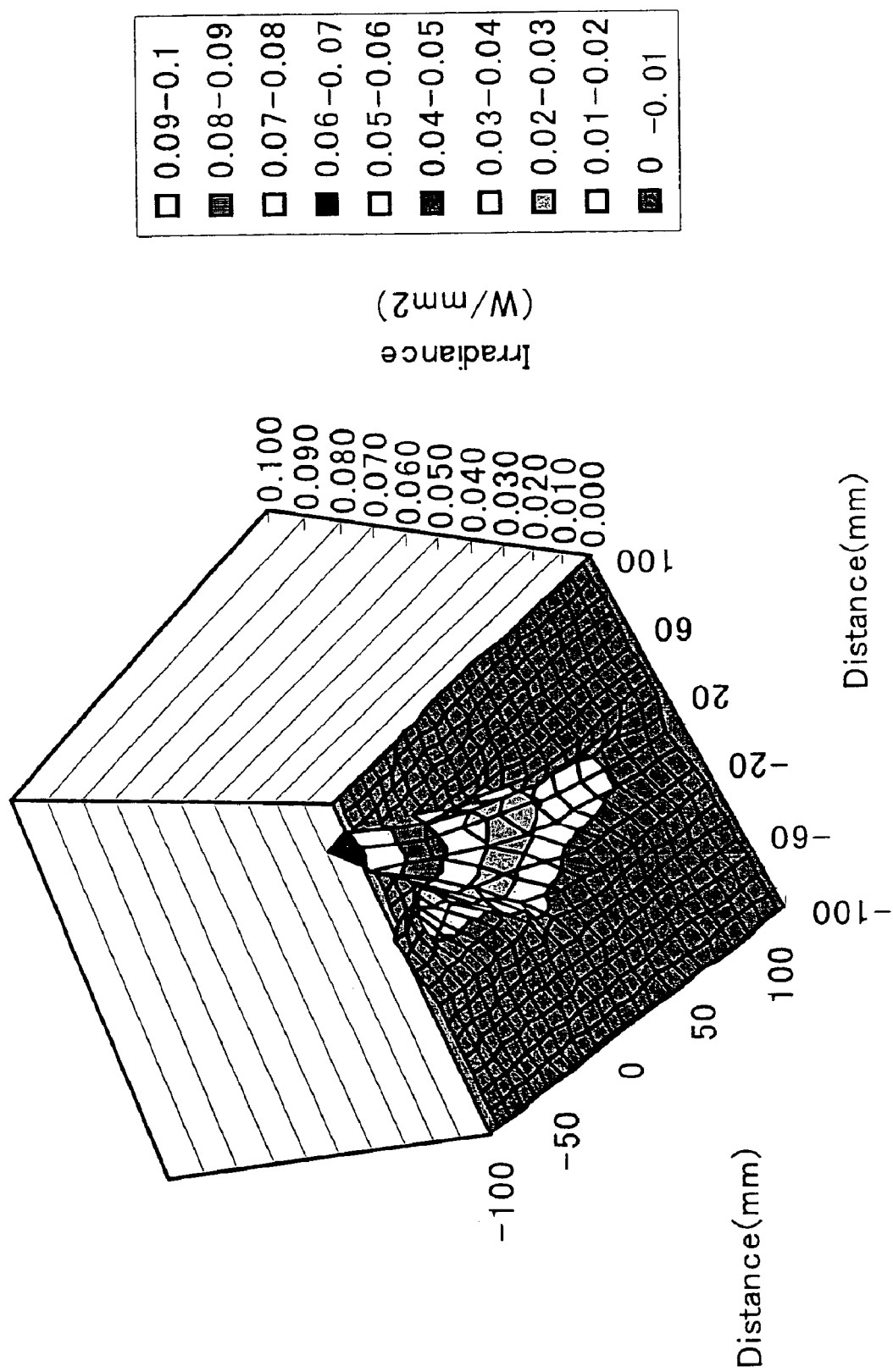
FIG. 10 three-dimensionally illustrates an irradiance of the radiation light irradiated to an object W to be treated in a case where the quartz window 120B is used and a center of the object W to be treated is defined as (0, 0)
Figure 11:
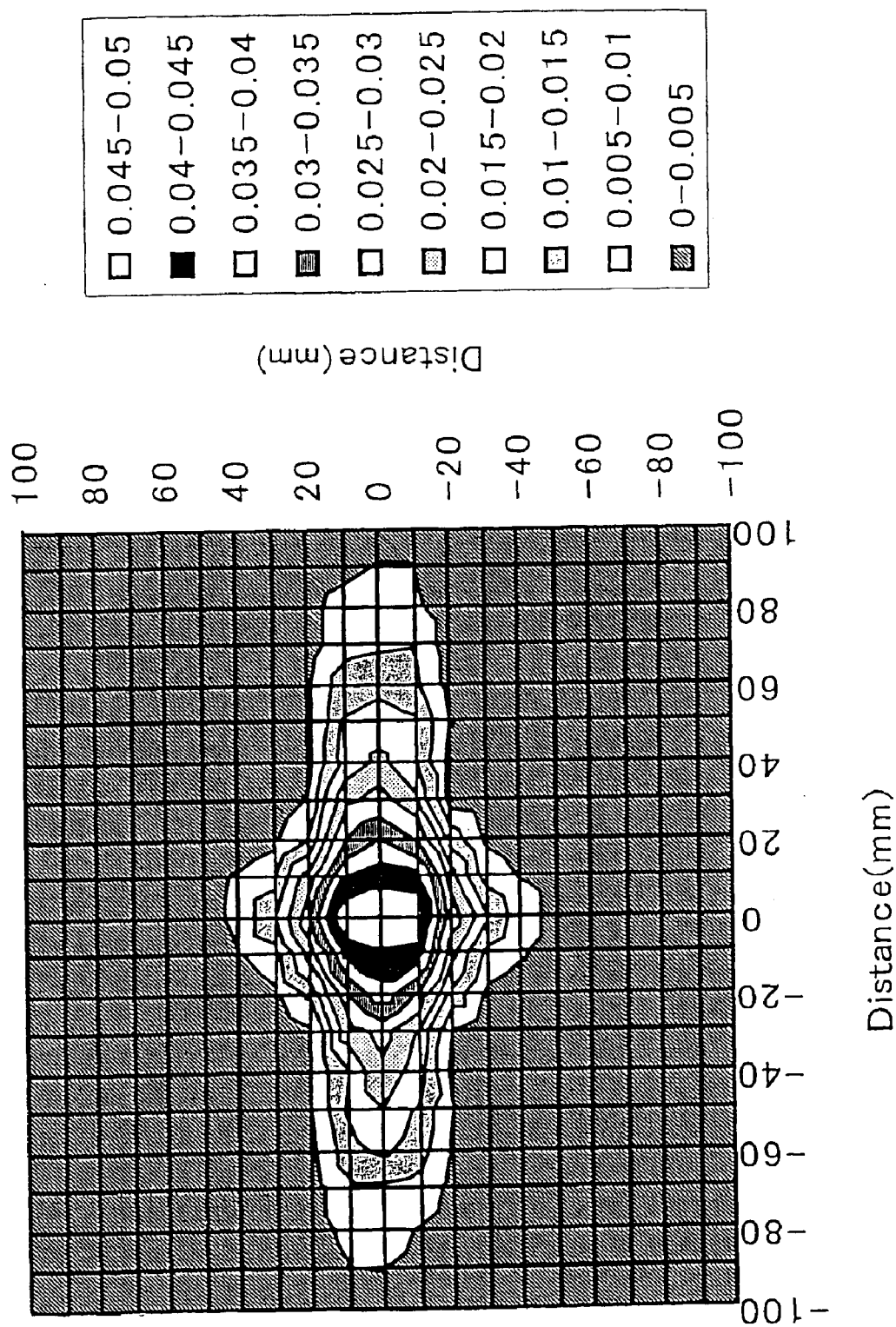
FIG. 11 is a plan view of FIG. 10.

FIGS. 10 and 11 show directivities when a quartz window 120B shown in FIG. 9 is used. A color figure is attached in the present application for convenience to understand. Here, a relationship between distances in X and Y directions of FIG. 3 and an irradiance of the radiation light irradiated to an object W to be treated in a case where a center of the object W to be treated is defined as (0, 0) is shown three-dimensionally in FIG. 10. FIG. 11 is a plan view of FIG. 10.

Experiment conditions of the above mentioned figures were as follows. That is, the lamp 130 having the plating part 149 formed by a gold plating film and a lamp output of 750 W is used, a distance between a lower end of the lamp 130 and an upper end of the lens assembly 122 is set as 2 mm, and a distance between the object to be treated W and a lower end if the reinforcing member 124 made by aluminum is set as 20 mm. In addition, in FIG. 9, a thickness of the quartz plate 121 is set as 5 mm, a height from a surface of the quartz plate 121 of the lens element 123 is set as 5 mm, a radius of a curvature is set as 10 mm, a width of the lens element 123 is set as 19 mm, a width of wave-guiding parts 126 is set as 19 mm, a height of the wave-guiding parts 126 is set as 18 mm, and a space of the two of the reinforcing parts 124 is set as 21 mm.

Figure 13:
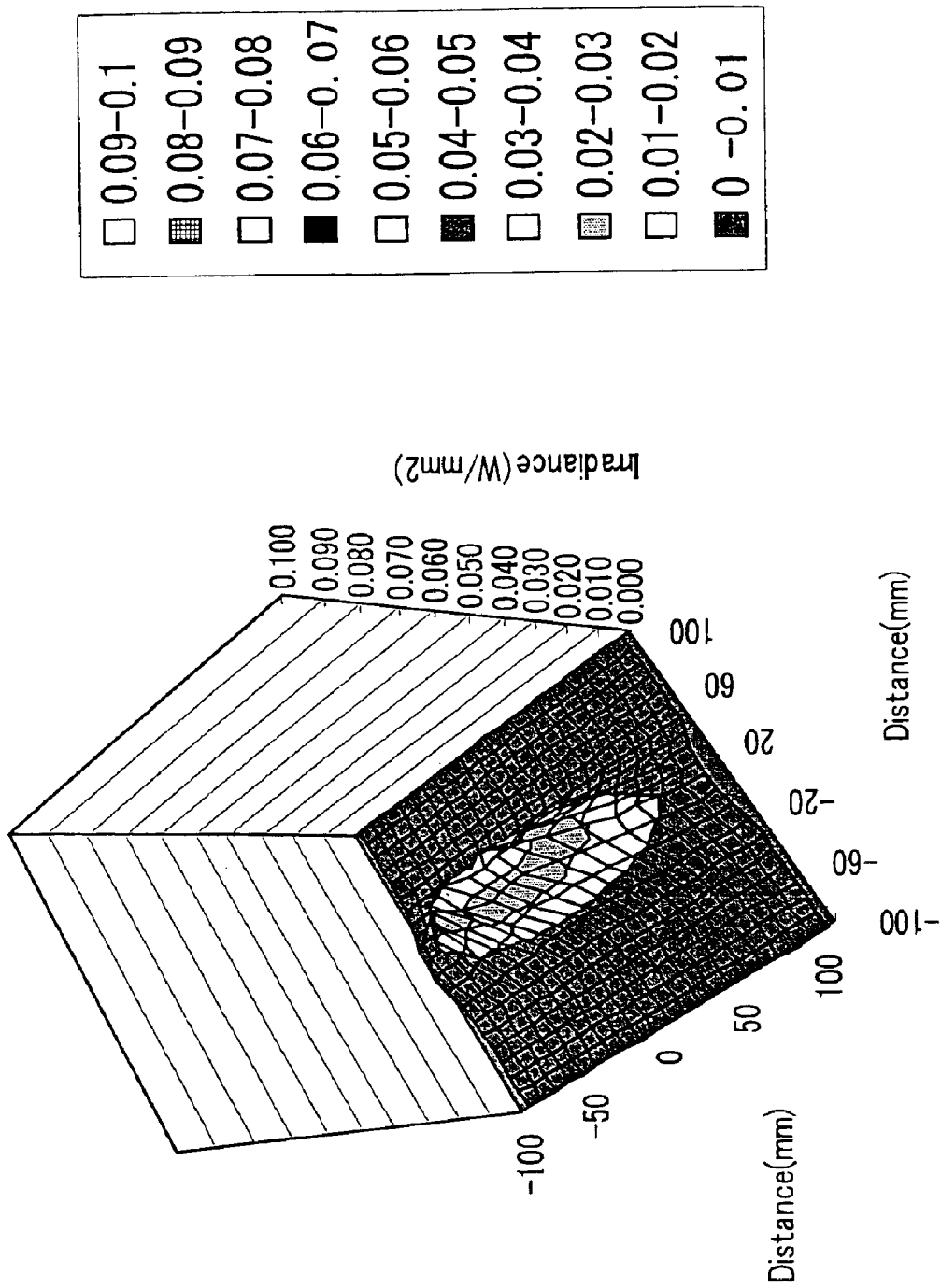
FIG. 13 three-dimensionally illustrates an irradiance of the radiation light irradiated to an object W to be treated in a case where the quartz window 120C is used and a center of the object W to be treated is defined as (0, 0)
Figure 14:
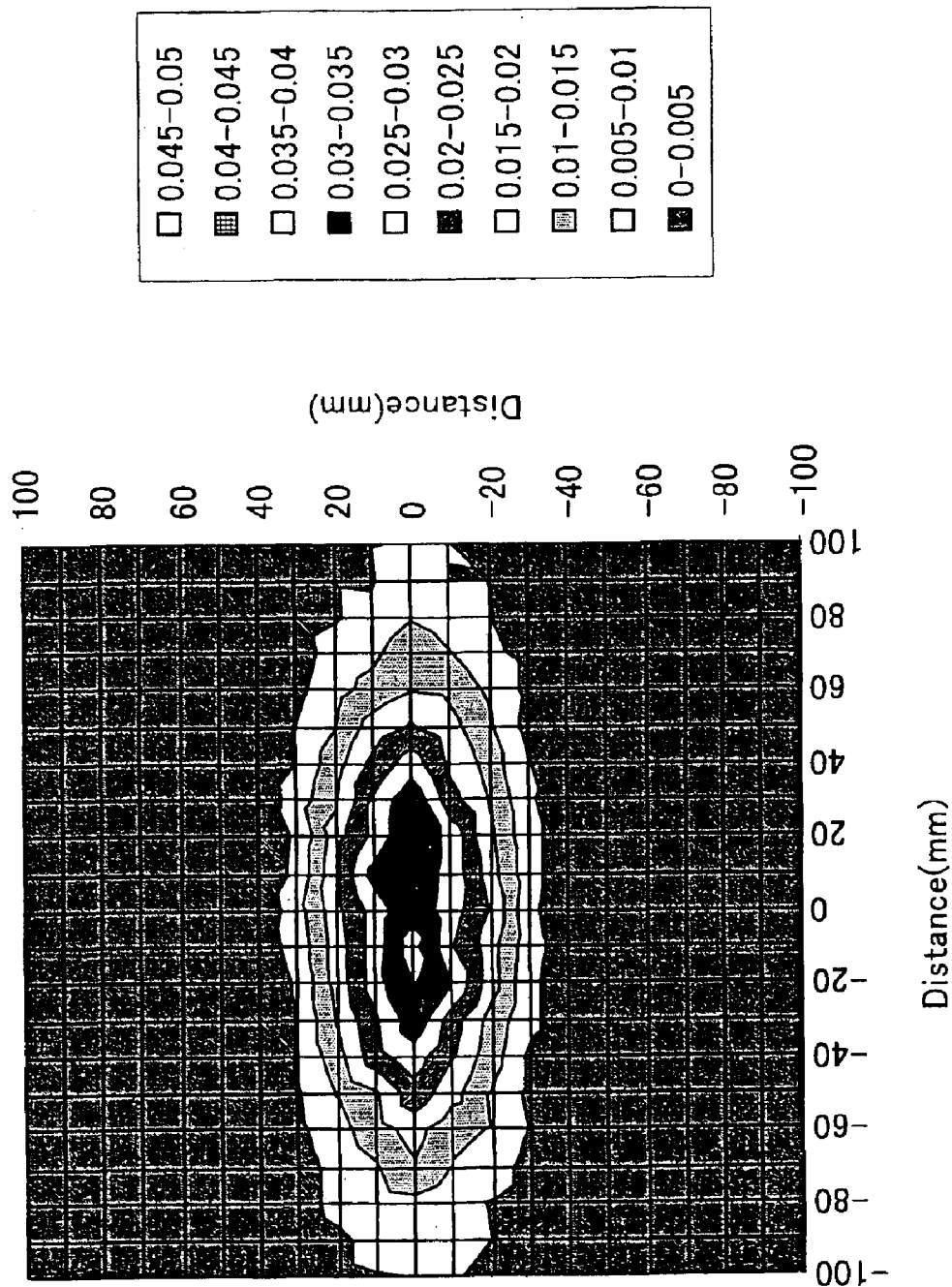
FIG. 14 is a plan view of FIG. 13.

FIGS. 13 and 14 show directivities when a quartz window 120C shown in FIG. 12 compared with the quartz lens 120B shown in FIG. 9 is used. A color figure is attached in the present application for convenience to understand. Here, a relationship between distances in X and Y directions of FIG. 12 and an irradiance of the radiation light irradiated to an object W to be treated in a case where a center of the object W to be treated is defined as (0, 0) is shown three-dimensionally in FIG. 13. FIG. 14 is a plan view of FIG. 13.

Experiment conditions of the above mentioned figures were as follows. That is, the lamp 130 having the plating part 149 formed by a gold plating film and a lamp output of 750 W is used, a distance between a lower end of the lamp 130 and an upper end of the quartz plate 121 is set as 2 mm, and a distance between the object to be treated W and a lower end of the reinforcing member 124 made by aluminum is set as 20 mm. In addition, in FIG. 12, a thickness of the quartz plate 121 is set as 5 mm, and a space between the two reinforcing parts 124 is set as 21 mm.

Referring to FIGS. 10 and 11, the irradiance at a vicinity of the center of the object to be treated is maximal and it is understood that the directivity of the quartz window 120B is improved. Furthermore, a spread of a half (which may be called as a half value width) of a maximum height, namely a maximum irradiance, has a substantially circular configuration and length of approximately 40 mm. The closer to the circle the configuration of the half value width becomes and the smaller the value of the half value width is, the more excellent the controllability is. On the other hand, referring to FIGS. 13 and 14, although the irradiance is maximal at a vicinity of the center of the object W to be treated, the value of the irradiance is not so large. Furthermore, the half value width has a substantial elliptic configuration and a maximum length of approximately 100 mm. The larger the maximal value of the irradiance is, the more excellent the directivity is. In addition, the closer to a circle the configuration of the half value width becomes and the smaller the value of the half value width is, the more excellent the controllability is. Here, the controllability represents a processing facility in a case where a desirable position of the object W to be treated is heated, which means the radiation light is irradiated and the non-desirable position of the object W to be treated is not heated. Comparing FIGS. 10 and 11 with FIGS. 13 and 14, it is understandable that both directivity and controllability of the quartz window 120B of FIG. 9 is more excellent than the quartz window 120c of FIG. 12.

It is not an essential condition for the respective kinds of the quartz window 120 of the above mentioned embodiment to be used for the lamp 130 described later for which a reflector is not necessary. In other words, it is understandable that the quartz window 120 can be used for a heat treatment apparatus having a reflector because of its strength and directivity. In such a case, a reinforcing member 124 having a configuration of a wave shape is suitable for a reflector having a configuration of a wave shape.

Figure 16:
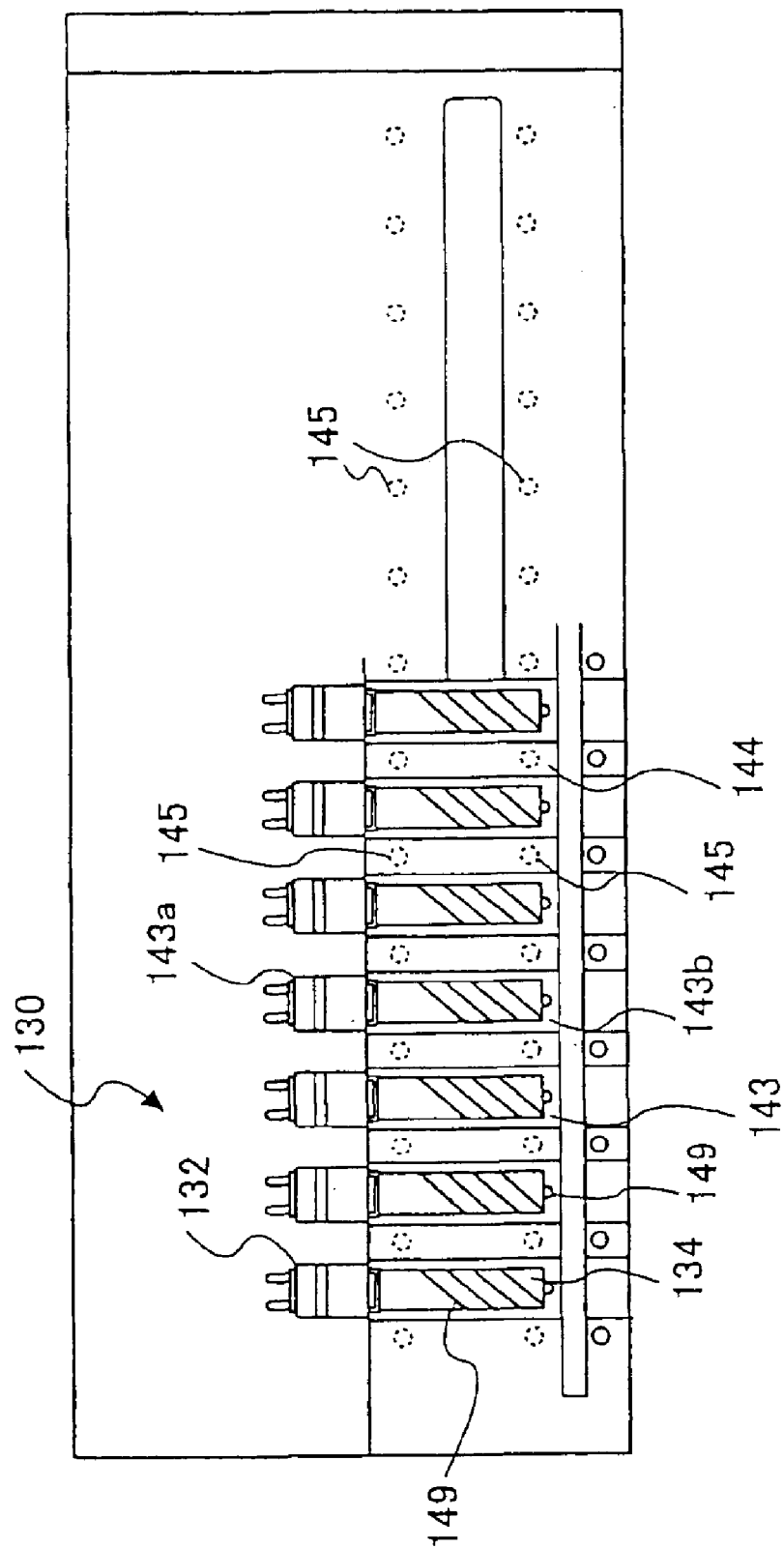
FIG. 16 is a partial cross sectional side view of the heating part 140 shown in FIG. 15.
Figure 17:
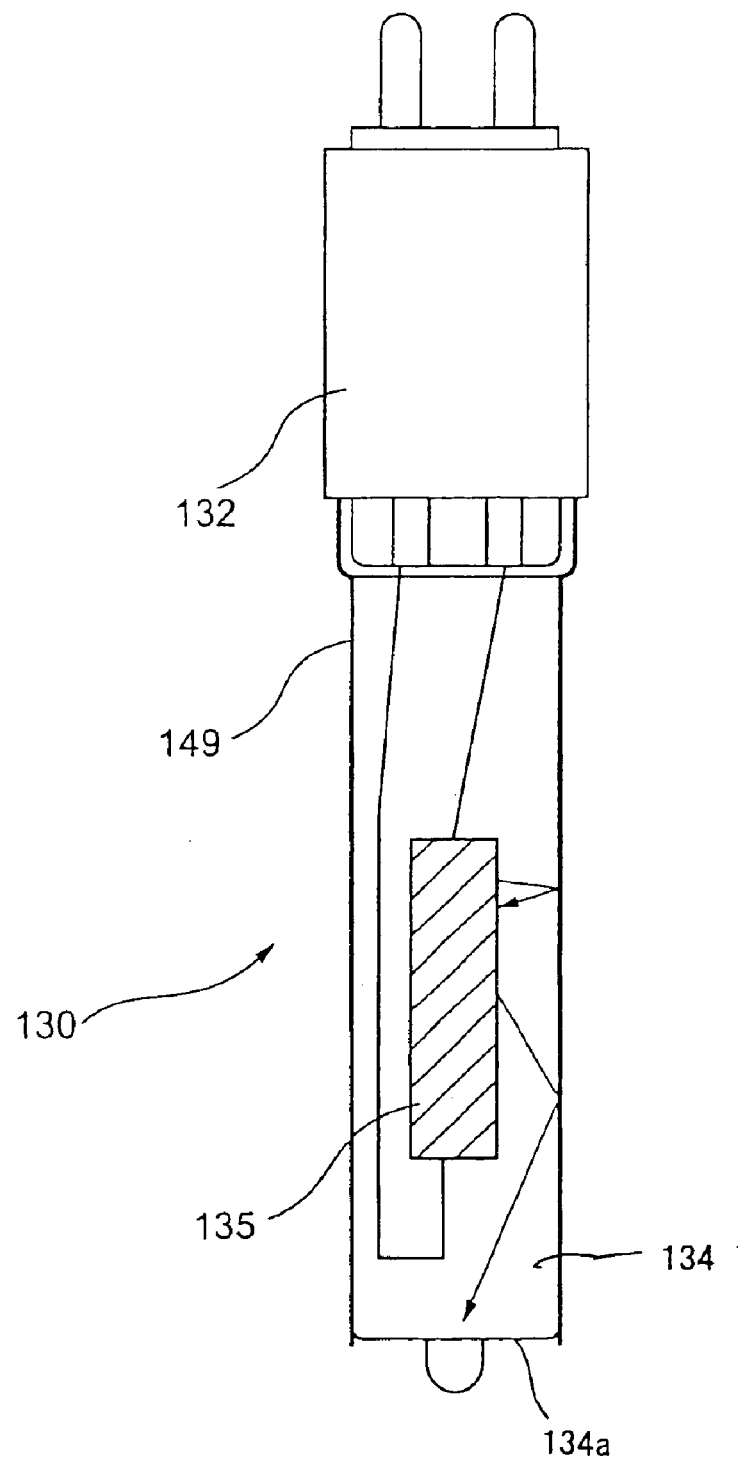
FIG. 17 is a front view of the lamp 130 of the heating part shown in FIG. 16 where the plating part is removed.
Figure 18:
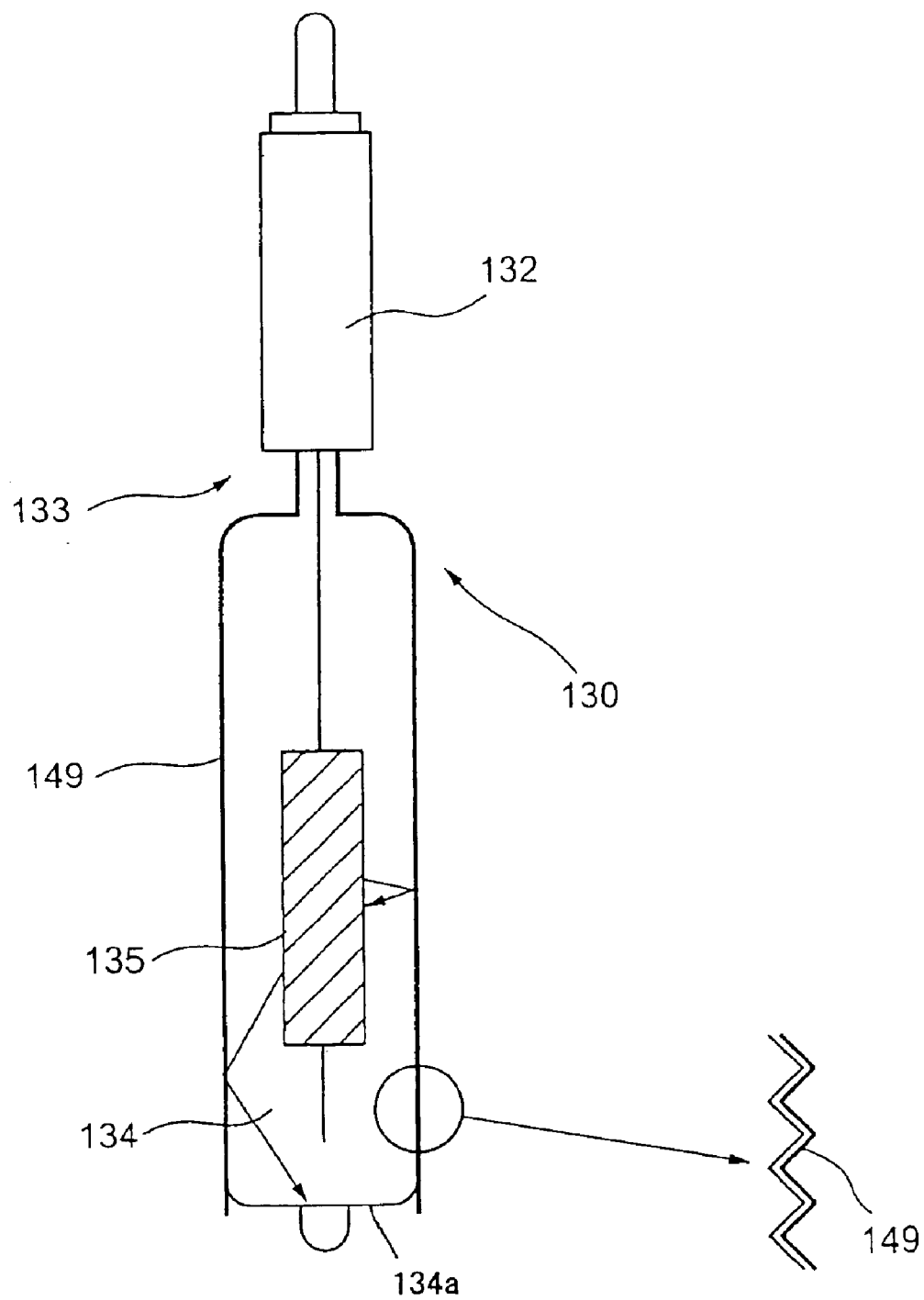
FIG. 18 is a side view of the lamp 130 shown in FIG. 17.

Next, the heating part 140 of the present invention will be described with reference to FIGS. 15 through 18. Here, FIG. 15 is a bottom view of the heating part 140. FIG. 16 is a partial cross sectional side view of the heating part 140 shown in FIG. 15. FIG. 17 is a front view of the lamp 130 shown in FIG. 16. FIG. 18 is a side view of the lamp 130 shown in FIG. 17. As shown in FIG. 15, the lamp 130 corresponds to the lens element 123 shown in FIG. 3. The heating part 140 includes the lamp 130 and a lamp support part 142.

Although the lamp 130 is a single end type in this embodiment as shown in FIG. 16, the lamp 130 may be a double end type as described later. The lamp 130 may use another heating source such as an electric heat line heater or the like. Here, the single end type means a lamp having one electrode part 132 as shown in FIG. 16. The double end type means a lamp having two end parts such as a fluorescent light. The lamp 130 functions as a heating source for heating the object W to be treated. Although a halogen lamp is used as the lamp 130 in this embodiment, other kinds of lamps can be used as the lamp 130. An output of the lamp 130 is determined by a lamp driver 310. The lamp driver 310 is controlled by the control part 300 as described later so as to supply corresponding electric power to the lamp 130.

As shown in FIG. 17, the lamp 130 includes one electrode part 132 and a light emitting part 134. The light emitting part 134 includes a filament 135 connected to the electrode 132. As shown by a dotted line in FIG. 15, in this embodiment, a plurality of the lamps 130 are arranged linearly so as to correspond to the respective lens elements 123 of the lens assembly 122 for uniformly heating the object W to be treated that has a substantially circular configuration. In addition, as described above, the reflector does not exist in a space of neighboring lamps 130 in an X direction of a same row along a Y direction in FIG. 15. Because of this, a distance between the lamps 130 in the X direction can be maintained at approximately 3 mm. Hence, as described later, it is possible to contribute to increasing of lamp density and increasing of power density based on increasing the lamp density. In addition, as described later, a linear arrangement of such as the lamp 130 can contribute to realization of a proper heat exhaust such as a heat exhaust equal to or less than 4 m³/min.

As shown in FIG. 18, a neck part 133 is formed as a part of emitting part 134 under the electrode part 132. A plating part 149 is formed around the neck part 133 as described later. Referring to FIG. 2, electric power supplied to the electrode part 132 is determined by the lamp driver 310. The lamp driver 310 is controlled by a control part 300. Referring to FIG. 17, in this embodiment, as an example, the electrode part 132 has a height of approximately 25 mm, the emitting part 124 has a height of approximately 65 mm and a width of approximately 1 mm, and the filament 135 has a length of approximately 25 mm. Referring to FIG. 18, in this embodiment, as an example, the electrode 132 has a width of approximately 5 mm and the emitting part 134 (not the neck part 133) has a width of approximately 15 mm. Nitrogen or argon and a halogen gas are enclosed in the emitting part 134. The filament 135 consists of tungsten for example. A distance between a lower part of the filament 135 and the bottom surface 134a of the emitting part 134 shown in FIG. 17 is set as a distance in a designated range. As a result of this, a designated directivity and a designated lamp service life can be secured. That is, if the distance is too small, the directivity of the lamp 130 becomes worse. If the distance is too large, the halogen cycle becomes insufficient so as to shorten the service life of the lamp.

Referring to FIGS. 15 and 16, the lamp support part 142 has a substantially rectangular parallelepiped configuration, and includes a plurality of grooves 143 having pipe configurations where respective lamps 130 are stored and the isolation wall 144.

The groove part 143 consists of a receiving part 143a where the electrode part 132 of the lamp 130 is received and a receiving part 143b where the emitting part 134 is received. The receiving part 143a connects the electrode part 132 and the lamp driver 310 shown in FIG. 2 and not shown in FIG. 16, and functions as a sealing part for sealing the electrode part 132 and the lamp driver 310. The receiving part 143b has a larger diameter than a diameter of the emitting part 134.

The isolation wall 144 has a width of 12 mm, for example. The isolation wall 144 is provided on a flow passage 128 of FIG. 3 and a reinforcing member 124 of FIG. 7 and in a space of a plurality of neighboring grooves 143 arranged in an X direction of FIG. 15.

At least one cooling pipe (not shown in the figure) 145 arranged parallel to the flow passage 128 (that is, in the direction X of FIG. 15) is brought into contact with the inner surface of the isolation walls 144. Additionally, air of about 0.3 to 0.8 m³ can be passed through the groove 143 excluding the emitting part 134 by a blower, so that a surface of the emitting part 134 is cooled, and, thereby, the lamps 130 are cooled by the air-cooling mechanism and the cooling pipe 145.

Figure 19:
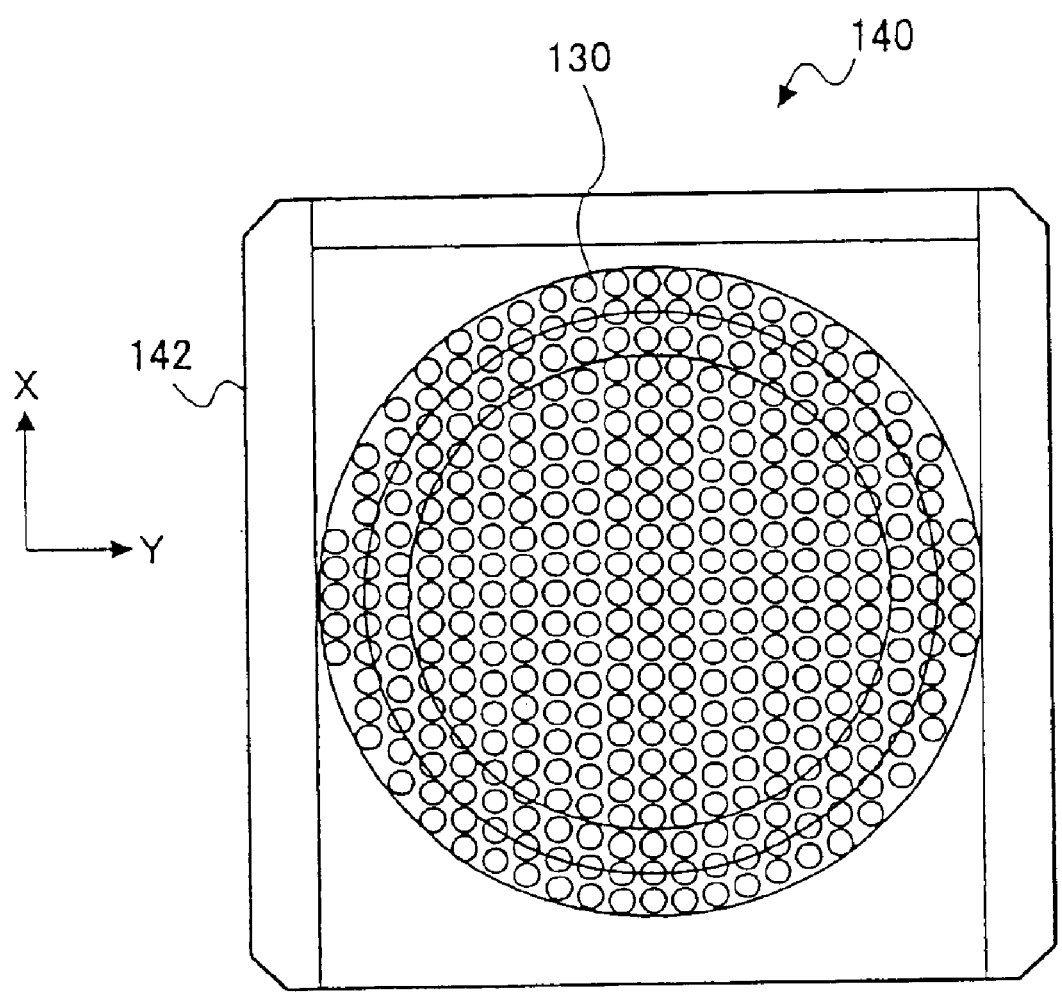
FIG. 19 is an enlarged bottom view of the heating part that is a variation of the heating part 140 shown in FIG. 19.
Figure 20:
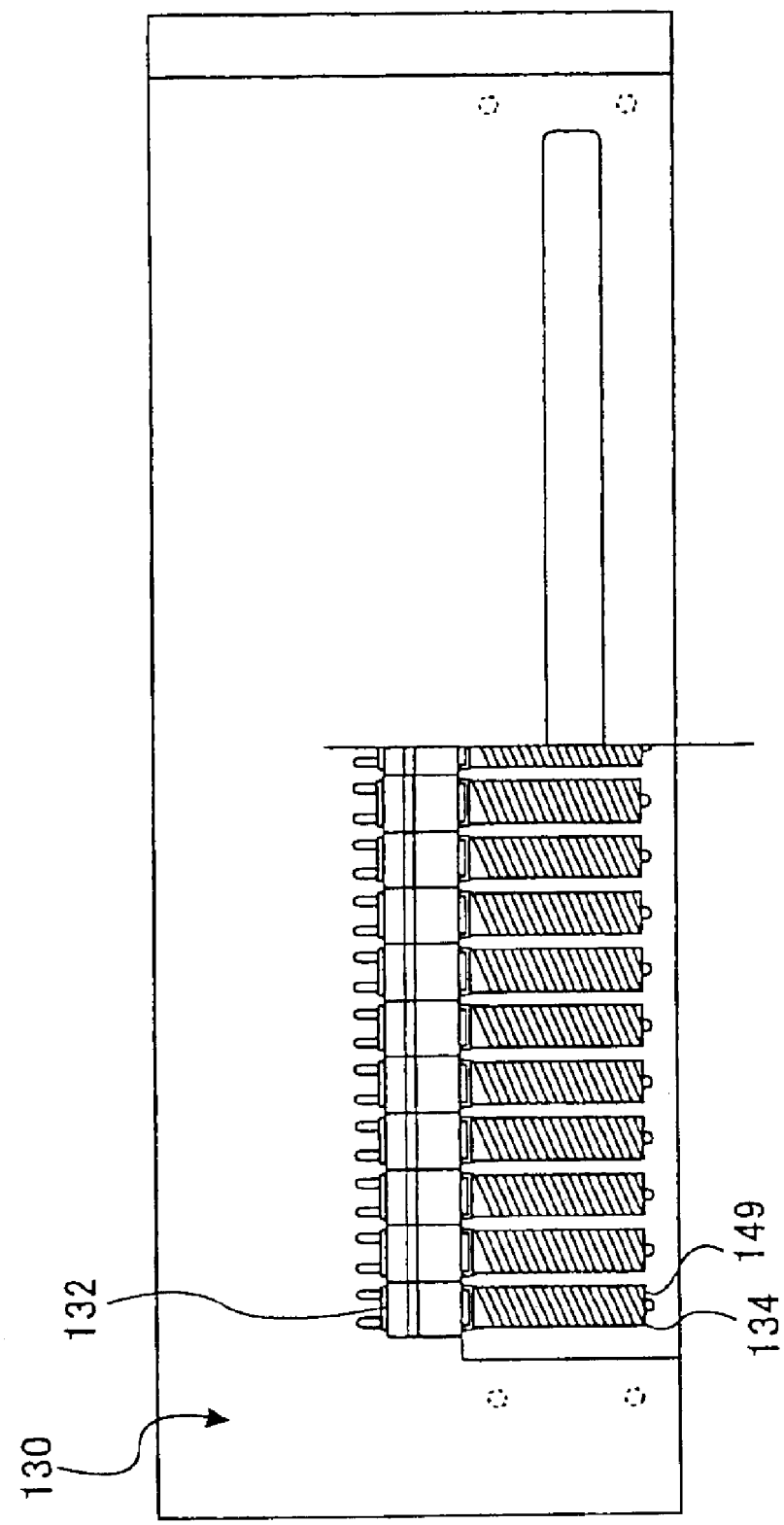
FIG. 20 is a partial cross sectional side view of the heating part shown in FIG. 19.

Alternatively, as for a heating part 140A is shown in FIGS. 19 and 20 and described later, the lamps 130 can be cooled by removing the isolation wall 144 and the cooling pipe 145 so as to use the air cooling mechanism alone. As described later, in a case where a plating part 149 is formed by a gold plating deposition, a temperature of the plating part 149 is maintained to be equal to or less than 500 degrees centigrade in order to prevent destruction due to heat such as exfoliation of gold plating. Temperature control by the cooling pipe 145 may be the same as by the cooling pipe 116. Any methods that are well known in the field of the present invention can be applied. Even if the plating part 149 has a heat resistance of more than 500 degrees centigrade, the temperature of the lamps 130 is preferably controlled at a temperature equal to or less than 900 degrees centigrade by the cooling pipe 145 and other cooling mechanisms since a loss of transparency (a phenomenon wherein the emitting part 134 turns white) will occur if the temperature exceeds 900 degrees centigrade.

In this embodiment, specifically, the isolation wall 144 and the cooling pipe 145 are provided only in an X direction of FIG. 15. A two dimensional arrangement of the cooling pipe in the X and Y directions like a conventional reflector is not applied to the present invention. Accordingly, the structure of the lamp support part 142 of this embodiment contributes to increasing the lamp density of the lamp 130 and increasing the power density based on the increasing of the lamp density. For example, although the lamp density is 0.04 pieces/cm² in a case where conventional lamp arrangement (shown in FIG. 44) has a reflector having a diameter of 50 mm for example, the lamp density of the present embodiment is 0.16 pieces/cm². In a case where the lamp 130 and the lamp support part 142 are cooled instead of providing the isolation wall 144 and the cooling pipe 145, the lamp density becomes approximately 0.04 pieces/cm² at maximum. Generally, a power density required for RTP is determined by lamp power per lamp and the lamp density. As the lamp power is large, a small density is sufficient as the lamp density. The lamp arrangement of the present embodiment can be made to correspond sufficiently to RTP requiring a future and further rapid rising temperature.

Referring to FIGS. 19 and 20, the heating part 140A that is a variation of the heating part 140 shown in FIG. 15 will be described. In the heating part 140A of this embodiment, the isolation wall 144 and the cooling pipe 145 are removed from the heating part 140 so as to improve lamp density. Since the cooling pipe is not provided at the lamp support part 142, the lamp 130 is cooled by air cooling. The heating part 140A has a lamp density approximately twice the lamp density of the heating part 140. Since the reflector that is necessary conventionally is replaced by a plating part 149, it can be understand that a high density lamp arrangement can be achieved.

Figure 21:
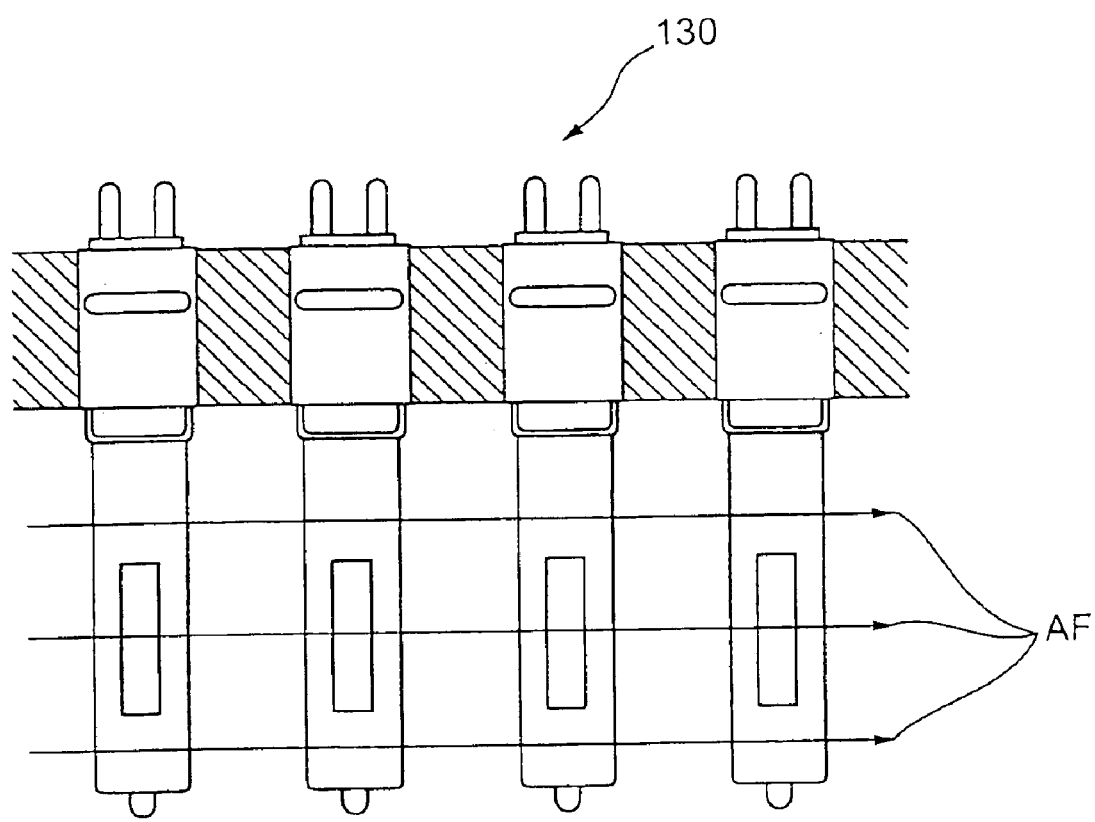
FIG. 21 is a cross sectional view for explaining a cooling mechanism of the lamp 130 arranged in an X direction of the heating part 140 of FIG. 15.
Figure 22:
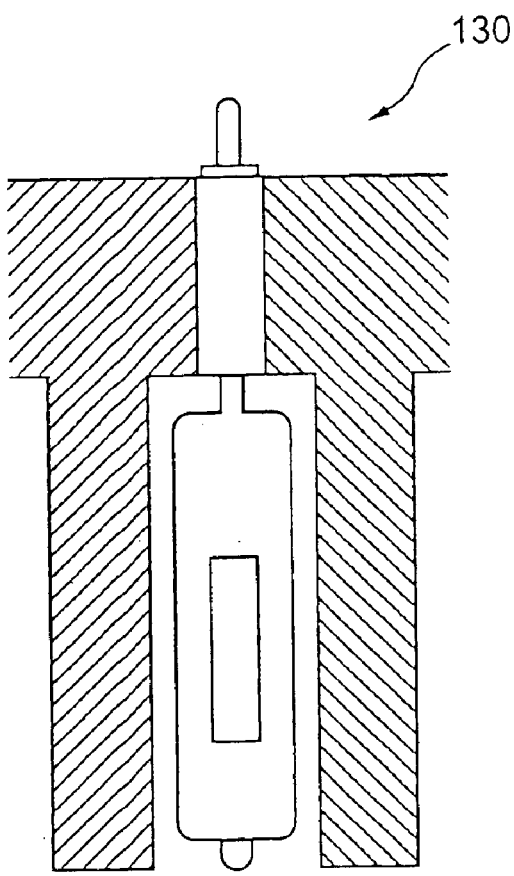
FIG. 22 is a side view of the lamp 130 shown in FIG. 21.
Figure 23:
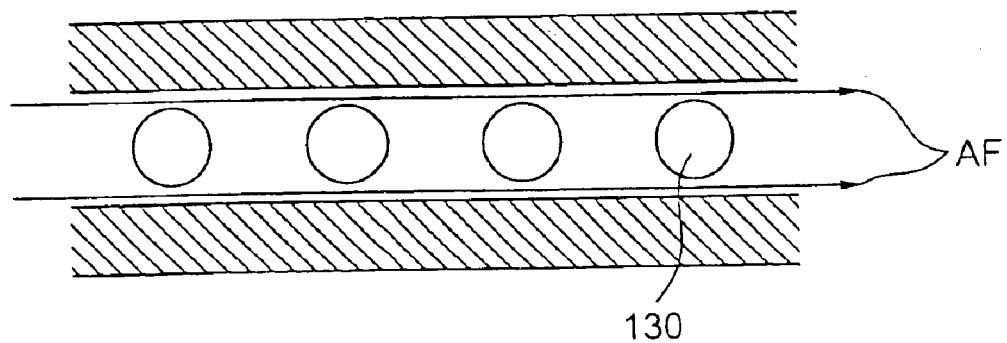
FIG. 23 is a plan view of the lamp 130 shown in FIG. 21.

Referring to FIGS. 21 through 23, a cooling mechanism of the lamp 130 will be described. Here, FIG. 21 is a cross sectional view for explaining the cooling mechanism of the lamp 130 arranged in an X direction of the heating part 140 of FIG. 15. FIG. 22 is a side view of the lamp 130 shown in FIG. 21. FIG. 23 is a plan view of the lamp 130 shown in FIG. 21. As shown in the above mentioned figures, a plurality of the lamps 130 arranged in a same row, namely linearly arranged along an X direction shown in FIG. 15, is heat-exhausted (cooled) by a blower connected to the lamps 130 (the emitting parts 134 of the lamps 130) in series.

Efficiency of exhaust by the blower is good, for example less than 4 m$^3$/min. In such a heat exhaust case, exhaust to the outside of the heat treatment apparatus 100 may be acceptable and circulation of the heat may be acceptable. In a case of the circulation of the heat, typically a radiator is further provided at a passage so as to cool hot air and only a little load on the exhaust system is required for good efficiency of the exhaust.

The plating part 149 has a function to reflect a heat radiation light of the lamp 130 inside the emitting part 134 at a high reflectivity. Since the reflection part having a high reflectivity is provided at the emitting part 134, directivity to the object W to be treated (of the radiation light emitted by the filament 135) of the emitting part 134 is heightened. As a result of this, in the plating part 149, it is not necessary to provide the reflector that is conventionally required to be provided outside of the emitting part. Since a no reflector is required, it is possible to arrange the plurality of the lamps at a high density. For example, a distance between the lamps 130 neighboring in the X direction of FIG. 15 can be set at approximately 3 mm. In addition, the lamp density can be set as four times (for example, 0.16 pieces/cm$^2$) of a lamp density having a reflector of an inclination angle of 45 degrees (for example, 0.04 pieces/cm$^2$). Because of this, it is possible to increase the power density as compared with a case where the reflector is provided. As a result of this, the heat treatment apparatus 100 of the present invention is suitable for RTP for rapid rising temperature.

The plating part 149 except the bottom surface 134a of the emitting part 134 shown in FIG. 17, is formed at the emitting part 134 including the neck part 133 by a plating method or other method. Thus, the plating part 149 is provided at a part of the emitting part 134 except the bottom part 134a facing to the object W to be processed, namely provided at a part where the emitting part 134 does not face to the object W to be processed, so that the directivity can be improved without blocking direct light radiation from the filament to the object to be processed and light radiation that is a result of reflection by the plating part 149.

The plating part 149 is formed by a metal film such as gold or silver by which the radiation light is reflected at a high reflectivity. For example, in a case where the plating part 149 is formed by a gold plating film, the plating part 149 is formed by electric plating such as hard gold plating or pure gold plating. In a case where the plating part 149 has a thickness of approximately 10 μm, it is sufficient to prevent the light from the emitting part 134 from leaking. According to the present invention, the plating part 149 improves a directivity of the lamp 130, but the present invention does not limit the range of the high reflectivity.

Figure 24:
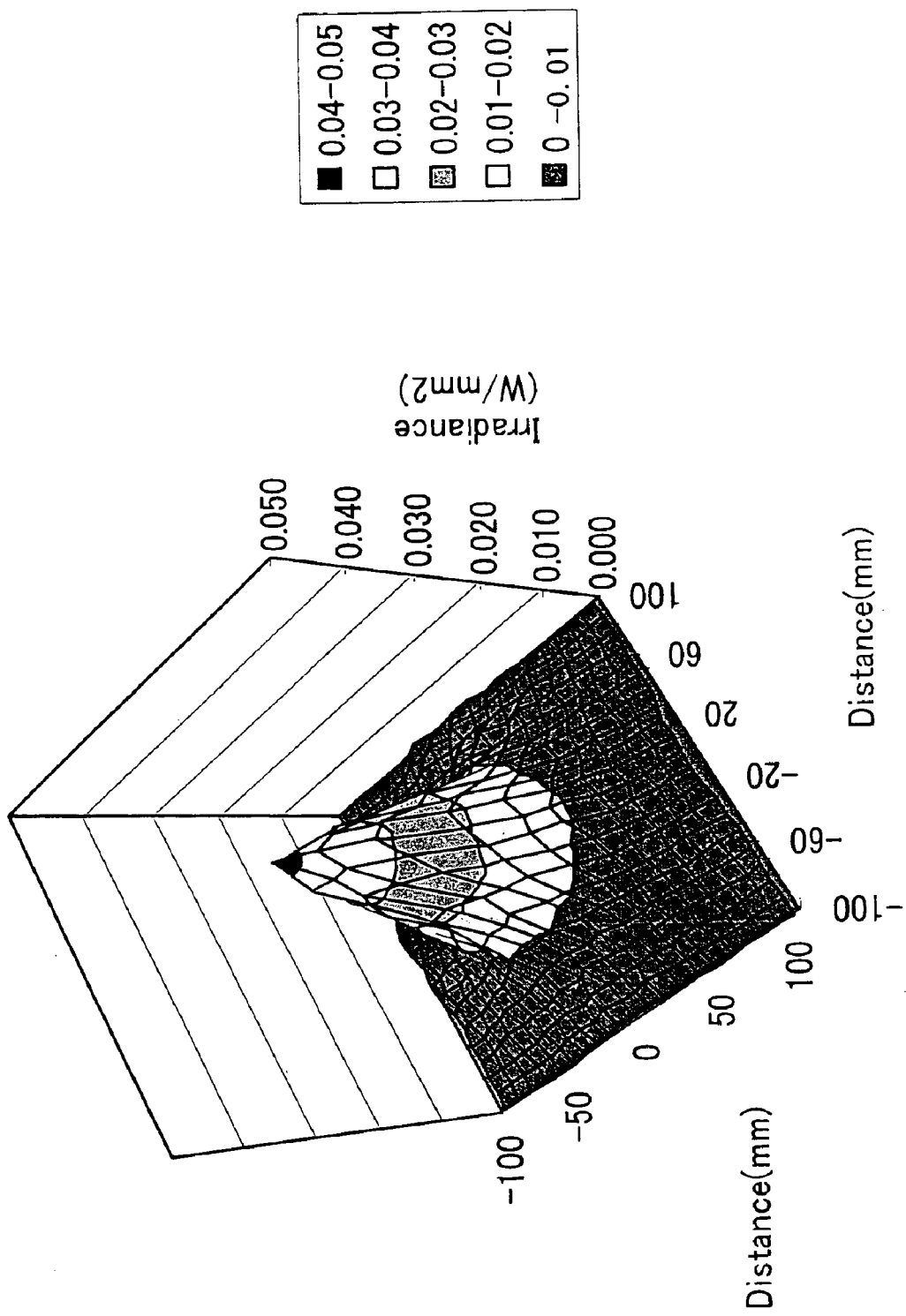
FIG. 24 three-dimensionally illustrates a relationship between distances in X and Y directions of FIG. 18 and an irradiance of the radiation light irradiated to an object W to be treated in a case where a center of the object W to be treated is defined as (0, 0)
Figure 25:
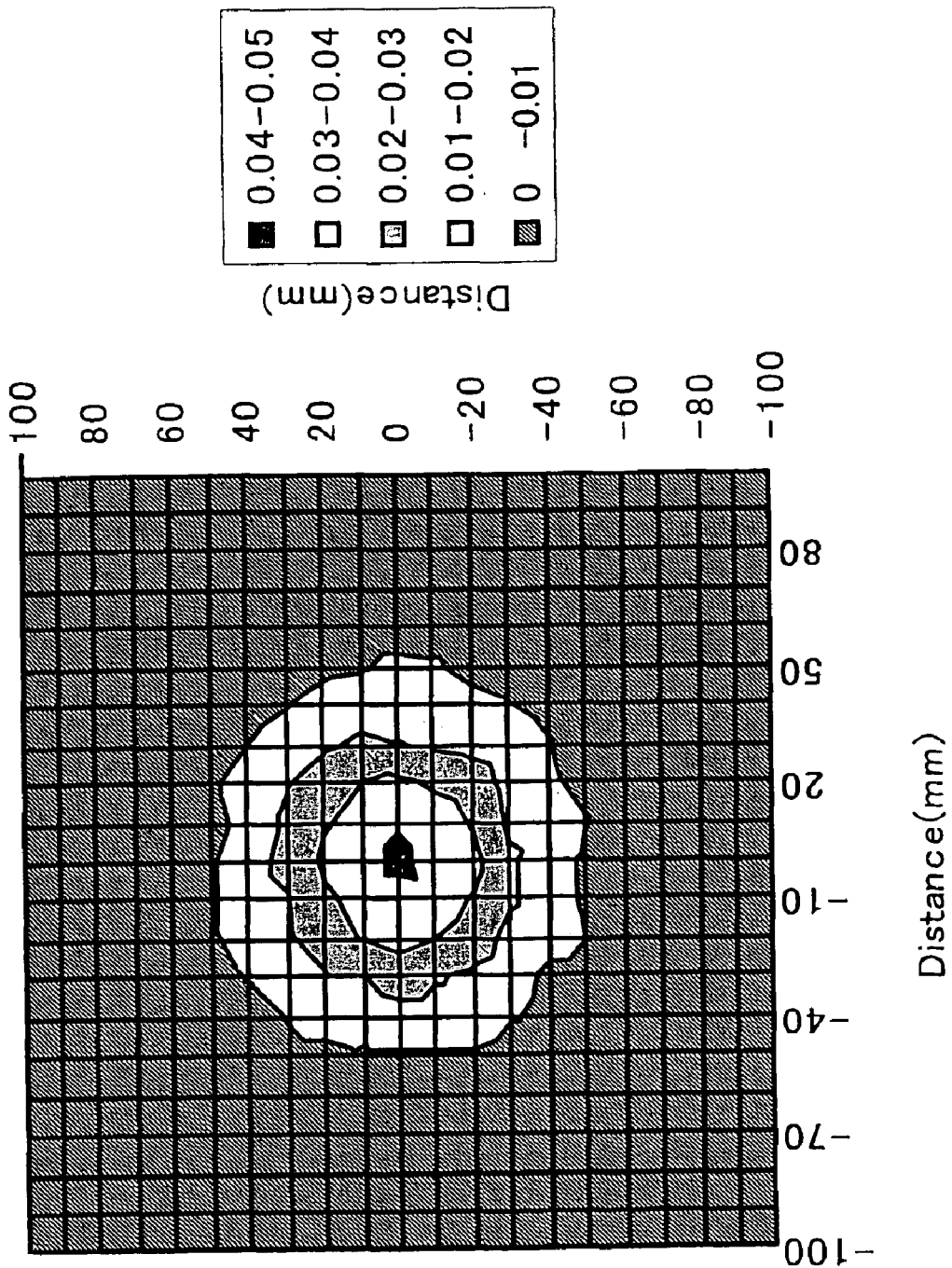
FIG. 25 is a plan view of FIG. 24.

FIGS. 24 and 25 show directivities when the lamp 130 having the plating part 149 formed by a gold plating film is used. A color figure is attached in the present application for convenience to understand.

Here, a relationship between distances in X and Y directions of FIG. 15 and an irradiance of the radiation light irradiated to an object W to be treated in a case where a center of the object W to be treated is defined as (0, 0) is shown three-dimensionally in FIG. 24. FIG. 25 is a plan view of FIG. 24.

Experiment conditions of the above mentioned figures were as follows. That is, the lamp 130 having the plating part 149 formed by a gold plating film and a lamp output of 750 W is used, the chamber room 110 is maintained to have an atmospheric environment, a distance between a lower end of the lamp 130 and an upper end of a pipe quartz window formed by only a quartz plate 121 having a thickness of 3 mm is set as 2 mm, and a distance between the object W to be treated and a lower end of the quartz window is set as 20 mm.

Figure 50:
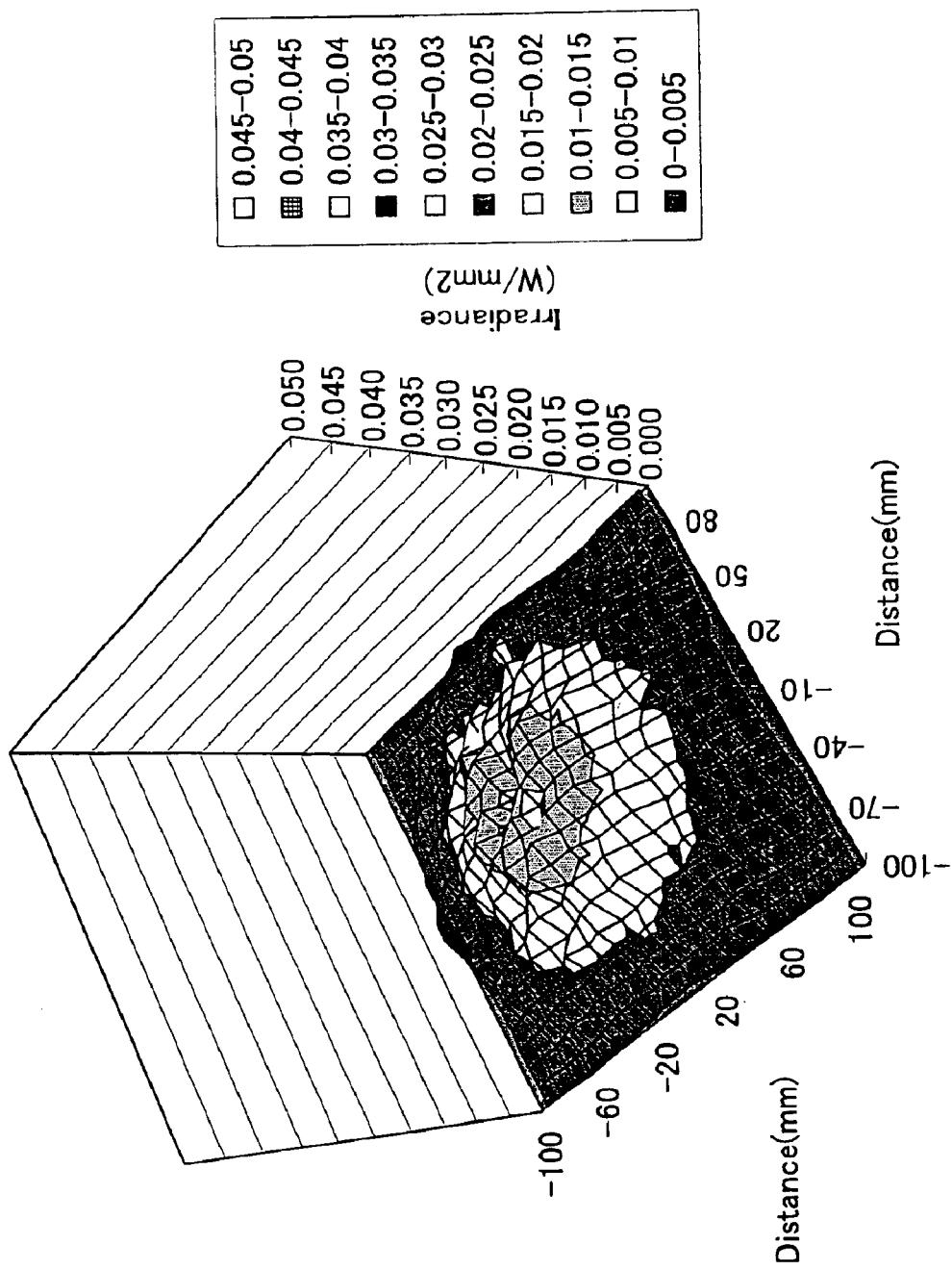
FIG. 50 three-dimensionally illustrates a relationship between distances in X and Y directions of FIG. 18 and an irradiance of the radiation light irradiated to an object W to be treated in a case where a conventional single end lamp is used and a center of the object W to be treated is defined as (0, 0)
Figure 51:
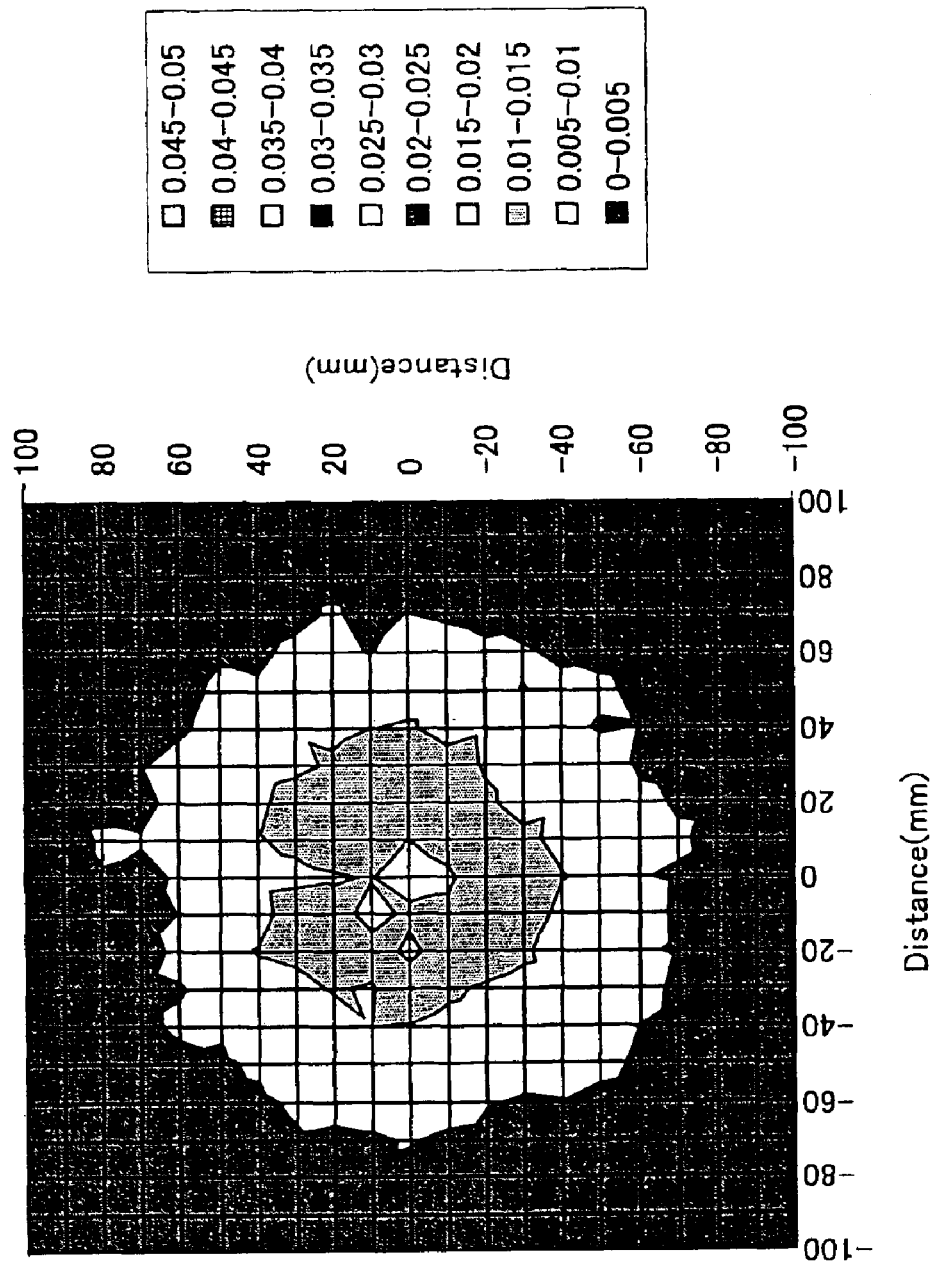
FIG. 51 is a plan view of FIG. 50.

FIGS. 50 and 51 show directivities when a conventional single end lamp not having a metal forming film is used. A color figure is attached in the present application for convenience to understand. A relationship between distances in X and Y directions of FIG. 15 and an irradiance of the radiation light irradiated to an object W to be treated, in a case where the conventional single end lamp not having a metal forming film is used and a center of the object W to be treated is defined as (0, 0) is shown three-dimensionally in FIG. 50.

Experiment conditions of the above mentioned figures were as follows. That is, the lamp 130 having the plating part 149 formed by a gold plating film and a lamp output of 750 W is used, the chamber room 110 is maintained to have an atmospheric environment, a distance between a lower end of the lamp 130 and an upper end of a pipe quartz window formed by only a quartz plate 121 having a thickness of 3 mm is set as 2 mm, and a distance between the object W to be treated and a lower end of the quartz window is set as 20 mm.

Referring to FIGS. 24 and 25, it is understandable that irradiance is maximal at a vicinity of the center of the object W to be processed and the plating part 149 improves directivity. Furthermore, the half value width has a substantially circular configuration and a length of approximately 40 mm. On the other hand, referring to FIGS. 50 and 51, although irradiance is maximal at a vicinity of the center of the object W to be processed, the value of the irradiance is not so large. Furthermore, the half value width has a substantially elliptic configuration and a length of approximately 80 mm at a maximum.

Comparing FIGS. 24 and 25 with FIGS. 50 and 51, it is understandable that both directivity and controllability of the lamp 130 having the plating part 149 of the present invention is more excellent than these of the conventional lamp not having the plating part.

It is preferable that a concave and convex part be provided at a part covered with the plating part 149 in the emitting part 134 as shown in an expanded view. Because of this, a ratio of distribution of the light reflected by the plating part 149 to the object W to be processed can be heightened, without repeating reflecting the light reflected by the plating part 149 with a pipe side surface of the emitting part 134. The concave and convex parts can be formed by a surface process such as polishing with sand blasting and corrosion based on an encroachment in a chemical solution.

Figure 26:
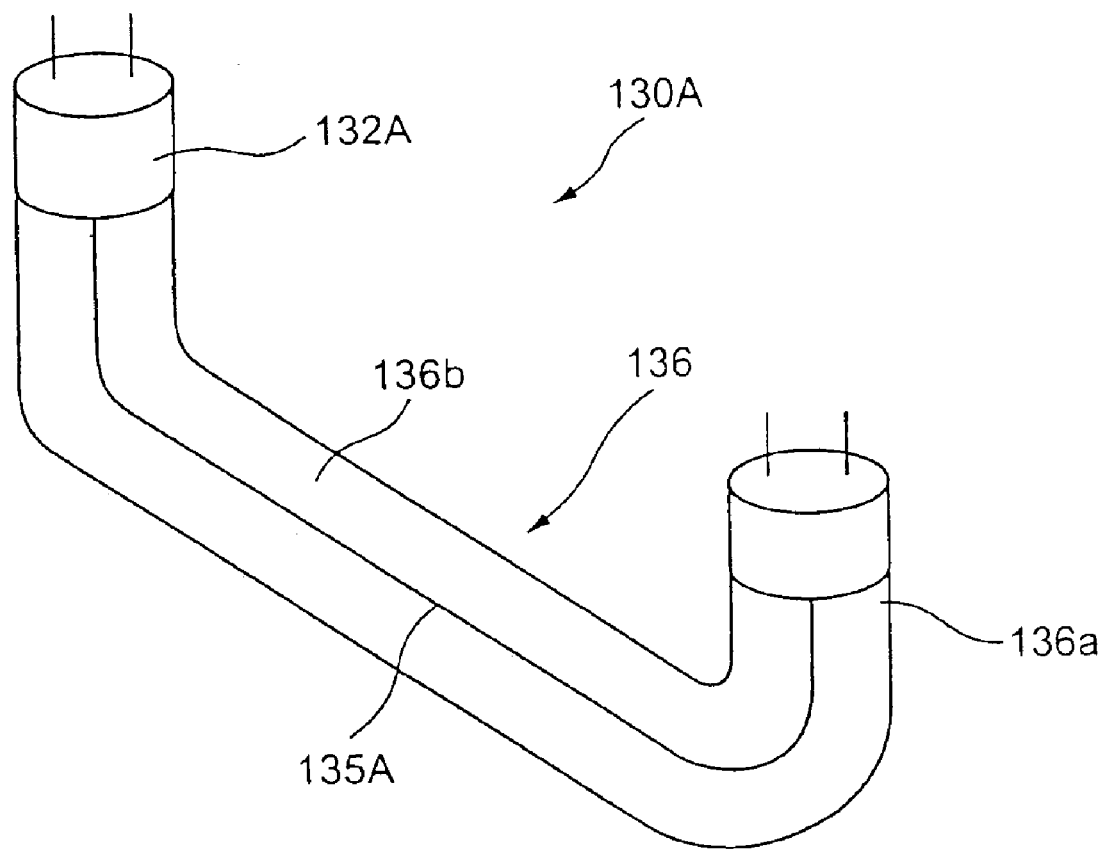
FIG. 26 illustrates a variation of the heating part of the heat treatment apparatus shown in FIG. 2 and is a perspective view of the double end lamp 130A where the plating part 149A is removed.
Figure 27:
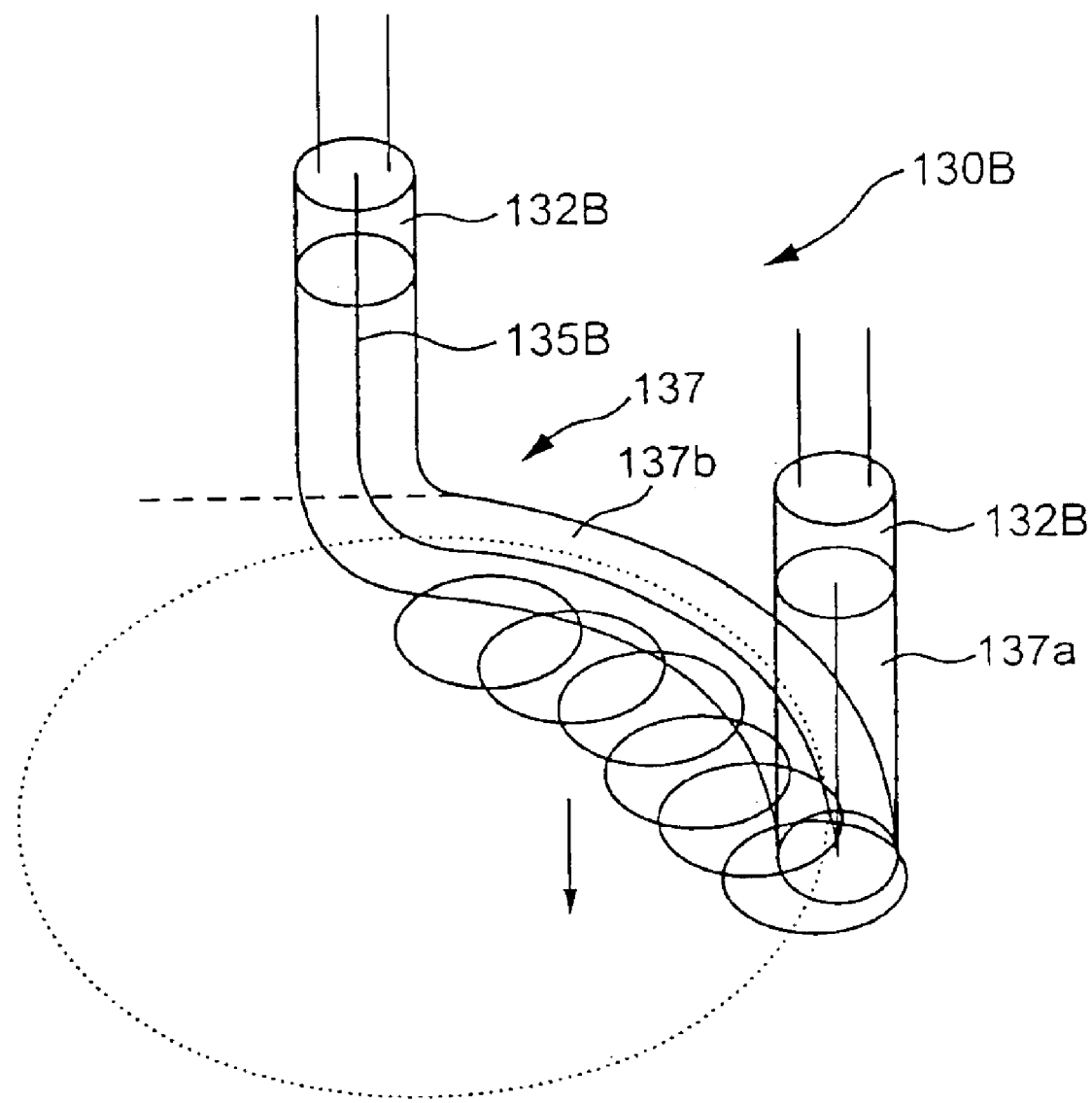
FIG. 27 illustrates another variation of the heating part of the heat treatment apparatus shown in FIG. 2 and is a perspective view of the double end lamp 130B where the plating part 149B is removed.
Figure 28:
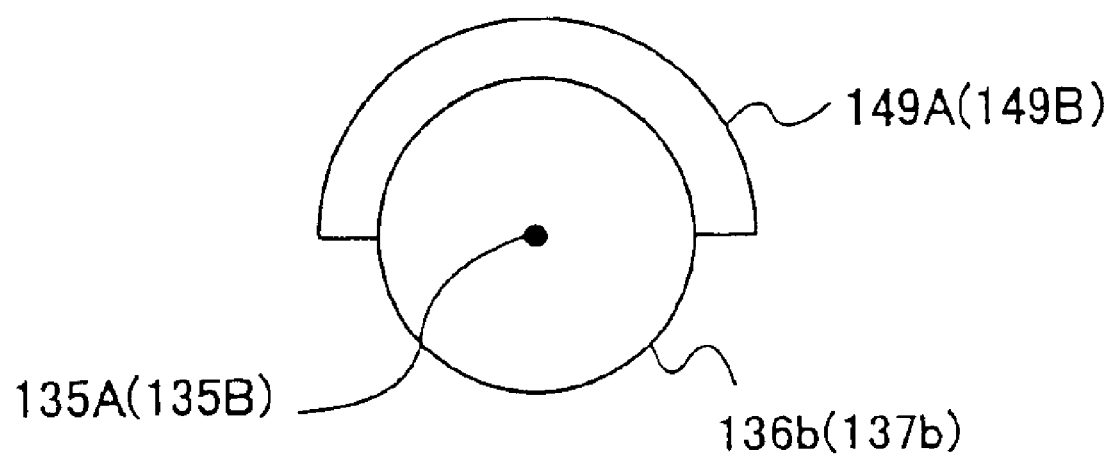
FIG. 28 is a cross sectional view for explaining a coverage of the lamp 130A of FIG. 26 and the lamp 130B of FIG. 26 with the plating parts 149A and 149B.
Figure 29:
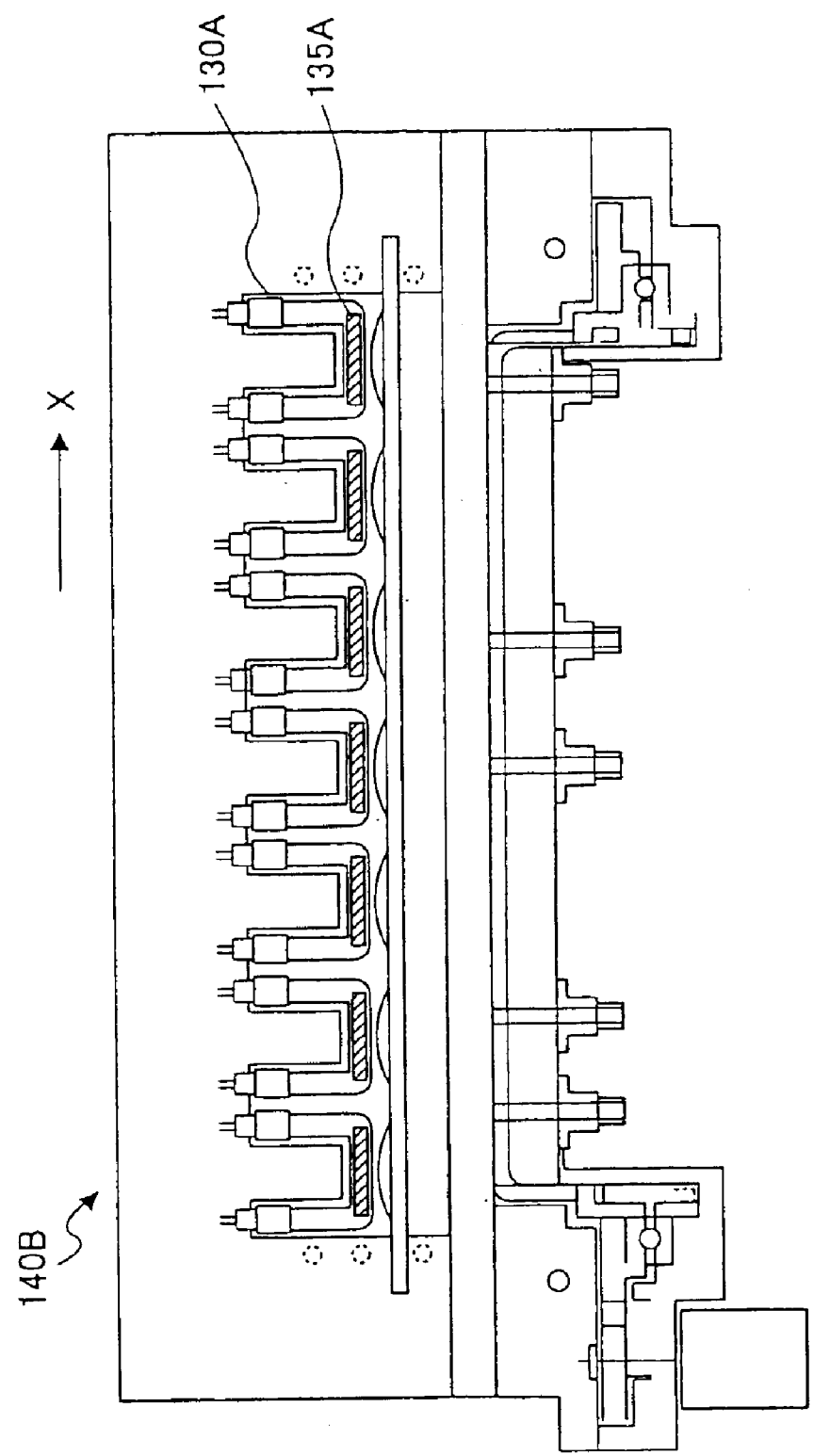
FIG. 29 is a vertical cross sectional view along an X direction of FIG. 15 of the heating part 140B having the lamp 130A of FIG. 26.
Figure 30:
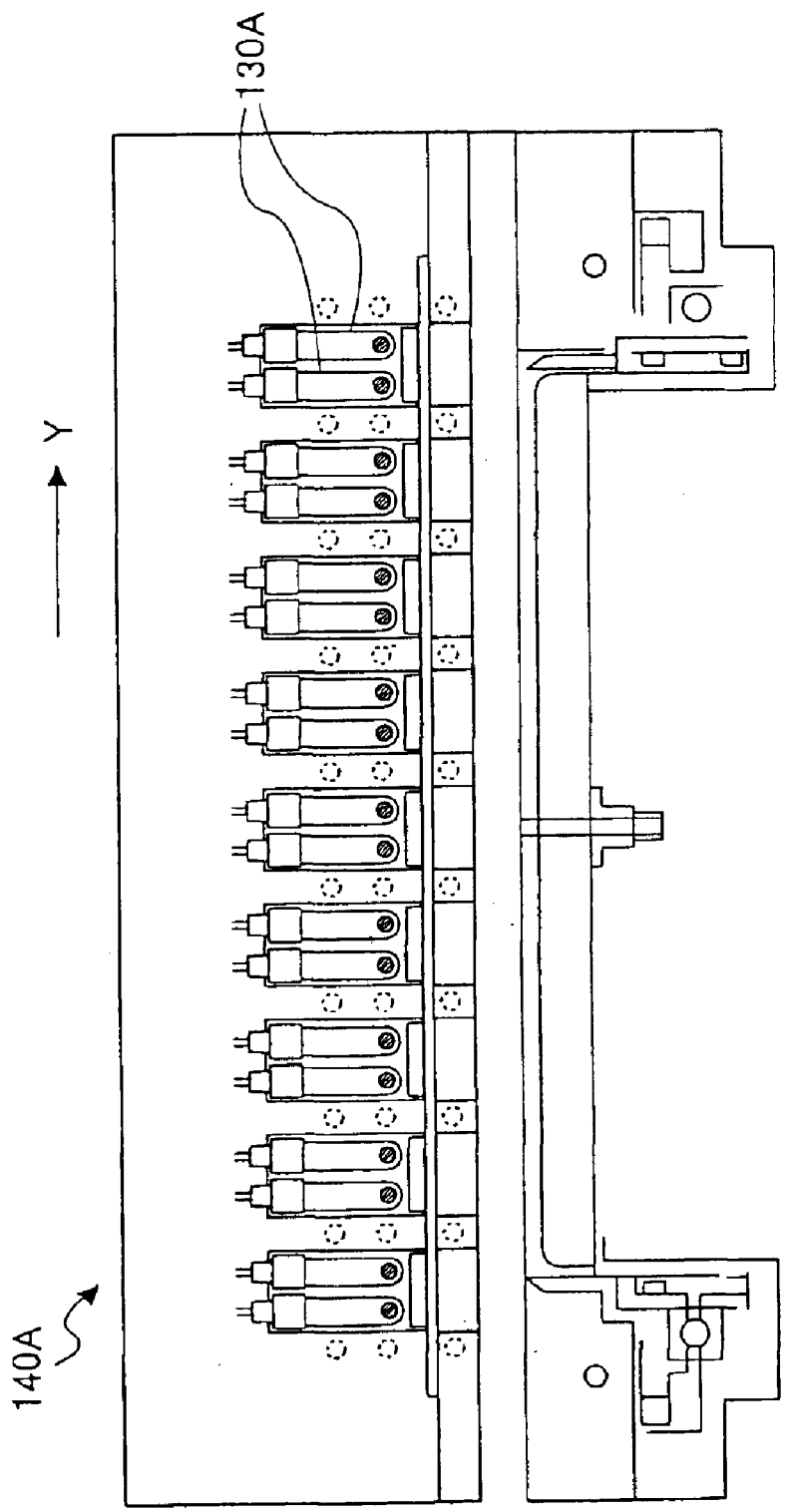
FIG. 30 is a horizontal cross sectional view along a Y direction of FIG. 15 of the heating part 140B of FIG. 29.

As described above, the lamp 130 may be a double end type. Next, with reference to FIGS. 26 through 30, an embodiment of a case where the lamp 130 is replaced with a double end type lamp will be described. FIG. 26 is a perspective view of the double end lamp 130A where the plating part 149A is removed. FIG. 27 is a perspective view of the double end lamp 130B where the plating part 149B is removed. FIG. 28 is a cross sectional view for explaining a coverage of the lamp 130A of FIG. 26 and the lamp 130B of FIG. 26 with the plating parts 149A and 149B. FIG. 29 is a vertical cross sectional view along an X direction of FIG. 15 of the heating part 140B having the lamp 130A of FIG. 26. FIG. 30 is a horizontal cross sectional view along a Y direction of FIG. 15 of the heating part 140B of FIG. 29.

FIG. 26 shows one of the double end lamps 130A having a linear pipe configuration that is provided in an X direction of FIG. 15. FIG. 27 shows one of the double end lamp 130B having an arc pipe configuration that is provided so as to form the same arc as the dotted line of FIG. 12.

In a case where the lamp 130 is exchanged to be the lamp 130A or 130B, a configuration of the lamp support part 142 is changed to a part supporting the lamp 130A or 130B. For example, the lamp support part 142 includes a plurality of vertical through holes where the electrode part 132A or 132B and a vertical part 136a or 137a are received, and a plurality of horizontal grooves having a linear configuration and concentric circle configuration where a horizontal part 136b or 137b is received.

FIG. 29 and FIG. 30 respectively show cross sectional views along X and Y directions of the heating part 140B where a couple of the lamps 130A are arranged in a Y direction of FIG. 15.

The lens arranged directly under the lamp 130A has a length of the emitting part 136 described later and shown in FIG. 29 and a width where a couple of the lamps 130A described later and shown in FIG. 30 are covered. Since one skilled in the art can understand a modification of the lens based on a disclosure of this patent application, illustration thereof will be omitted.

As shown in FIG. 26, the lamp 130A includes two of electrodes 132A and an emitting part 136. The emitting part 136 includes a filament 135A connected to the two of the electrodes 132A. Similarly, as shown in FIG. 27, the lamp 130B includes two of electrodes 132B and an emitting part 137. The emitting part 137 includes a filament 135B connected to the two of the electrodes 132B. Electric power supplied to the electrodes 132A and 132B is determined by a lamp driver 310 shown in FIG. 1. The lamp driver 310 is controlled by the control part 300. A space between the electrode part 132, the lamp driver 310 and the electrode parts 132A and 132B is sealed.

As shown in FIG. 26, the emitting part 136 includes a vertical part 136a and a horizontal part 136b having a linear configuration and bent at 90 degrees from the vertical part 136a. Furthermore, as shown in FIG. 27, the emitting part 137 includes a vertical part 137a and a horizontal part 137b having a linear configuration and bent at 90 degrees from the vertical part 137a. The double end lamp applicable to the present invention is not limited to the lamp 130A and 130B, but includes a lamp having the horizontal parts 136b and 137b, which have optional configurations such as whirl configuration, and a triangle configuration. An angle between the vertical part and the horizontal part is not limited to 90 degrees.

The horizontal part 136b is provided in an X direction at a part where the lamps 130 of FIG. 15 are arranged. The length of the horizontal part 136b may be equal to or smaller than a distance (for example a space E) between a circle situated at the most external circumference and lamps 130 situated at both ends defined by an optical lamp position in the Y direction (for example a row indicated by an arrow D in FIG. 15). In a case of the former, only one lamp 130A is provided at the lamp position. In a case of the latter, a plurality of the lamps 130A are provided at the lamp position. The horizontal parts 136b of the lamps 130A at the different lamp positions with regard to the Y direction may be same or different.

The horizontal part 137b is arranged so as to form a circle concentric with the circle indicated by the dotted line in FIG. 15. The dotted line in FIG. 27 forms a concentric circle with the dotted line in FIG. 15. The length of the horizontal part 137b is defined by a circumference of the concentric circle with the circle indicated by a doted line in FIG. 15 (for example, circle Q) and a number of lamps 130B that are arranged. The curvature radii of the horizontal part 137b of the lamp 130B arranged at different concentric circles are different.

In FIGS. 26 and 27, the plating parts 149A and 149B are removed from the lamp 130A and 130B for convenience. However, actually, as shown in FIG. 28, the plating parts 149A and 149B are covered at a position of the emitting parts 136 and 137 so as not to face the object W to be processed. The plating part 149A is covered with a whole surface of a side surface of the vertical part 136a and an upper part of the horizontal part 136b of the lamp 130A. The plating part 149B is covered with a whole surface of a side surface of the vertical part 137a and an upper part of the horizontal part 137b of the lamp 130B. As well as the plating part 149, the plating parts 149A and 149B have functions to reflect a heat radiation light of the lamps 130A and 130B inside the emitting parts 136 and 137 at high reflectivity. Since the reflection part having a high reflectivity is provided at the emitting parts 136 and 137, directivity to the object W to be treated (of the radiation light emitted by the filaments 135A and 135B) of the emitting parts 136 and 137 is heightened. As a result of this, in the plating parts 149A and 149B, it is not necessary to provide the reflector that is conventionally required to be provided outside of the emitting part.

Since a reflector is not required to be used, it is possible to arrange the plurality of the lamps at a high density. For example, a distance between the lamps 130 neighboring in the X direction of FIG. 15 can be set at approximately 3 mm. In addition, the lamp density can be set as four times of a lamp density having a reflector of an inclination angle of 45 degrees. Because of this, it is possible to increase the power density as compared with a case where the reflector is provided and the heat treatment apparatus 100 of the present invention is suitable for RTP for rapid rising temperature.

Figure 31:
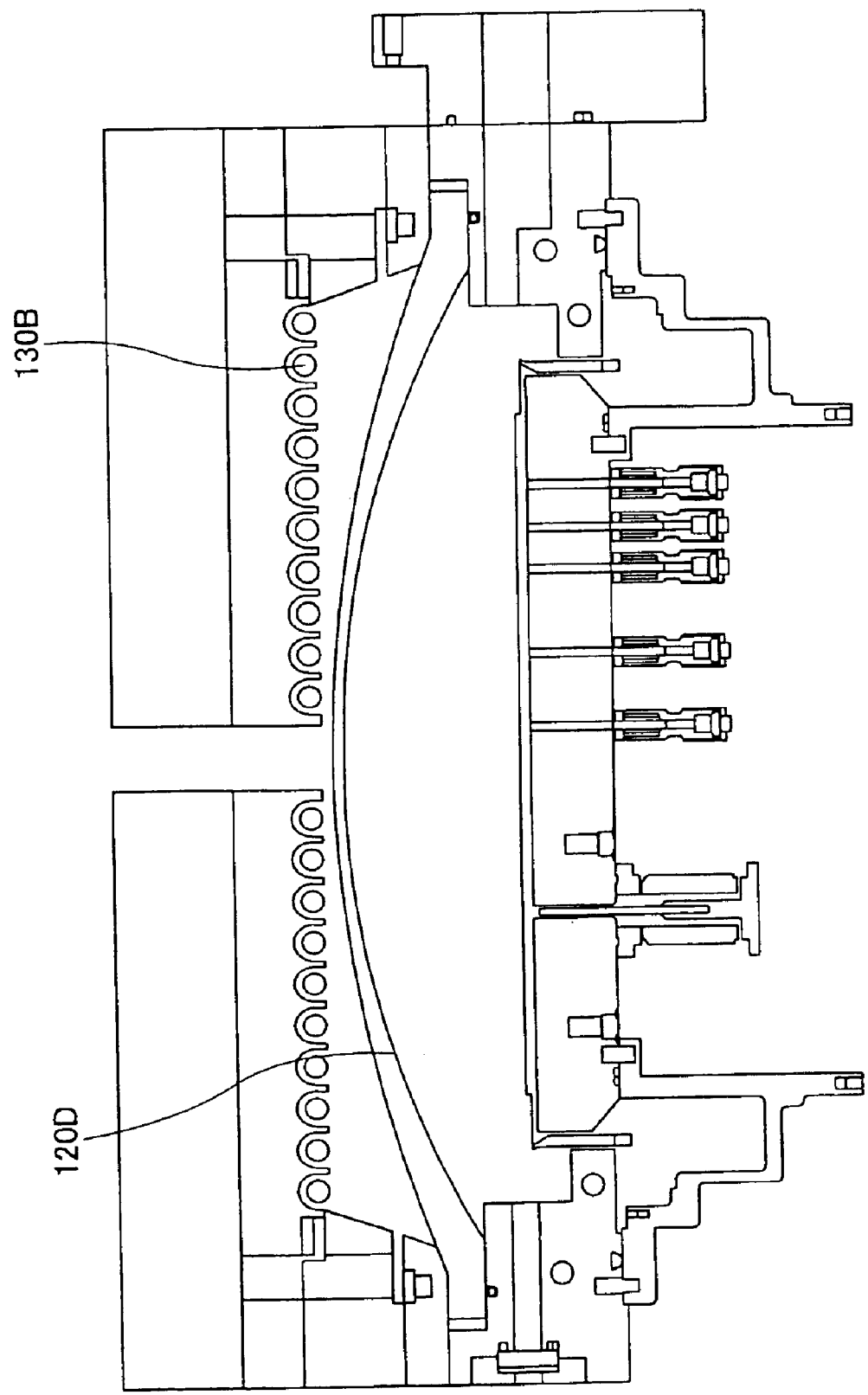
FIG. 31 is a cross sectional view of the heating part of the heat treatment apparatus where the lamp 130B shown in FIG. 27 is applied.

FIG. 31 is a cross sectional view of the heating part of the heat treatment apparatus where the lamp 130B shown in FIG. 27 is applied. In this heat treatment apparatus, the quartz window 120D is thin-walled and pressure-resistant and of a curve configuration so as to prevent heat stress based on respective differences of temperature generated due to rising temperature.

Figure 32:
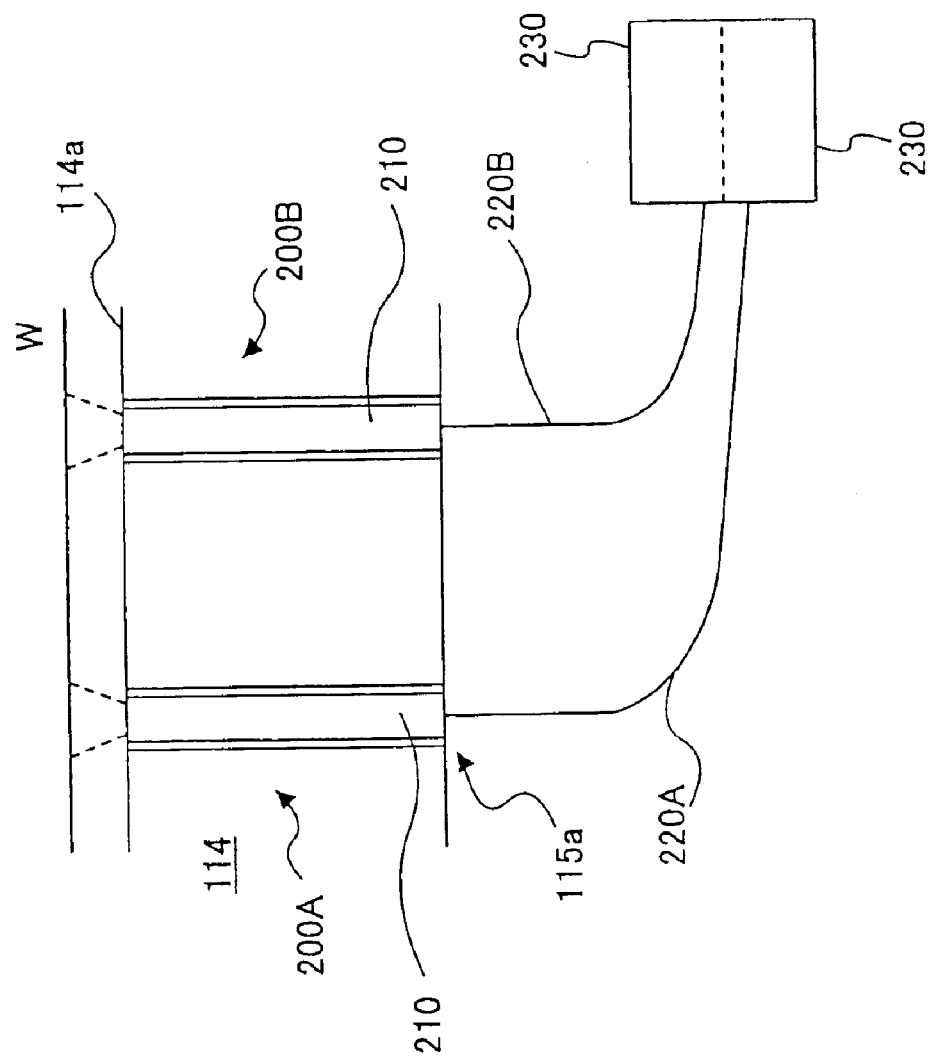
FIG. 32 is a schematic expanded cross-sectional view of two kinds of the radiation thermometers 200A and 200B and a vicinity thereof.
Figure 33:
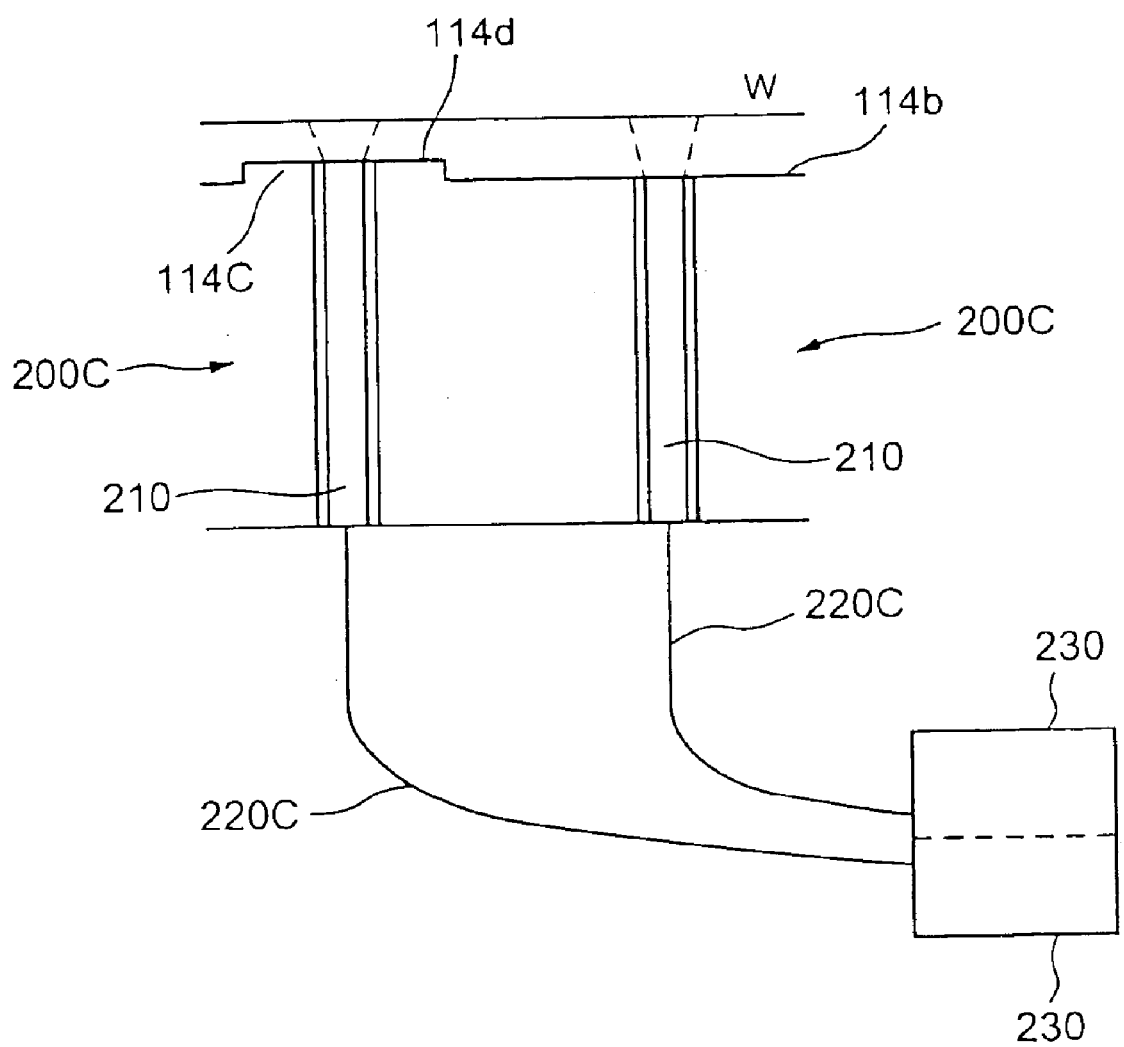
FIG. 33 is a schematic expanded cross-sectional view of two of same kinds of the radiation thermometers 200C and a vicinity thereof.
Figure 34:
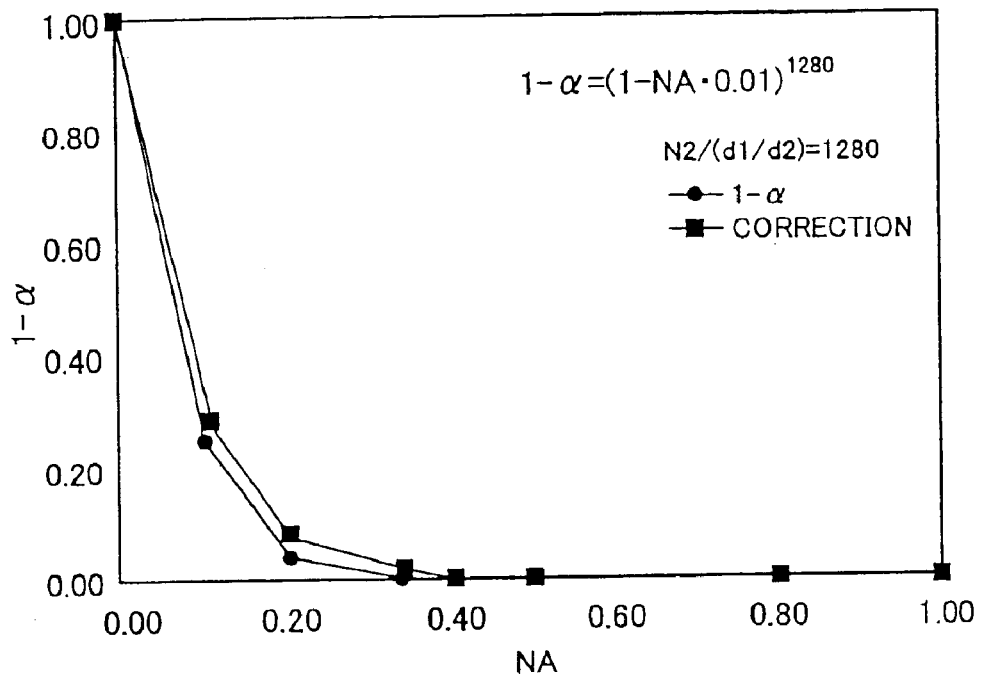
FIG. 34 is a graph for explaining the method of calculating an effective radiation rate according to the present invention.
Figure 35:
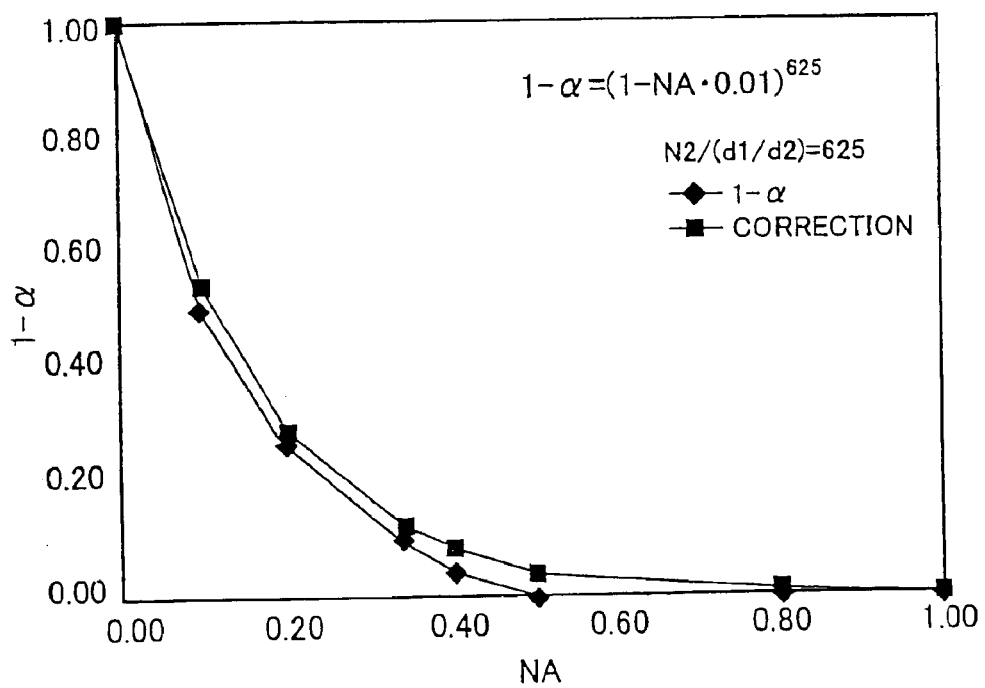
FIG. 35 is a graph for explaining the method of calculating an effective radiation rate according to the present invention.
Figure 36:
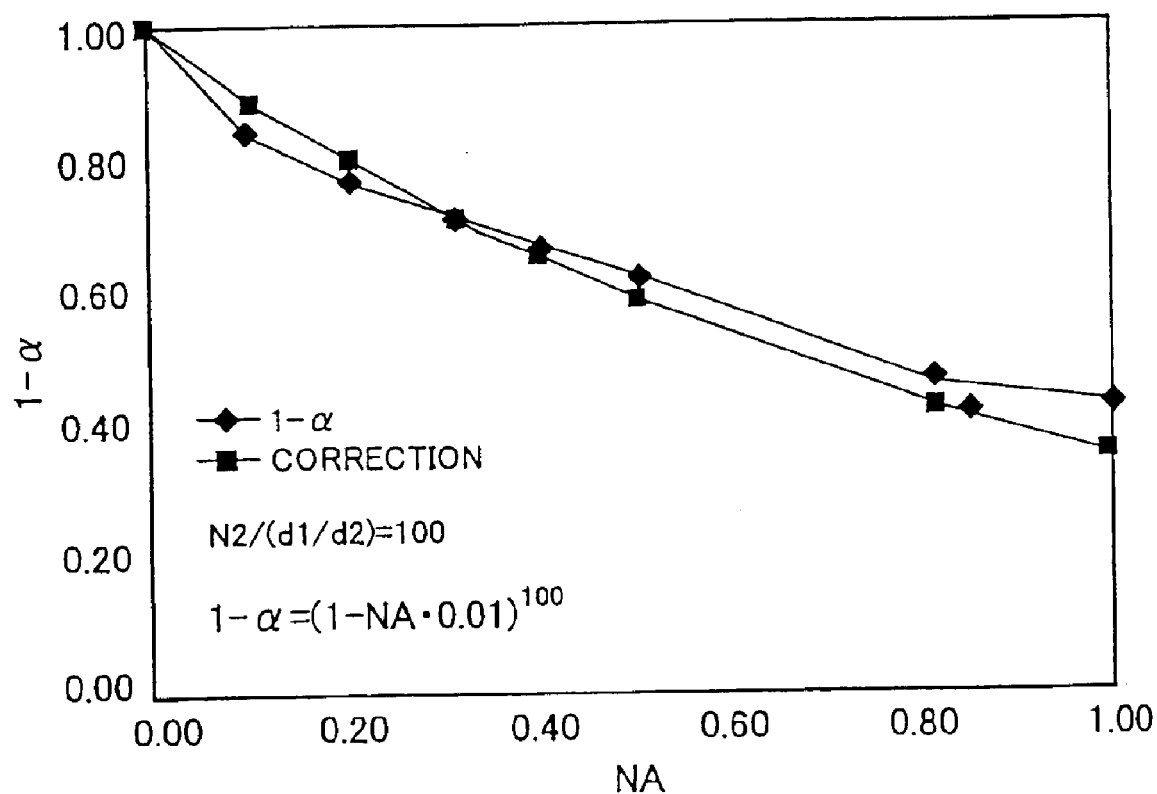
FIG. 36 is a graph for explaining the method of calculating an effective radiation rate according to the present invention.

A description will now be given, with reference to FIGS. 32 through 36, of a method of calculating an effective radiation rate, which is another aspect of the present invention. FIG. 32 is a schematic expanded cross-sectional view of two kinds of the radiation thermometers 200A and 200B and the vicinity thereof. FIG. 33 is a schematic expanded cross-sectional view of two of the same kind of the radiation thermometers 200C. FIGS. 34 through 36 show graphs for explaining the method of calculating an effective radiation rate according to the present invention.

The radiation thermometers 200A, 200B and 200C are provided at a side opposite to the lamp 130 with regard to the object W to be processed. Although the present invention does not exclude the structure in which the radiation thermometers 200A, 200B and 200C are provided on the same side with the lamps 130, it is preferable that the radiation light of the lamps 130 be prevented from being incident on the radiation thermometers 200A, 200B and 200C.

Each of the radiation thermometers 200A, 200B and 200C shown in FIGS. 32 and 33 includes a rod 210 made of quartz or sapphire (made of quartz in this embodiment), respective optical fibers 220A, 220B and 220C, and a photo-detector (PD) 230. Since the radiation thermometers 200A, 200B and 200C according to the present invention do not use a chopper, a motor for rotating the chopper, an LED and a temperature adjusting mechanism for achieving a stable light emission of the LED, the radiation thermometers 200A, 200B and 200C have a relatively inexpensive structure.

Referring to FIG. 32, the radiation thermometers 200A and 200B are mounted on a bottom part 114 of the process chamber 110. More specifically, the radiation thermometers 200A and 200B are inserted into respective cylindrical through holes 115a and 115b of the bottom part 114. A surface 114a of the bottom part 114 facing the interior of the process chamber 110 serves as a reflective plate (high-reflectance surface) by being subjected to a sufficient polishing. In this embodiment, the surface 114a has a reflectivity of approximately 0.9, but this reflectivity is just an example and not a limitation of the present invention. This is because if the surface 114a is a low reflectance surface such as a black surface, the surface 114a absorbs heat of the object W to be processed, which results in an undesired and uneconomically increase in the output of the lamps 130.

Each of the radiation thermometers 200A and 200B includes the same rod 210, respective optical fibers 220A and 220B having different aperture numbers (N/A) and a photo-detector (PD) 230.

The rod 210 of the present embodiment is formed of a quartz rod having a diameter of 4 mm. Although quartz and sapphire can be used since they have a good heat resistance and a good optical characteristic, the material of the rod 210 is not limited to quartz or sapphire.

If necessary, the rod 210 can project inside the process chamber 110 by a predetermined length. The rod 210 of each of the radiation thermometers 200A and 200B is inserted into respective through holes 115A and 115B provided in the bottom part 114 of the process chamber 110, and is sealed by an O-ring (not shown in the figure). Accordingly, a negative pressure environment can be maintained in the process chamber irrespective of the through holes 115A and 115B. The rod 210 has an excellent light collecting efficiency since the rod 210 can guide a radiation light, which is incident on the rod 210, to the respective optical fibers 220A and 220B with less attenuation and less leakage. The rod 210 receives a radiation light from the wafer W, and guides the received radiation light to the PD 230 via the respective optical fibers 220A and 220B by bringing the rods 210A and 210B close to the object W to be processed.

Each of the optical fibers 220A and 220B includes a core which transmits a light and a concentric cladding which covers the vicinity of the core. The NA of the core is different from the NA of the clad.

The core and the cladding, are made of a transparent dielectric material such as glass or plastic. The refractive index of the cladding is slightly smaller than that of the core, thereby achieving a total reflection. Thus, the core can propagate light without leaking outside. In order to achieve different NAs, the radiation thermometers 200A and 200B use a combination of a core made of a different material than the cladding.

The photodiode (PD) 230 has an image forming lens, a silicon (Si) photocell and an amplification circuit so as to convert the radiation light incident on the image forming lens into a voltage, which is an electric signal representing radiation intensities $E_1(T)$ and $E_2(T)$, and send the electric signal to the control part 300. The control part 300 includes a CPU, an MPU, other processors, and memories such as a RAM and a ROM so as to calculate a reflectivity end a substrate temperature T of the object W to be processed, based on the radiation intensities $E_2(T)$ and $E_2(T)$. It should be noted that the calculations may be performed by an arithmetic part (not shown in the figure) provided in the radiation thermometers 200. The radiation light received by the rod 210 is introduced into the PD 230 via the optical fibers 220A and 220B.

A description will now be given of a method of calculating an effective radiation rate according to the present invention which uses different NAs. Considering multiplex-reflection between the object W to be processed and the rod 210 and a direct light from the lamps 130, the effective radiation rate $\epsilon_{\mathit{eff}}$ of the object W to be processed can be given by the following equation (2).

$$\varepsilon_{\mathit{eff}} = (1-\alpha)\cdot \varepsilon + \alpha \cdot \frac{\varepsilon}{1 - F\cdot r \cdot (1-\varepsilon)} \qquad \text{(EQUATION 2)}$$

Here, $\epsilon_{\mathit{eff}}$ represents an effective radiation rate of the object W to be processed; $\epsilon$ represents a radiation rate of the object W to be processed; r represents a reflectivity of the surface 114a of the bottom part 114 of the process chamber 110; F is a view factor given by the following equation (3); $\alpha$ is a multiple-reflection coefficient.

$$F = (1+\cos 2\gamma)/2 \qquad \text{(EQUATION 3)}$$

Figure 37:
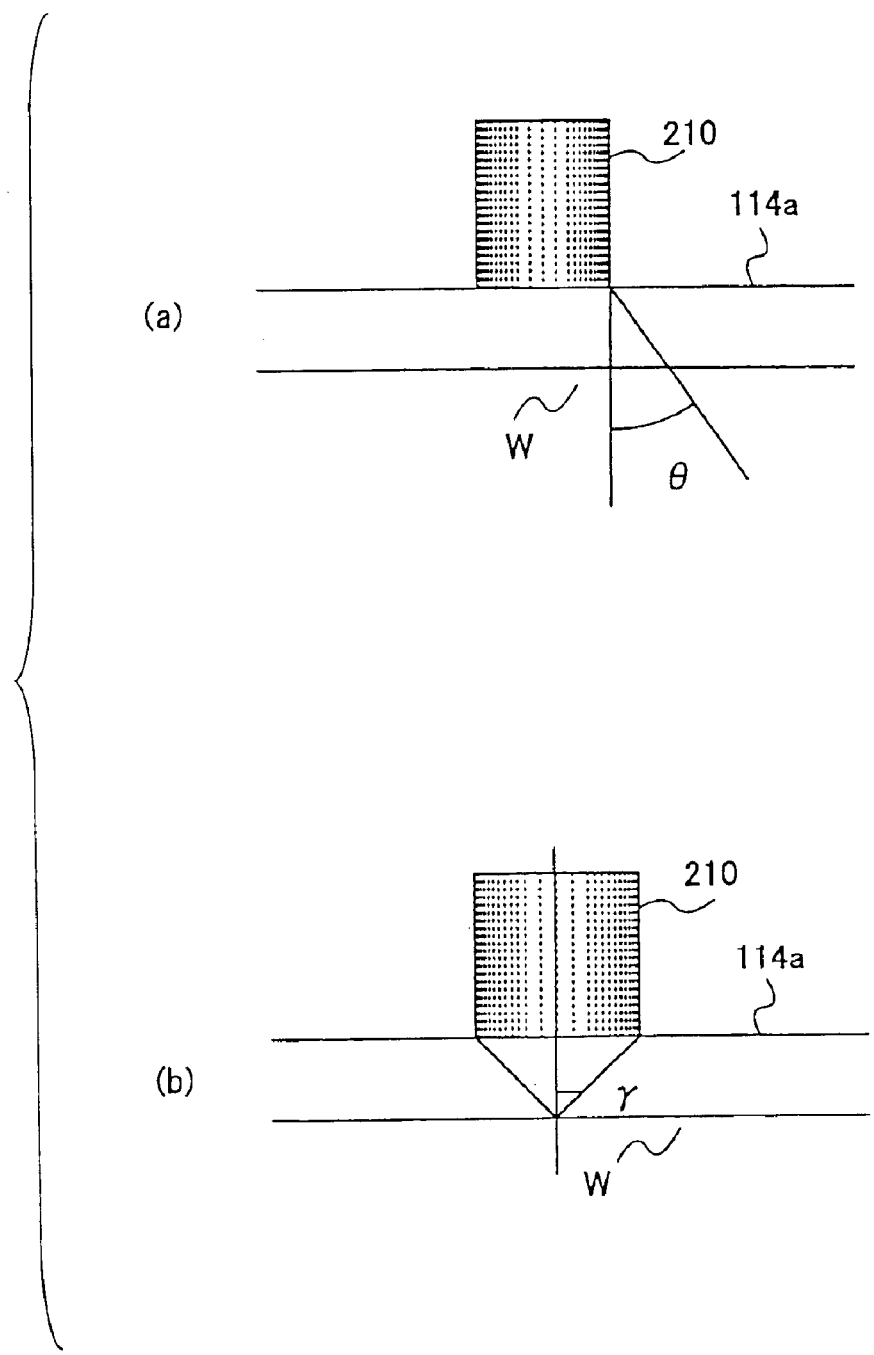
FIG. 37 is a cross sectional view where a parameter used for the method of calculating an effective radiation rate is defined.

Here, the multiple-reflection coefficient $\alpha$ is supposed to take the following values depending on three values which are 1) a diameter D1 of the rod 210, 2) a distance D2 between the object W to be processed and the surface 114a and 3) numbers of aperture NA ($0 \leq NA \leq 1$) of the radiation thermometers 200 (200A and 200B). It should be noted that $\gamma$ represents a view angle determined by a positional relationship between the rod 210, the surface 114a and the object to be processed as shown in FIG. 37b.

$$NA=0 \rightarrow 1-\alpha=1 \qquad \text{(EQUATION 4)}$$

$$NA=1 \rightarrow 1-\alpha \approx 0 \qquad \text{(EQUATION 5)}$$

$$D1/D2=\infty \rightarrow 1-\alpha=1 \qquad \text{(EQUATION 6)}$$

$$D1/D2=0 \rightarrow 1-\alpha=0 \qquad \text{(EQUATION 7)}$$

A prediction equation which can establish the above-mentioned four conditions can be defined as the following equation (8).

$$1-\alpha=(1-NA\cdot N1)^{N2/(D1/D2)} \qquad \text{(EQUATION 8)}$$

Here, N1 and N2 are the parameters in the equation 8. Accordingly, the coefficient $\alpha$ of multiplex-reflection is represented by the following equation 9.

$$\alpha = 1-(1-NA\cdot N1)^{N2/(D1/D2)} \qquad \text{(EQUATION 9)}$$

It can be appreciated that the coefficient $\alpha$ of multiple reflection a represented by the equation 9 possibly satisfies the equations 4 through 7. Thus, the adequacy of equation 9 is considered by determining N1 and N2 based on equation 9.

First, a calculation is made by fixing the diameter (4 mm) of the rod 210 and varying NA. At this time, NA ranges from 0 to 1. Values of N1 and N2/(D1/D2) are tentatively determined by comparing data obtained by the calculation and the assumption of equation 9. In a similar manner, values of N1 and N2/(D1/D2) are determined for the diameters of 2 mm and 20 mm. As for a method of determining N1 and N2, N2 and N2/(D1/D2)−D1/D2 curve are used. N1 is selected so that N2 is common to the three conditions in N2/(D1/D2).

According to the tentative values of N1 and N2/(D1/D2) determined by the above-mentioned method, relationships between (1−a) and NA are shown in FIGS. 34 through 36. Am a result, N1=0.01 and N2=500 are obtained, and equation 9 can be represented by the following equation 10.

$$\alpha = 1 - (1 - 0.01 \cdot NA)^{500/(D1/D2)} \quad \text{(EQUATION 10)}$$

Accordingly, if the diameter of the rod 210 is changed, or if the distance between the object W to be precessed and the surface 114a is changed, the effective radiation rate can be easily calculated irrespective of the value of NA.

In a case in which the optical fiber 220A has NA=0.2 and the optical fiber 220B has NA=0.34, the coefficients $\alpha$ of multiple reflection $\alpha_{0.2}$ and $\alpha_{0.34}$ can be represented by the following equations 11 and 12, based on the equation 10.

$$\alpha_{0.2} = 1 - (1 - 0.01 \cdot 0.2)^{500/(D1/D2)} \quad \text{(EQUATION 11)}$$

$$\alpha_{0.34} = 1 - (1 - 0.01 \cdot 0.34)^{500/(D1/D2)} \quad \text{(EQUATION 12)}$$

Accordingly, the effective radiation rate of the object W to be processed can be given by the following equations 13 and 14.

$$\varepsilon eef_{0.2} = (1 - \alpha_{0.2}) \cdot \varepsilon + \alpha_{0.2} \cdot \frac{\varepsilon}{1 - F \cdot r \cdot (1 - \varepsilon)} \quad \text{(EQUATION 13)}$$

$$\varepsilon eef_{0.34} = (1 - \alpha_{0.34}) \cdot \varepsilon + \alpha_{0.34} \cdot \frac{\varepsilon}{1 - F \cdot r \cdot (1 - \varepsilon)} \quad \text{(EQUATION 14)}$$

The radiation thermometer 200 performs the conversion of temperature based on radiation light flux (W). Thus, a difference in the incident light fluxes at the two radiation thermometers is given by the following equations 15 and 16, where θ1 is an incident angle at NA=0.2 and θ2 is an incident angle at NA=0.34. The incident angle θ represent a maximum light-receiving angle of an optical fiber as shown in FIG. 37a, and the incident angle θ can be represented as θ=sin$^{-1}$(NA).

$$E_{0.2} = A_{ROD} \cdot \frac{(r \cdot \tan\theta 1)^2 \cdot \pi}{r^2} \cdot L \quad \text{(EQUATION 15)}$$

$$E_{0.34} = A_{ROD} \cdot \frac{(r \cdot \tan\theta 2)^2 \cdot \pi}{r^2} \cdot L \quad \text{(EQUATION 16)}$$

Accordingly, the ratio of the incident light fluxes of the two radiation thermometers 200A and 200B can be represented by the following equation 17.

$$\frac{\varepsilon eff_{0.34} \cdot E_{0.34}}{\varepsilon eff_{0.2} \cdot E_{0.2}} = \frac{\varepsilon eff_{0.34} \cdot \tan^2\theta 2}{\varepsilon eff_{0.2} \cdot \tan^2\theta 1} \quad \text{(EQUATION 17)}$$

According to the above-mentioned equations (13) and (14), equation (17) can be changed into the following equation (18).

(EQUATION 18)
$$\frac{\varepsilon eff_{0.34} \cdot E_{0.34}}{\varepsilon eff_{0.2} \cdot E_{0.2}} = \frac{\left[(1 - \alpha_{0.34}) \cdot \varepsilon + \alpha_{0.34} \cdot \frac{\varepsilon}{1 - F \cdot r \cdot (1 - \varepsilon)}\right] \cdot \tan^2\theta 2}{\left[(1 - \alpha_{0.2}) \cdot \varepsilon + \alpha_{0.2} \cdot \frac{\varepsilon}{1 - F \cdot r \cdot (1 - \varepsilon)}\right] \cdot \tan^2\theta 1}$$

Then, if β is defined as in the following equation 19, the above-mentioned equation 18 can be changed into the following equations 20 through 24.

$$\beta = \frac{\varepsilon eff_{0.34} \cdot E_{0.34}}{\varepsilon eff_{0.2} \cdot E_{0.2}} \cdot \frac{\tan^2\theta 1}{\tan^2\theta 2} \quad \text{(EQUATION 19)}$$

$$\beta \cdot \left[(1 - \alpha_{0.2}) \cdot \varepsilon + \alpha_{0.2} \cdot \frac{\varepsilon}{1 - F \cdot r \cdot (1 - \varepsilon)}\right] = \quad \text{(EQUATION 20)}$$
$$(1 - \alpha_{0.34}) \cdot \varepsilon + \alpha_{0.34} \cdot \frac{\varepsilon}{1 - F \cdot r \cdot (1 - \varepsilon)}$$

$$\beta \cdot [(1 - \alpha_{0.2}) \cdot [1 - F \cdot r \cdot (1 - \varepsilon)] + \alpha_{0.2}] = \quad \text{(EQUATION 21)}$$
$$(1 - \alpha_{0.34}) \cdot [1 - F \cdot r \cdot (1 - \varepsilon)] + \alpha_{0.34}$$

$$\beta \cdot (1 - \alpha_{0.2}) - \beta \cdot (1 - \alpha_{0.2}) \cdot [F \cdot r \cdot (1 - \varepsilon)] + \beta \cdot \alpha_{0.2} = \quad \text{(EQUATION 22)}$$
$$(1 - \alpha_{0.34}) - (1 - \alpha_{0.34}) \cdot [F \cdot r \cdot (1 - \varepsilon)] + \alpha_{0.34}$$

$$\beta \cdot (1 - \alpha_{0.2}) - \beta \cdot (1 - \alpha_{0.2}) \cdot F \cdot r + \quad \text{(EQUATION 23)}$$
$$\beta \cdot (1 - \alpha_{0.2}) \cdot F \cdot r \cdot \varepsilon + \beta \cdot \alpha_{0.2} - (1 - \alpha_{0.34}) =$$
$$-(1 - \alpha_{0.34}) \cdot F \cdot r + F \cdot r \cdot (1 - \alpha_{0.34}) \cdot \varepsilon + \alpha_{0.34}$$

$$\beta \cdot (1 - \alpha_{0.2}) - \beta \cdot (1 - \alpha_{0.2}) \cdot F \cdot r + \beta \cdot \alpha_{0.2} - \quad \text{(EQUATION 24)}$$
$$(1 - \alpha_{0.34}) + (1 - \alpha_{0.34}) \cdot F \cdot r - \alpha_{0.34} =$$
$$(1 - \alpha_{0.34}) \cdot F \cdot r \cdot \varepsilon - \beta \cdot (1 - \alpha_{0.2}) \cdot F \cdot r \cdot \varepsilon$$

Accordingly the radiation rate ϵ of the object W to be processed can be calculated by the following equation 25.

$$\varepsilon = \frac{\beta \cdot (1 - \alpha_{0.2}) - \beta \cdot (1 - \alpha_{0.2}) \cdot F \cdot r + \beta \cdot \alpha_{0.2} - (1 - \alpha_{0.34}) + (1 - \alpha_{0.34}) \cdot F \cdot r - \alpha_{0.34}}{(1 - \alpha_{0.34}) \cdot F \cdot r - \beta \cdot (1 - \alpha_{0.2}) \cdot F \cdot r} \quad \text{(EQUATION 25)}$$

Then, the effective radiation rate is calculated again by the equations 11 and 12. At the time, the calculation is performed based on the email value of NA, that is, NA=0.2. The following equation (26) can be obtained by entering the radiation rate ϵ, which was calculated by equation (25), in equation (13).

$$\varepsilon eff_{0.2} = (1 - \alpha_{0.2}) \cdot \varepsilon + \alpha_{0.2} \cdot \frac{\varepsilon}{1 - F \cdot r \cdot (1 - \varepsilon)} \quad \text{(EQUATION 26)}$$

Since radiation energy of $E_{0.2}$ is incident on the radiation thermometer 200A of NA=0.2, the following equation 27 is established.

$$E_{0.2} = \epsilon \text{eff}_{0.2} \cdot E_b \quad \text{(EQUATION 27)}$$

Here, Eb is radiation energy according to black body radiation. Then, the above-mentioned equation 27 is changed as follows.

$$E_b = E_{0.2} / \epsilon \text{eff}_{0.2} \quad \text{(EQUATION 28)}$$

Regarding incident energy, the following relationship is defined by Japanese Industrial Standard (JIS 1612)

$$T = \frac{c2/A}{\ln C - \ln E_b} - \frac{B}{A} \quad \text{(EQUATION 29)}$$

Here, T represents a temperature of the object W processed; c2 represents a second constant of radiation (0.014388 m/k); A, B and C represent constants peculiar to the radiation thermometer 200 (determined by calibration); $E_b$ is radiation energy from a black body (normally an output V of a radiation thermometer).

The above-mentioned calculation method obtains a radiation rate of the object W to be processed by the two radiation thermometers 200A and 200B having different NAs, the radiation rate can be obtained based on the above-mentioned equation 9 by changing the ratio of D1/D2. FIG. 33 is an illustration for explaining such a method.

In FIG. 33, a bottom surface 114b corresponding to the bottom surface 114a and an upper surface 114d of a projection part 114c projecting form the bottom surf ace 114b are provided in the bottom part 114 of the process chamber 110. Because of this, identical radiation thermometers 200C are used, but distances D2 between the object W to be processed and the quarts rod 210 of each of the radiation thermometers 200C are different. Thus, in the example shown in FIG. 33, a radiation rate of the object W to be processed can be obtained as well as the example shown in FIG. 32.

For example in FIG. 33, the radiation thermometers 200C has NA=0.2, and the distance between the object W to be processed and the rod 210 of one of the radiation thermometers 200C is set to 3.5 mm (left side of FIG. 33) and the distance between the object W to be processed and the rod 210 of the other radiation thermometer 200C is set to 5 mm (right side of FIG. 33). Additionally, the diameter of the rod 210 is set to 4 mm. According to equation 9, each coefficient of multiplex-reflection can be represented by the following equations 30 and 31.

$$\alpha_{3.5} = 1 - (1 - 0.01 \cdot 0.2)^{500/(D1/3.5)} \quad \text{(EQUATION 30)}$$

$$\alpha_{5.0} = 1 - (1 - 0.01 \cdot 0.2)^{500/(D1/5.0)} \quad \text{(EQUATION 31)}$$

Using the above equations 30 and 31, the effective radiation rates $\epsilon\text{eff}_{3.5}$ and $\epsilon\text{eff}_{5.0}$ are obtained in the similar manner as equations 13 and 14. The subsequent calculation of obtaining the temperature of the object W to be processed is performed in the same manner as that explained with reference to equations 2.5 through 28 by replacing the suffix 0.2 by 3.5 and 0.34 by 5.0

The PD 230 and the control part 300 can calculate the temperature T of the object W to be processed based on equations 2B through 29. In any case, the control part 300 can obtain the temperature T of the object W to be processed. Additionally, a temperature measurement calculation program including the above-mentioned equations is stored in a computer readable medium such as an optical disk, or the program is distributed through a communication network such as the Internet or the like.

However, for the above mentioned structure, at least two radiation thermometers 200 are necessary to implement temperature measurement. In addition, the radiation thermometers 200 are provided at a plurality of positions for the object W to be processed in order to raise detection precision, at least four or more, namely a number of a multiple of 2 of, radiation thermometers are necessary. Hence, a corresponding number of the through holes 115 formed in the process chamber 110 to the number of the radiation thermometers 200 should be provided. The above mentioned temperature measurement method has an advantage in that detection with high precision at a cheap price can be implemented and a disadvantage in that the through hole 115 and the rod 210 absorb heat and are obstacles to raising the temperature. Therefore, it is preferable that numbers of the through holes 115 and the radiation thermometers 200 are small. After consideration of the problem, the inventors of this patent application thought about whether or not numbers of the through holes 115 and the radiation thermometers 200 should become half by making the two of the radiation thermometers 200 use one rod 210 jointly. In addition, the inventors of this patent application have formed a novel optical fiber achieving operation and effect the same as a case where two of the radiation thermometers 200 are used, even if only the one rod 210 is used.

Figure 38:
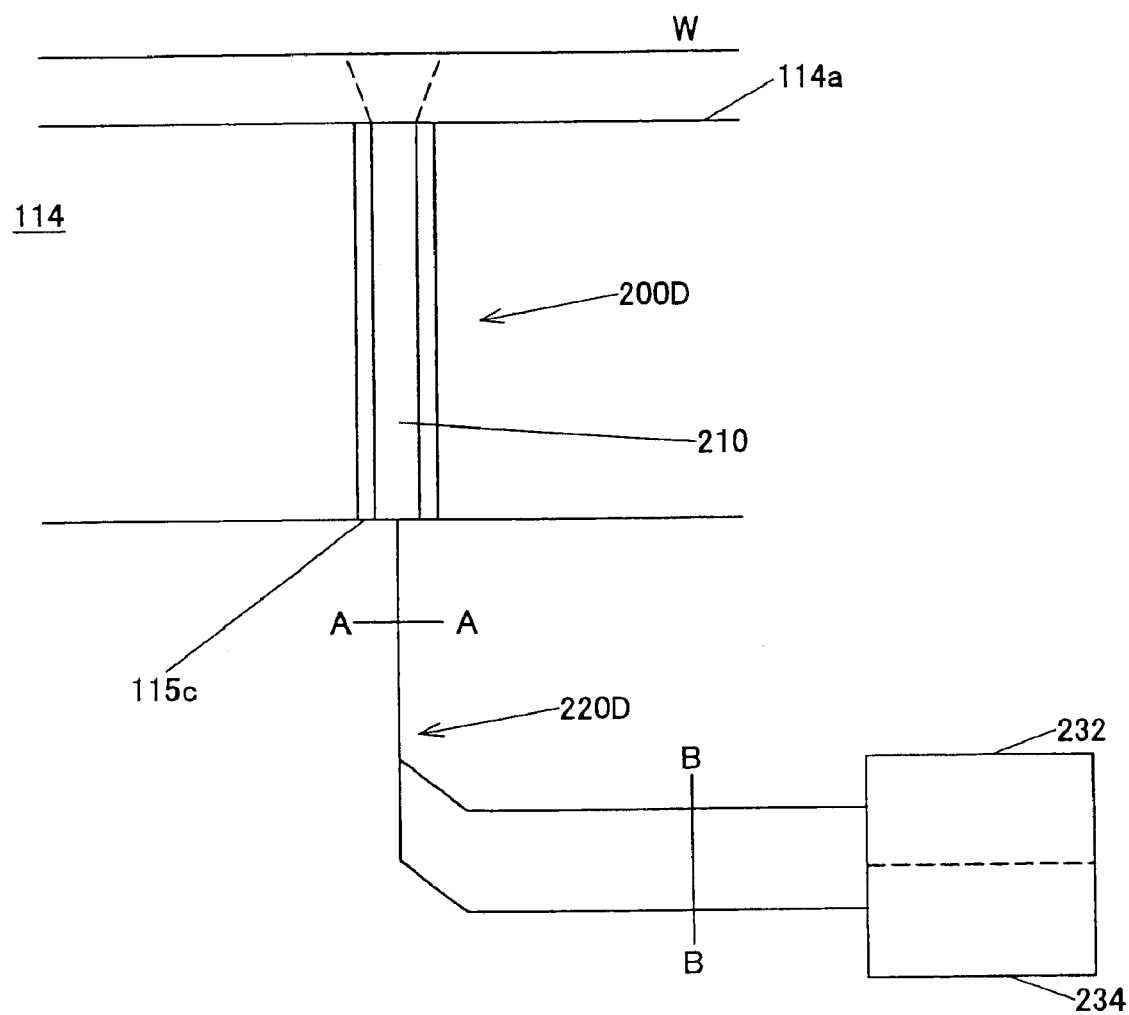
FIG. 38 illustrates a variation of the radiation thermometer shown in FIG. 2 and is a schematic expanded cross-sectional view of the radiation thermometers shown in FIG. 2 and a vicinity thereof.
Figure 39:
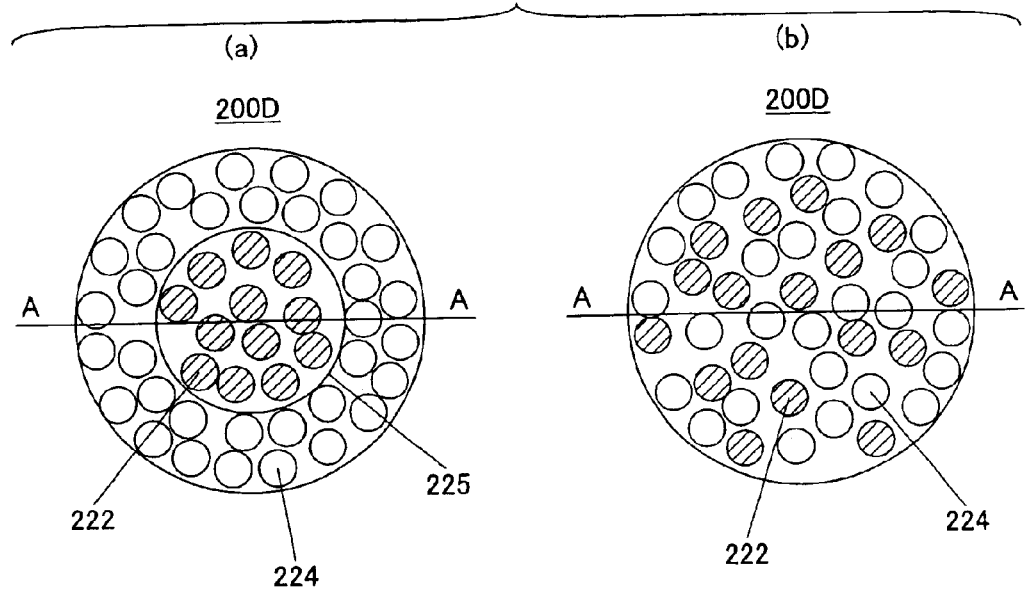
FIG. 39 illustrates the optical fiber 220D applicable to the radiation thermometer 200D shown in FIG. 38 and is a schematic cross sectional view of the optical fiber 220D at a line A—A.
Figure 40:
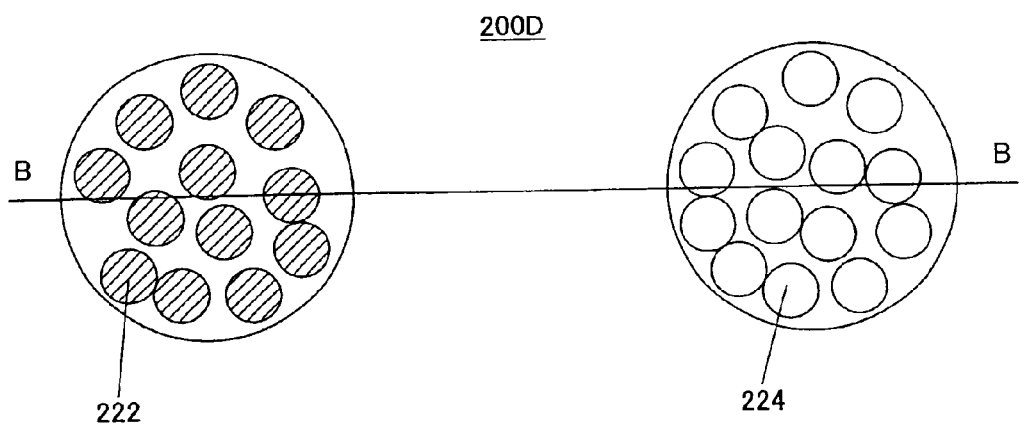
FIG. 40 is a schematic cross sectional view of the optical fiber 220D shown in FIG. 38 at a line B—B.

Next, with reference to FIGS. 38 through 40, an optical fiber 220D and a radiation thermometer 200D having the optical fiber 220D will be described. FIG. 38 illustrates a variation of the thermometer 200 shown in FIG. 2 and is an enlarged cross-sectional view of the radiation thermometer 200D and a vicinity thereof. FIG. 39 illustrates the optical fiber 220D applicable to the radiation thermometer 200D shown in FIG. 38 and is a cross sectional view of the optical fiber 220D at a line A—A. FIG. 40 is a cross sectional view of the optical fiber 220D at a line B—B.

The radiation thermometer 200D, as well as the radiation thermometers 200A, 200B and 200C, is provided at a side opposite to the lamp 130 with regard to the object W to be processed. The radiation thermometers 200D shown in FIG. 38 includes a rod 210 made of quartz or sapphire (made of quartz in this embodiment), an optical fiber 220D and a photo-detectors (PD) 232 and 234. The radiation thermometer 200D is typically different from the radiation thermometers 200A through 200C in that the radiation thermometer 200D has the optical fiber 220D and two PDs 232 and 234. The radiation thermometer 200D is inserted into the through hole 115c having a pipe configuration of the bottom part 114 of the process chamber 100 so as to be provided at the bottom part 114. As described above, at least two through holes are required to be provided in order to provide the radiation thermometers 200A and 200B or a couple of the radiation thermometers 200c. At least one through hole 115c is required to be provided for the radiation thermometer 200D. Therefore, in a case where the radiation thermometer 200D is used, it is possible to reduce the number of the through holes 115 to half thereof. Hence, it is possible hold influence of the rod 210 that is at least obstacle to raising temperature inside of the process chamber 110. Accordingly, a rapid rising of temperature of the process chamber 110 can be achieved with low energy and it is possible to contribute to reduction of energy. In this embodiment, explanation of parts that are the same as the parts of the radiation thermometers 200A through 200C will be omitted.

An optical fiber 220D is a bundle fiber where a plurality of the optical fibers 222 and 224 are unified. In this embodiment, the optical fiber 220D has a specific feature in that the NA of the optical fiber 222 is different from the NA of the optical fiber 224. As shown in FIG. 38, the optical fiber 220D is first connected to the rod 210 and then forks so as to be connected to the detectors 232 and 234. The forking optical fiber 210D has the same NA forming one bundle of fiber. Unified optical fibers 222 and 224 are connected to different detectors 232 and 234.

More particularly, a state prior to when the optical fiber 220D forks is shown in FIG. 40. A plurality of the optical fibers 222 and 224 form the bundle fiber as shown in FIG. 39a wherein the optical fibers 222 are situated at a center area of the optical fiber 220D and covered with the optical fibers 224. Under the above mentioned structure, the optical fibers 222 and 224 can be separated by a pipe 225 such as a SUS tube extending in a same axis direction of the optical fiber 220D. In addition, a plurality of the optical fibers 222 and 224 may be formed as a bundle fiber wherein the optical fibers 222 and 224 are mixed, as shown in FIG. 39b. Although the optical fibers 222 are situated at a center area and the optical fibers 224 are situated at an external circumferential area thereof in a case shown in FIG. 39a, the optical fibers 222 and 224 may be arranged oppositely. In addition, a state following a fork of the optical fiber 220D is shown in FIG. 40. After the optical fiber 220D forks, the optical fibers 220D is formed as two bundle fibers wherein only optical fibers having the same NAs are unified.

As well as the optical fibers 220A through 220C, the optical fibers 222 and 224 include a core for transmitting light and a cladding having a concentric circle configuration for covering the vicinity of the core. As described above, complete reflection of light can be achieved so as to transmit the light without leaking to the outside by making the refractive index of the cladding slightly smaller than the refractive index of the core. Basically, the core and cladding are formed by the same materials. In this embodiment, in order to achieve a different NA, a different material is used for the optical fibers 222 and 224. The optical fibers 222 and 224 are formed by a material selected from a group of quartz, plastic and glass. Material having the same action as quartz, plastic and glass can be used for the optical fibers 222 and 224. In a case where the optical fiber is formed by quartz, the NA of the optical fiber is 0.14. In a case where the optical fiber is formed by plastic, the NA of the optical fiber is 0.3. In a case where the optical fiber is formed by glass, the NA of the optical fiber is more than 0.5. In this example, the optical fiber 220D is formed by the optical fiber 222 made of quartz and having NA of 0.14 and the optical fiber 224 made of plastic and having NA of 0.37. As the refractive index of the core and cladding are changed, respectively, values of NA of the optical fibers 222 and 224 are changed. The optical fibers 222 and 224 may be made of same material. In a case of a structure shown in FIG. 39b, due to reasons for manufacturing of the optical fiber 220D, it is preferable that the optical fibers 222 and 224 be formed by a combination of quartz and quartz or quartz and glass. Furthermore, a diameter of the optical fiber 222 may be equal to or different from a diameter of the optical fiber 224. In a case where the diameter of the optical fiber 222 is different from the diameter of the optical fiber 224, since it is difficult to manufacture a bundle fiber shown in FIG. 39b, the structure shown in FIG. 39a is preferable.

Figure 41:
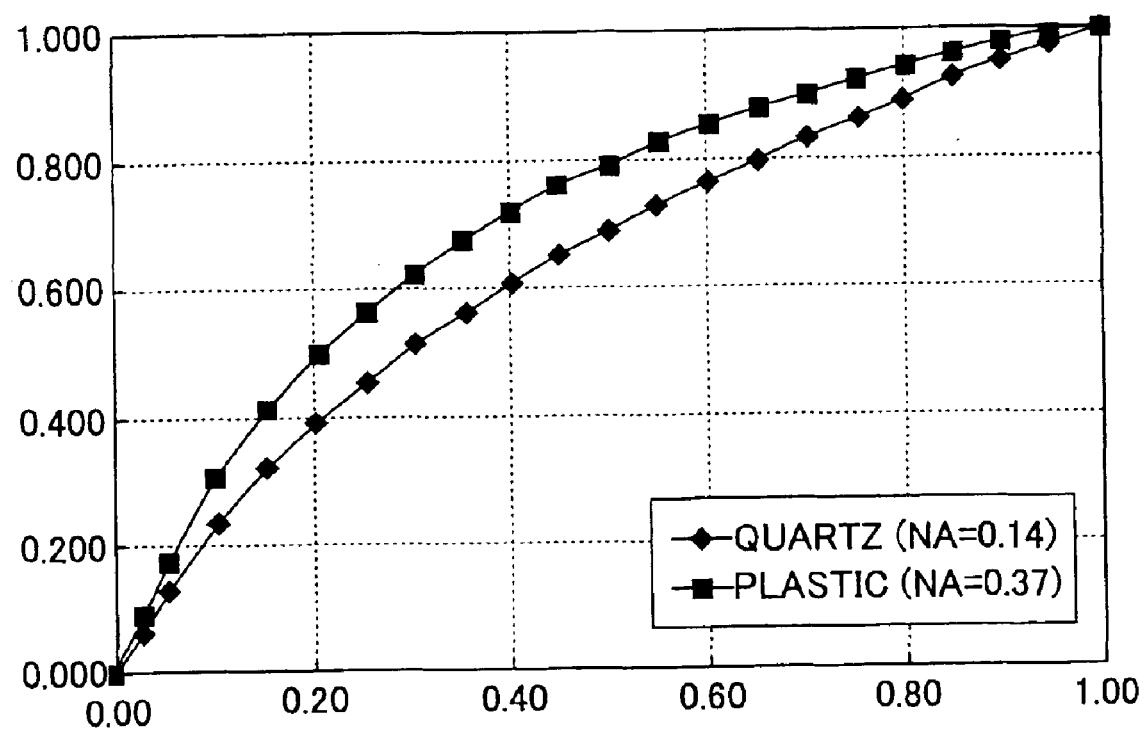
FIG. 41 is a view of a radiation effective rate $\epsilon_{eff}$ to the radiation rate $\epsilon$ in a case where the optical fiber made of quartz and the optical fiber made of plastic are combined.
Figure 42:
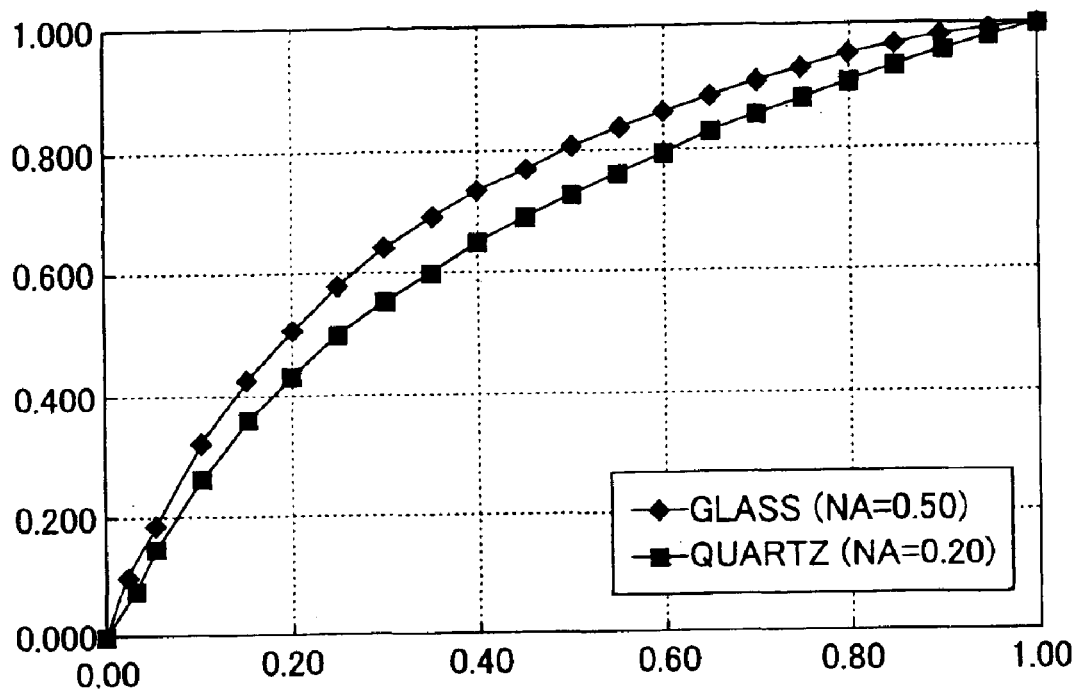
FIG. 42 is a view of a radiation effective rate $\epsilon_{eff}$ to the radiation rate $\epsilon$ in a case where the optical fiber made of quartz and the optical fiber made of glass are combined.
Figure 43:
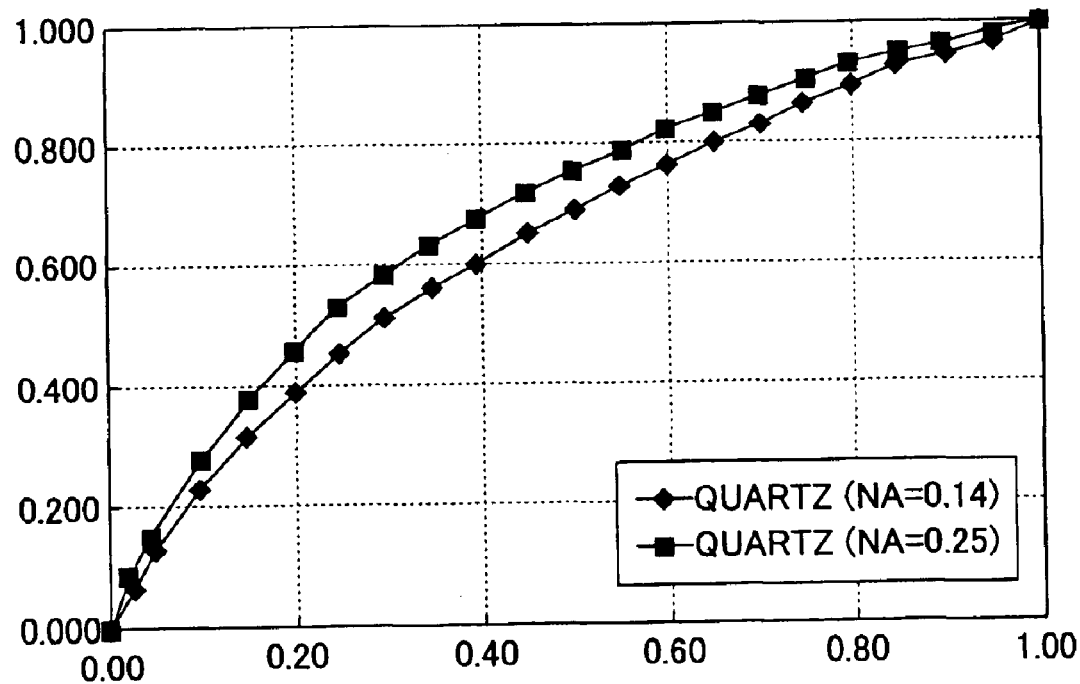
FIG. 43 is a view of a radiation effective rate $\epsilon_{eff}$ to the radiation rate $\epsilon$ in a case where the optical fibers made of quartz are combined.

By using the optical fiber 220D and connecting the optical fibers 220D after forking to respective different detectors 232 and 234, it is possible to achieve similar effects to detection by two of the radiation thermometers 200A through 200c. Referring to FIG. 41 through 43, it is understandable, under the above mentioned structure, the same action as a case where the radiation thermometers 200A and 200B are combined and used can be achieved, by connecting the optical fiber 210D to one rod 210 and making the optical fibers 222 and 224 having different NAs use one rod 210 jointly. Here, FIGS. 41 trough 43 illustrate an effective radiation rate $\epsilon_{\it eff}$ against a radiation rate $\epsilon$ in a case where the above mentioned optical fibers 222 and 224 are combined. That is, a difference of the effective radiation rate $\epsilon_{\it eff}$ in a case of same radiation rate $\epsilon$ is clear based on a numerical aperture NA. Accordingly, in a case where the radiation thermometer 200D is used, the temperature measurement method in used wherein the radiation rate $\epsilon$ is changed based on differences of the effective radiation rate $\epsilon_{\it eff}$.

In this example, since the structure and an 30 action of the rod 210, detectors 232 and 234 are as described above, the detailed explanation thereof will be omitted. In addition, the effective radiation rate $\epsilon_{\it eff}$ and a calculation method is same as the radiation thermometers 200A and 200B, and explanation thereof will be omitted.

The control part 300 has a CPU and a memory incorporated therein. The control part 300 feed-back-controls the output of the lamps 130 by determining the temperature T of the object W to be processed and controlling the lamp driver 310. Additionally, the control part 300 controls a rotational speed of the object W to be processed by sending a drive signal to the motor driver 320 at a predetermined timing. A description will be given below of a heat treatment control method for an-object W performed by the control part 300 according to the present invention.

The gas introducing part 180 includes a gas source (not shown in the figure), a flow adjust valve, a mass-flow controller, a gas supply nozzle and a gas supply passage interconnecting the aforementioned so as to introduce gas used for heat treatment into the process chamber 110. It should be noted that although the gas introducing part 180 is provided to the sidewall 112 of the process chamber 110 so as to introduce the gas into the process chamber from the side, the position of the gas introducing part 180 is not limited to the side of the process chamber. For example, the gas introducing part 180 may be constituted as a showerhead, which introduces the process gas from an upper portion of the process chamber 110.

If the process to be performed in the process chamber 110 is an annealing process, the process gas includes $N_2$, Ar, etc.; if the process is an oxidation process, the process gas includes $O_2$, $H_2$, $H_2O$, $NO_2$, etc.; if the process is a nitriding process, the process gas includes $N_2$, $NH_3$, etc.; if the process is a film deposition process, the process gas includes $NH_3$, $SiH_2Cl_2$, $SiH_4$, etc. It should be noted that the process gas is not limited the above-mentioned gasses. A mass-flow controller is provided for controlling a flow of the process gas. The mass-flow controller includes a bridge circuit, an amplification circuit, a comparator control circuit, a follow adjusting valve, etc. so as to control the flow adjust valve by measuring a gas flow by detecting an amount of heat transmitted from the upstream side to the downstream side in association with the gas flow. The gas supply passage uses a seamless pipe and a bite-type coupling or a metal gasket coupling so as to prevent impurities from entering the gas to be supplied. Additionally, the supply pipe is made of a corrosion resistant material so as to prevent dust particles from generating due to dirt or corrosion on an inner surface of the supply pipe. The inner surface of the supply pipe may be coated by an insulating material such as PTFE (Teflon), PFA, polyimide, PBI, etc. Additionally, the inner surface of the supply pipe may be subjected to electro-polishing. Further, a dust particle filter may be provided to the gas supply passage.

In the present embodiment, although the exhaust part 190 is provided parallel to the gas introducing part 180, the position and the number of the exhaust parts 190 are not limited to that shown in the figure. The exhaust part 190 is connected to a desired exhaust pump, such as a turbo molecular pump, a sputter ion pump, a getter pump, a sorption pump, and a cryostat pump, together with a pressure adjust valve. It should be noted that although the process chamber is maintained at a negative pressure environment in the present embodiment, such a structure is not an essential feature of the present invention. That is, for example, the process chamber may be maintained at a pressure ranging from 133 Pa to atmospheric pressure. The exhaust part 190 has a function to exhaust helium gas before starting a subsequent heat treatment.

Figure 44:
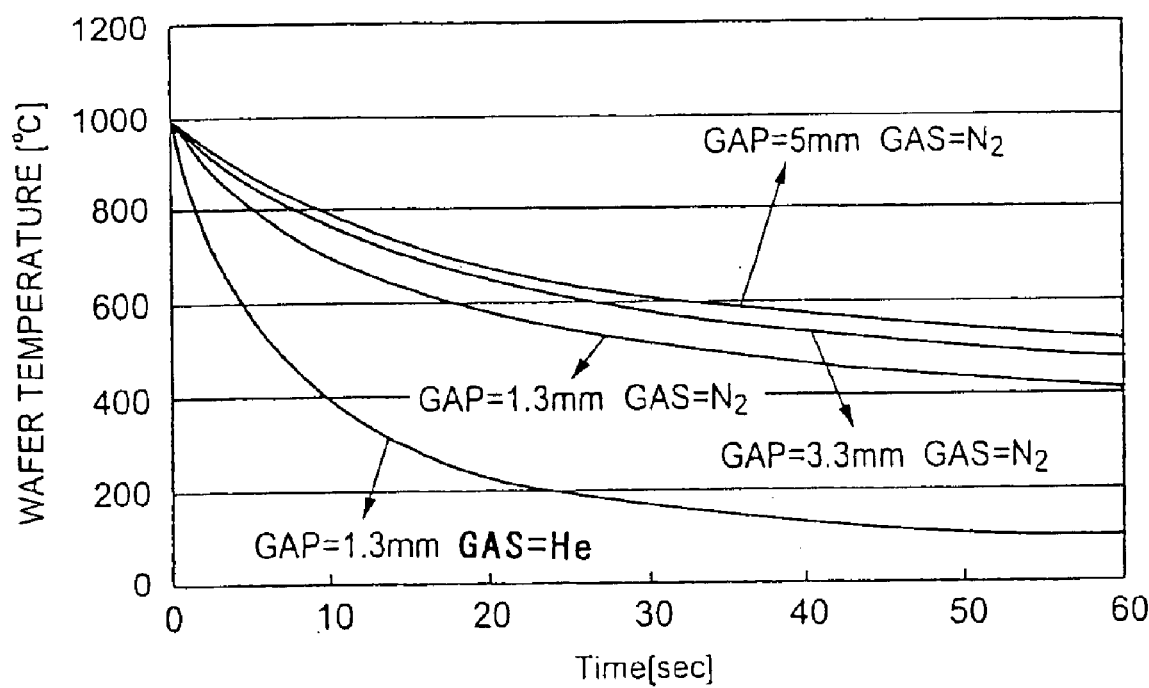
FIG. 44 is a graph showing a result of a simulation regarding a cooling speed of the object to be processed.

FIG. 44 is a graph showing a result of a simulation regarding a cooling speed of the object W to be processed. In FIG. 44, a "gap" means a space between the object W to be processed and the bottom part 114. It is understood from the graph shown in FIG. 44 that (1) as the gap is smaller, the cooling speed is heightened; and (2) the cooling speed is heightened by flowing helium gas having a high heat conductivity through a space between the object W to be processed and the bottom part 114.

The RTP apparatus 100 shown in FIG. 2 has a structure wherein the bottom part 114 as the cooling @plate is provided at the back surface of the object W to be processed by heating the upper surface of the object W to be processed with the lamps 130. Because of this, the cooling speed is relatively high in a structure shown in FIG. 2, but the amount of radiation of heat becomes large so that a relatively high electric power level is required for rapidly raising the temperature. In a case where the introduction of the cooling water of the cooling pipe 116 is stopped at the time of heating, the yield rate is decreased and that is not preferable.

Figure 45:
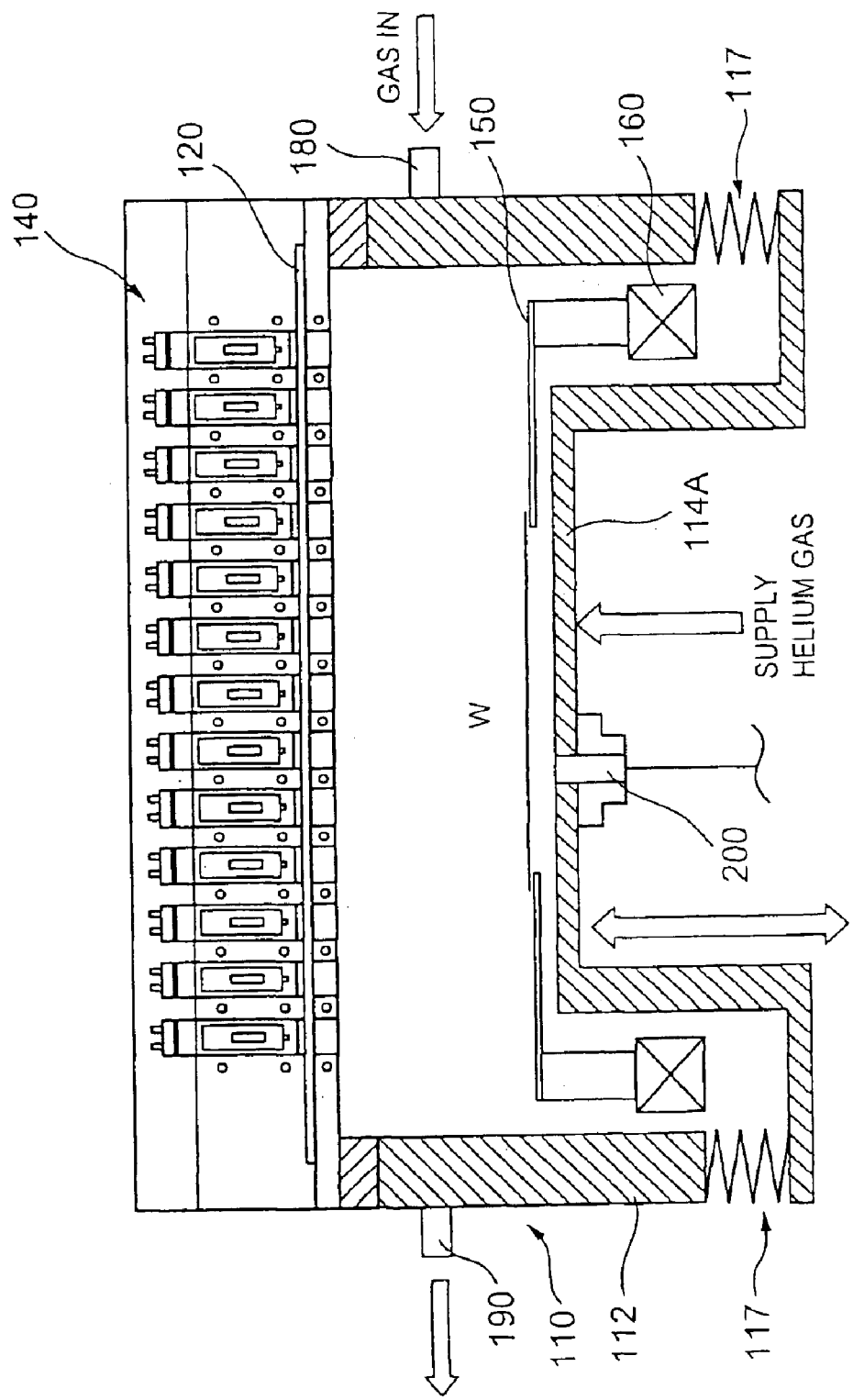
FIG. 45 is a schematic cross sectional view for explaining a variation of the bottom part as a cooling plate of the heat treatment apparatus shown in FIG. 2.
Figure 46:
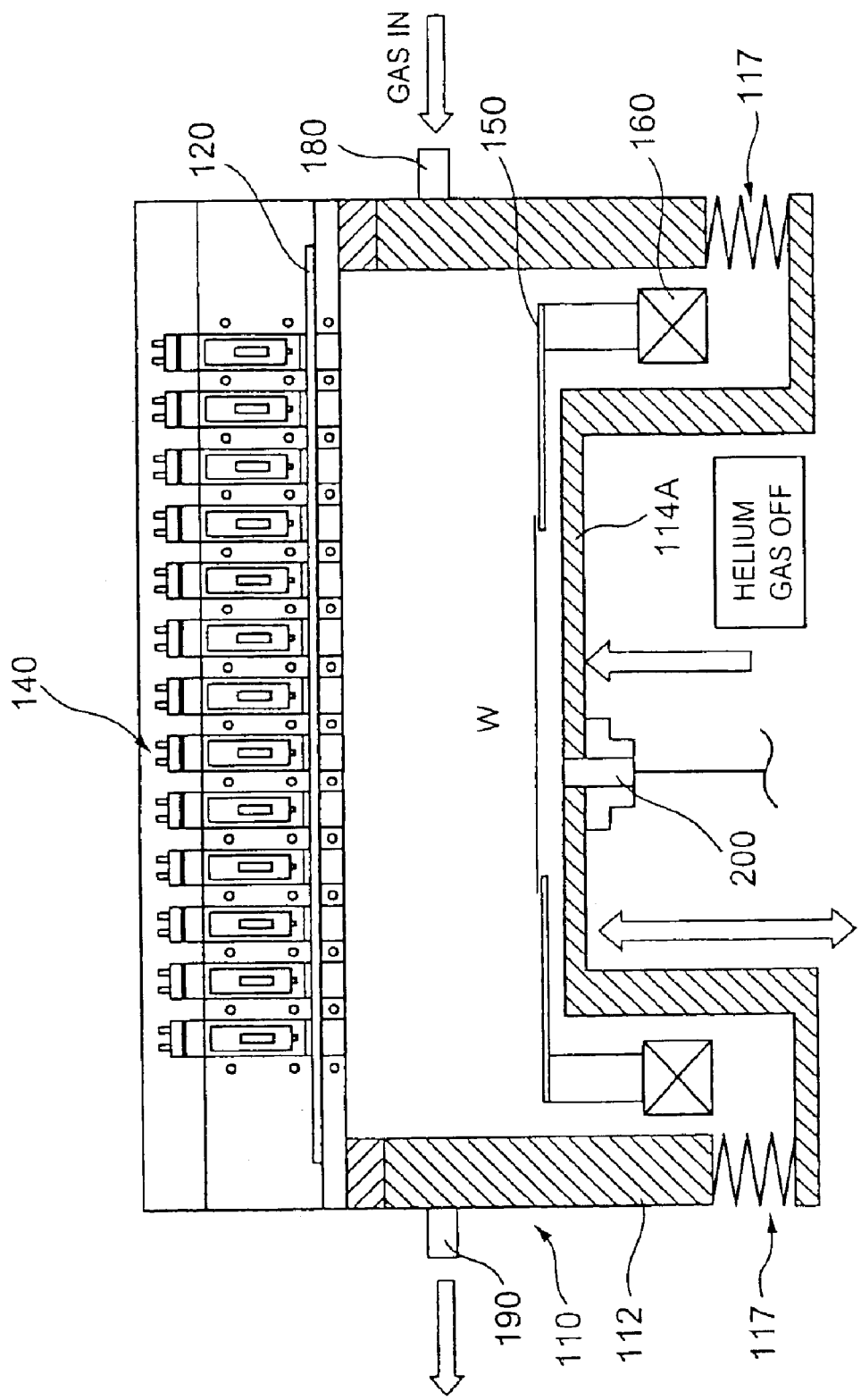
FIG. 46 is a schematic cross-sectional view for explaining a position relationship of the object to be processed and the bottom part at the time when the object W to be processed is heated under the structure of FIG. 45.
Figure 47:
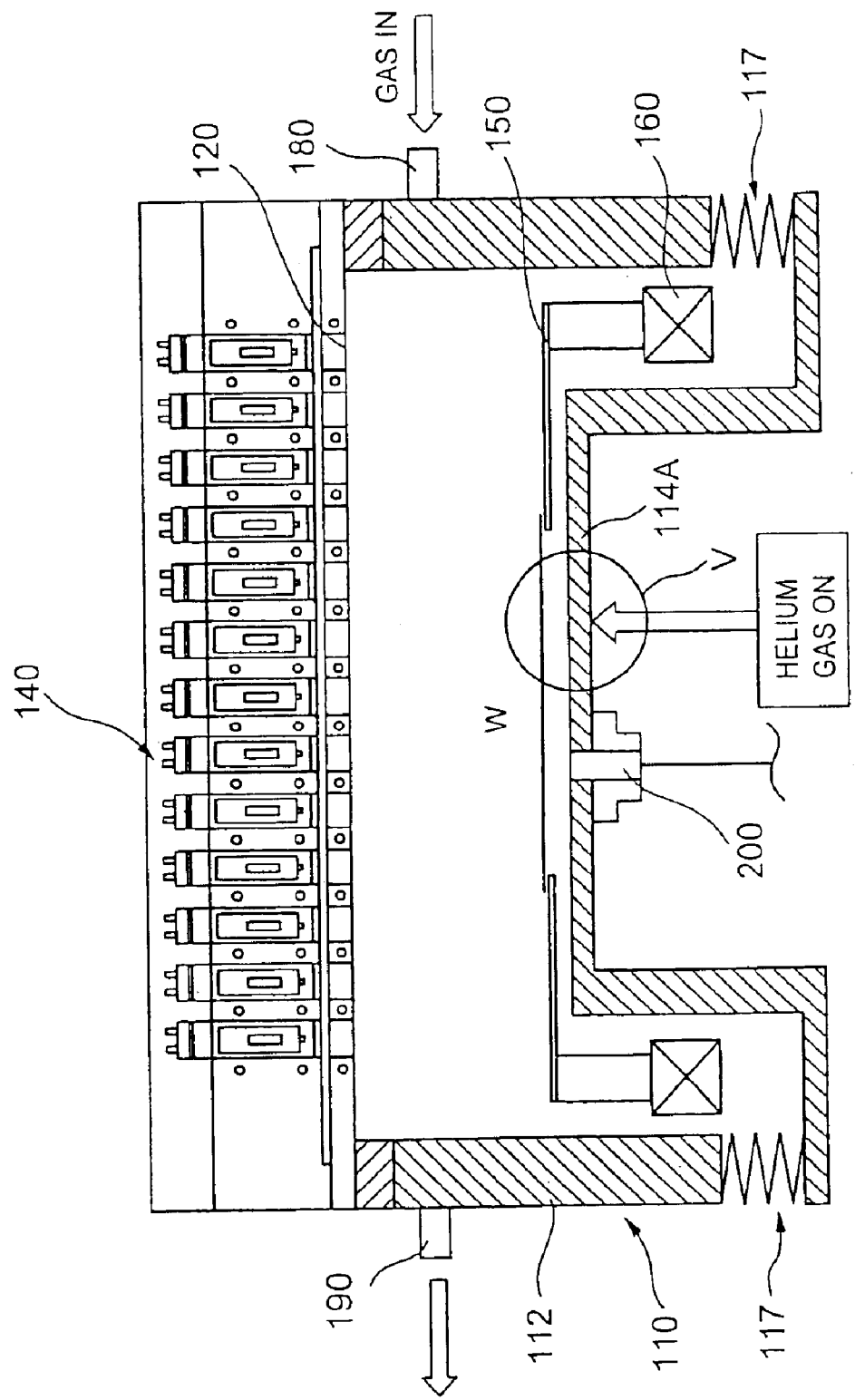
FIG. 47 is a schematic cross-sectional view for explaining a position relationship of the object to be processed and the bottom part at the time when the object to be processed is cooled under the structure of FIG. 45.

Therefore, as shown in FIGS. 45 through 47, the bottom part 114 as a cooling plate may be exchanged for the bottom part 114A movable against the object W to be processed. More preferably, in order to heighten the efficiency of radiation of heat, helium gas having a high heat conductivity is flowed through the space between the object W to be processed and the bottom part 114A at the time of cooling. FIG. 45 is a cross-sectional view for explaining the bottom part 114A movable against the object W to be processed. FIG. 46 is a cross-sectional view for explaining a position relationship of the object W to be processed and the bottom part 114A at the time when the object W to be processed is heated under the structure of FIG. 45. FIG. 47 is a cross-sectional view for explaining a position relationship of the object W to be processed and the bottom part 114A at the time when the object W to be processed is cooled under the structure of FIG. 45. In FIGS. 45 through 47, illustrations of the control part 300 connected to the radiation thermometer 200 and the cooling pipe 116 are omitted.

As shown in FIG. 45, the bottom part 114A can be raised and lowered against the object W to be processed by a mechanism 117 for raising and lowering which is operation-controlled with the control part 300 and has a bellows for maintaining a negative pressure environment inside of the process chamber 110. Any structure that is well known to one skilled in the art can be applied to the mechanism 117 for raising and lowering, and thereby detailed explanation thereof will be omitted. In a case where the object W to be processed is heated, as shown in FIG. 46, the bottom part 114A is lowered so as to separate the bottom part 114A from the object W to be processed and the supply of helium gas is stopped. In this case, a distance between the object W to be processed and the bottom part 114 is, for example, 10 mm. Since the space between the bottom part 114A and the object W to be processed is large, the object W to be processed is not influenced by the bottom part 114A so that high speed rising temperature can be implemented. A position of the bottom part 114A shown in FIG. 46 is set as a home position, for example.

Figure 48:
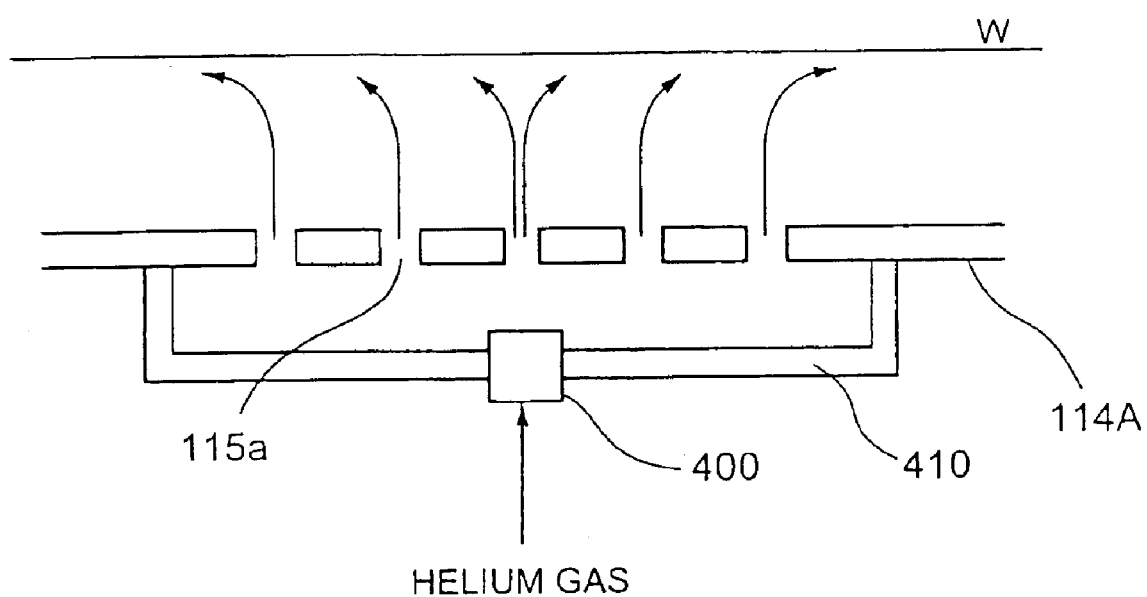
FIG. 48 is a schematic enlarged cross sectional view of an area V mentioned by a solid line of FIG. 47.

In a case where the object W to be processed is cooled, as shown in FIG. 47, the bottom part 114A is raised so as to approach the bottom part 114A to the object W to be processed and the supply of helium gas starts. Since the space between the bottom part 114A and the object W to be processed is narrow, the object W to be processed is influenced by the bottom part 114A and can be cooled at high speed. At this time, the distance between the object W to be processed and the bottom part 114 is, for example, 1 mm. An example of introduction of helium gas of FIG. 47 is shown in FIG. 48. Here, FIG. 48 is an enlarged cross sectional view of an area V indicated by a solid circle in FIG. 47. As shown in FIG. 48, a lot of small holes 115a are provided at the bottom part 114 so as to introduce helium gas. A case 410 having a valve 400 connected to a helium gas supply pipe is connected to the bottom part 114.

In this example, a relative movement of the cooling plate 114A and the object W to be processed is explained. But the present invention can be applied to a relative movement of the object W to be processed and the lamp 130.

A description will now be given, with reference to FIG. 2, of a rotating mechanism of the object W to be processed. In order to maintain a good electric characteristic of each element in an integrated circuit and a high yield rate of products, a uniform heat treatment is required over the entirety of the surface of the object W to be processed. If a temperature distribution on the surface of the object W to be processed is uneven, the RTP apparatus 100 cannot provide a high-quality heat treatment since a thickness of a film produced by a film deposition process may vary and a crack may be generated in the object W to be processed due to a thermal stress. The uneven temperature distribution on the surface of the object W to be processed may be caused by an uneven irradiance distribution or may be caused by a process gas, which is supplied near the gas introducing part 180, absorbing heat from the surface of the object W to be processed. The rotating mechanism rotates the object W to be processed, which enables a uniform heating by the lamps 130 over the entire surface of the wafer W.

The rotating mechanism of the wafer W includes the support ring 150, a permanent magnet 170 having a ring configuration, a magnetic body 172 such as SUS having a ring configuration, a motor driver 320 and a motor 330.

The support ring 150 has a circular ring-like shape and is formed of ceramics such as SiC having an excellent heat resistance. The support ring 150 serves as a placement stage of the object W to be processed, and has an L-shaped cross section. The inner hollow part of the support ring 150 has a diameter smaller than the diameter of the object W to be processed, and, thus, the support ring 150 can support a periphery of a back surface of the object W to be processed. If necessary, the support ring 150 may be provided with an electrostatic chuck or a clamp mechanism for fixing the object W to be processed. The support ring 150 prevents reduction of equal heating based on radiation heat from an end part of the object W to be processed.

The support ring is connected to the support part 152 at an end thereof. If necessary, a heat insulating member such as quartz glass is provided between the support ring 150 and the support part 152 so as to thermally protect a magnetic body 172 and other members. The support part 152 according to the present embodiment is formed of an opaque quartz ring member having a hollow cylindrical shape. The bearing 160 is fixed to a support member 152 and an inside wall 112 of the process chamber 110 so that the support part 152 can be rotated as maintaining a negative pressure environment in the process chamber 110. The magnetic body 172 is provided at a head end of the support part 152. A permanent magnet 170 and a magnetic body 172, which have a ring configuration and are provided so as to form a concentric circle, are magnetically connected. The permanent magnet 170 is rotate-driven by a motor 330. The motor 330 is driven by a motor driver 320. The motor driver 320 is controlled by a control part 300.

As a result of this, as the permanent magnet 170 is rotated, the magnetic body 172 magnetically connected to the permanent magnet 170 is rotated with the support part 152 so as to rotate the support ring 150 and the object W to be processed. In this example, although the rotational speed is set as 90 rpm as an example, the rotational speed may be actually determined based on a material or a volume of the object W to be processed and a kind of process gas or temperature, so as to provided a uniform temperature distribution to the object W to be processed and not provide a turbulent flow of gas inside of the process chamber 110 and a flow cut effect to a vicinity of the object W to be processed. As long as the magnet 170 and the magnetic body 172 are magnetically connected, their position may be reversed and both of them may be magnets.

Next, a description will now be given of an operation of the RTP apparatus 100. First, the object W to be processed is carried into the process chamber 110 through a gate valve (not shown in the figure) by a conveyance arm of a cluster tool (not shown in the figure). When the conveyance arm supporting the object W to be processed reaches above the support ring 150, a lifter pin vertically moving system moves lifter pins (for example, three lifter pins) upward so as to project the lifter pins from the support ring 150 to support the object W to be processed. As a result, the object to be processed is transferred from the conveyance arm to the lifter pins, and, then, the conveyance arm returns out of the process chamber 110 through the gate valve. Thereafter, the gate valve is closed. The conveyance arm may return to a home position not shown in the figure.

The lifter vertically moving mechanism retract the lifter pins below the surface of the support ring 150, thereby placing the object W to be processed on the support ring 150. The lifter pin vertically moving mechanism may use a bellows 117 so as to maintain the a negative pressure environment in the process chamber and prevent the atmosphere inside the process chamber from flowing out of the process chamber 110 during the vertically moving operation.

And then, the control part 300 controls the lamp driver 310 and orders the lamp driver 310 to drive the lamp 130. Corresponding to this, the lamp driver 310 drives the lamp 300 so that the lamps 130 heat the object W to be processed to approximately 800 degrees centigrade. In the heat treatment apparatus 100 of this example, the directivity of the lamp 130 is improved by the lens assembly 122 and the plating part 149, and a lamp density and a power density are improved by removing a reflector. Hence, it is possible to obtain a desirable high speed rising temperature. Heat radiated by the lamps 130 is irradiated onto an upper surface of the object W to be processed situated in a process space via the quartz window 120, so that a temperature of the object W to be processed is raised at a high speed, such as raised to 800 degress centigrade at a speed of 200° C./s. Generally, although there is a tendency for the amount of radiation of heat at a vicinity of the object W to be processed to be larger than at the center side of the object W to be processed, high directivity and temperature controllability can be provided in this example because the lamp 130 is provided so as to form a concentric circle and electric power control for respective areas can be implemented. In a case where the apparatus 100 has a structure shown in FIG. 33, the bottom part 114A, at this time, is arranged at a home position as shown in FIG. 46. Particularly, in the structure shown in FIG. 46, there is a space between the object W to be processed and the bottom part 114A that is a cooling plate and therefore it is difficult for the object W to be processed to be influenced by the bottom part 114A, so it is possible to raise the temperature at high speed efficiently. At the same time, before or after the heating, the exhaust part 190 maintains the pressure of the process chamber 110 to be a negative pressure environment.

Simultaneously, the control part 300 controls a motor driver 320 and orders the motor driver 320 to drive the motor 330. Corresponding to this, the motor 330 is driven by the motor driver 320 and the motor 330 rotates a ring shape magnet 170. As a result of this, the support part 152 (or 152A) rotates and the object W to be processed is rotated with the support ring 150. Since the object W to be processed is rotated, temperature of the surface inside thereof is maintained uniformly during the heat treatment.

The quartz window 120 has a relatively small thickness due to the action of the lens assemblies 122, the reinforcing members 124 and the wave guiding members 126, which provides the following advantages with respect to the heating process. 1) The irradiation efficiency to the wafer W is not degraded since the quartz window 120 having the reduced thickness absorbs less heat. 2) A thermal stress fracture hardly occurs since the temperature difference between the front and back surfaces of the quartz plate 121 of the quartz window 120 is small. 3) In a case of a film deposition process, a deposition film and byproduct are hardly formed on the surface of the quartz window 120 since a temperature rise in the surface of the quartz window 120 is small. 4) A pressure difference between the negative pressure in the process chamber 110 and the atmospheric pressure can be maintained even if the thickness of the quartz plate 121 is small since the mechanical strength of the quartz plate 121 is increased by the lens assemblies 122.

The temperature of the object W to be processed is measured by the radiation thermometer 200. Based on the result of the measurement, the control part 300 feed-back controls the lamp driver 310. Since the object W to be processed is rotated, temperature distribution of the surface thereof is expected to be uniform, However, if necessary, temperatures at a plurality of points (for example, the center and an end part) of the object W to be processed can be measured by the radiation thermometers 200. In a case where the radiation thermometer 200 determines that the temperature distribution on the object W to be processed is not uniform, the control part 300 can order the lamp driver 310 to change an output of the lamp 130 situated a specific area on the object W to be processed. At this time, since the controllability is improved by the plating part 149 and the lens assembly 122, a desirable portion of the object W to be processed can be heated under good controllability as the need arises.

The radiation thermometer 200 has a simple structure in which a chopper and an LED are not used, and the radiation thermometer is inexpensive, which contributes to miniaturization and an low cost of the heat treatment apparatus 100. Additionally, the temperature measured by the method of calculating effective reflectivity is accurate. The electric characteristic of an integrated circuit formed in the wafer W is degraded due to diffusion of impurities when the object W to be processed is placed under a high temperature environment for a long time. Accordingly, rapid heating and rapid cooling are required, which also require temperature control of the object W to be processed. The method for calculating effective reflectivity according to the preset invention satisfies such requirements. Thus, the RTP apparatus 100 can provide a high-quality heat treatment.

Thereafter, a flow-controlled process gas is introduced into the process chamber 110 from a gas introducing part (not shown in the figure). After a predetermined heat treatment is completed (for example, for 10 seconds), the control part 300 controls the lamp driver 310 to supply a command to stop heating by the lamps 130. In response to the command, the lamp driver 310 stops operation of the lamps 130. In a case where the apparatus 100 uses a structure shown in FIG. 33, the control part 300 controls the mechanism 117 for raising and lowering so that the bottom part 114A is moved to a cooling position shown in FIG. 35. Furthermore, preferably, helium gas that has high heat conduction is introduced, as shown in FIG. 36, between the object to be processed and the bottom part 114A. Because of this, it is possible to heighten a cooling efficiency for the object W to be processed so that a high speed cooling can be implemented with a relatively low consumption of electric power. The cooling rate is, for example, 200 C/sec.

After the heat treatment, the object W to be processed is carried out of the process chamber 110 by the conveyance arm of the cluster tool through the gate valve in the reverse sequence. Thereafter, if necessary, the conveyance arm conveys the object W to be processed to a next stage apparatus such as a film deposition apparatus.

According to the embodiment of a heat treatment apparatus and method, a method of temperature measurement, a temperature measurement program, and a radiation thermometer, the temperature of the object to be processed can be measured with high precision by two radiation thermometers that are relatively cheap and have simple structures, and thereby it is possible to achieve a heating process with high quality.

The present invention is not limited to the above mentioned embodiments, but various variations and modifications may be made without departing from the scope of the present invention.

What is claimed is:

1. A method of temperature measurement for measuring a temperature of an object to be measured that is heated by a heating source in a multiplex-reflection environment, comprising:

providing at least two radiation thermometers at a measurement part separated from the object to be measured;

measuring a radiation rate of the object to be measured using said radiation thermometers; and calculating a temperature based on the radiation rate, wherein each of the radiation thermometers includes a rod that is embedded in the measurement part and can receive radiation from the object to be measured, each rod having the same diameter, and an optical fiber connected to each rod, the numerical apertures of the radiation thermometers being different;

wherein the multiplex-reflection environment is formed between a surface of the measurement part facing the object to be measured and the object to be measured; and wherein calculating a temperature based on the radiation rate comprises determining a radiation rate $\epsilon$ of the object to be measured and the temperature of the object to be measured by a calculation that includes the following equations $$\alpha = 1-(1-NA*N1)^{N2(D1/D2)}$$

$$\epsilon_{\mathit{eff}} = (1-\alpha)*\epsilon+\alpha*\epsilon/\{1-F*r*(1-\epsilon)\}$$

wherein D1 represents the diameter of the rods of the radiation thermometers, NA represents the numerical aperture for each of the radiation thermometers, D2 represents a distance between the object to be measured and the surface of the measurement part, r represents a reflectivity of the surface of the measurement part, F represents a view factor, $\alpha$ represents a multiplex reflection coefficient, $\epsilon_{\mathit{eff}}$ represents an effective radiation rate of the object to be measured at each value of NA, and N1 and N2 are parameters.

2. A method of temperature measurement for measuring a temperature of an object to be measured that is heated by a heating source in a multiplex-reflection environment, comprising:

providing at least two radiation thermometers at a measurement part separated from the object to be measured;

measuring a radiation rate of the object to be measured using said radiation thermometers; and calculating a temperature based on the radiation rate, wherein each of the radiation thermometers includes a rod that is embedded in the measurement part and can receive radiation from the object to be measured, the rod in each radiation thermometer having the same diameter, and an optical fiber connected to the rod;

wherein the multiplex-reflection environment is formed between a surface of the measurement part facing the object to be measured and the object to be measured;

wherein the at least two radiation thermometers have the same numerical aperture and have a different ratio of the diameter of the rods and the distance between the object to be measured and the surface of the measurement part where each rod is located; and wherein calculating a temperature based on the radiation rate comprises determining a radiation rate $\epsilon$ of the object to be measured and the temperature of the object to be measured by a calculation that includes the following equations $$\alpha = 1-(1-NA*N1)^{N2(D1/D2)}$$

$$\epsilon_{\mathit{eff}} = (1-\alpha)*\epsilon+\alpha*\epsilon/\{1-F*r*(1-\epsilon)\}$$

wherein D1 represents a diameter of the rod of the radiation thermometers, NA represents the numerical apertures, D2 represents a distance between the object to be measured and the surface of the measurement part where each rod is located, r represents a reflectivity of the surface of the measurement part, F represents a view factor, $\alpha$ represents a multiplex reflection coefficient, $\epsilon_{\mathit{eff}}$ represents an effective radiation rate of the object to be measured, and N1 and N2 are parameters.

3. A heat treatment method, comprising:

a step for heating an object to be treated by using a heating source;

a step for measuring the temperature of the object to be treated using at least two radiation thermometers;

a step for controlling heating power of the heating source based on the temperature of the object to be treated that is measured by the radiation thermometers;

wherein each radiation thermometer includes a rod that is embedded in a measurement part and can receive radiation from the object to be treated, each rod having the same diameter, an optical fiber connected to the rod, and a detector for detecting the radiation passing through the optical fiber;

wherein the at least two radiation thermometers each have the same numerical aperture and different ratios of the diameter of the rods and a distance between the object to be treated and a surface of the measurement part where each rod is located; and wherein in the step for measuring, a radiation rate c and the temperature of the object to be treated are calculated based on a result of a measurement of the radiation thermometers a calculation that includes the following equations $$\alpha=1-(1-NA*N1)^{N2(D1/D2)}$$

$$\epsilon_{\mathit{eff}}=(1-\alpha)*\epsilon+\alpha*\epsilon/\{1-F*r*(1-\epsilon)\}$$

wherein D1 represents the diameter of the rod of each radiation thermometer, NA represents the numerical apertures, D2 represents a distance between the object to be treated and the surface of the measurement part where each rod is located, r represents a reflectivity of the surface of the measurement part, F represents a view factor, $\alpha$ represents a multiplex reflection coefficient, $\epsilon_{\mathit{eff}}$ represents an effective radiation rate of the object to be treated, and N1 and N2 are parameters.

4. A heat treatment apparatus, comprising:

a process chamber where a designated heat treatment is implemented for an object to be treated;

a heating source for heating the object to be treated;

at least two radiation thermometers connected to a measurement part of the process chamber, by which a temperature of the object to be treated is measured; and a control part for controlling heating power of the heating source based on the temperature of the object to be treated as measured by the radiation thermometers;

wherein each radiation thermometer includes a rod that is embedded in the measurement part and can receive radiation from the object to be treated, each rod having the same diameter, an optical fiber connected to the rod, and a detector for detecting the radiation light passing through the optical fiber;

wherein the at least two radiation thermometers each have the same numerical aperture and different ratios of the diameter of the rods and the distance between the object to be treated and the surface of the measurement part where each rod is located; and wherein the control part calculates a radiation rate $\epsilon$ and the temperature of the object to be treated based on a result of a measurement taken by the radiation thermometers and a calculation that includes the following equations $$\alpha=1-(1-NA*N1)^{N2(D1/D2)}$$

$$\epsilon_{\mathit{eff}}=(1-\alpha)*\epsilon+\alpha*\epsilon/\{1-F*r*(1-\epsilon)\}$$

wherein D1 represents the diameter of the rod of each radiation thermometer, NA represents the numerical aperture, D2 represents a distance between the object to be measured and the surface of the measurement part where each rod is located, r represents a reflectivity of the surface of the measurement part, F represents a view factor, $\alpha$ represents a multiplex reflection coefficient, $\epsilon_{\mathit{eff}}$ represents an effective radiation rate of the object to be treated, and N1 and N2 are parameters.

5. A program for implementing a temperature measurement for measuring a temperature T of an object to be measured that is heated by a heating source in a multiplex reflection environment by using at least two radiation thermometers, wherein the radiation thermometers each include a rod that is embedded in a measurement part and can receive radiation from the object to be measured, each rod having the same diameter, an optical fiber connected to each rod, and a detector for detecting the radiation light passing through the optical fibers;

wherein the at least two radiation thermometers each have the same numerical aperture and different ratios of a diameter of the rods versus a distance between the object to be measured and a surface of the measurement part where each rod is located;

wherein the program implements a method comprising:

calculating a radiation rare $\epsilon$ of the object to be measured based on a result of a measurement of the radiation thermometers and the following equations $$\alpha=1-(1-NA*N1)^{N2(D1/D2)}$$

$$\epsilon_{\mathit{eff}}=(1-\alpha)*\epsilon+\alpha*\epsilon/\{1-F*r*(1-\epsilon)\}$$

wherein D1 represents the diameter of the rod of each radiation thermometer, NA represents the numerical apertures, D2 represents a distance between the object to be measured and the surface of the measurement part where each rod is located, r represents a reflectivity of the surface of the measurement part, F represents a view factor, $\alpha$ represents a multiplex reflection coefficient, $\epsilon_{\mathit{eff}}$ represents an effective radiation rate of the object to be measured, and N1 and N2 are parameters; and calculating the temperature of the object to be measured based on the calculated radiation rate.

6. A method of temperature measurement for measuring a temperature of an object to be measured that is heated by a heating source in a multiplex-reflection environment, comprising:

providing a radiation thermometer at a measurement part separated from the object to be measured;

measuring a radiation rate of the object to be measured using said radiation thermometer; and calculating a temperature based on the radiation rate, wherein the radiation thermometer includes a rod that is embedded in the measurement part and can receive radiation from the object to be measured, a first optical fiber connected to the rod, a second optical fiber having a different numerical aperture from the first optical fiber and connected to the rod, a first detector detecting the radiation passing through the first optical fiber, and a second detector detecting the radiation passing through the second optical fiber;

wherein the multiplex-reflection environment is formed between a surface facing the object to be measured of the measurement part and the object to be measured; and wherein calculating a temperature based on the radiation rate comprises determining a radiation rate $\epsilon$ of the object to be measured and the temperature of the object to be measured by a calculation that includes the following equations $$\alpha=1-(1-NA*N1)^{N2(D1/D2)}$$

$$\epsilon_{\mathit{eff}}=(1-\alpha)*\epsilon+\alpha*\epsilon/\{1-F*r*(1-\epsilon)\}$$

wherein D1 represents a diameter of the rod of the radiation thermometer, NA represents the numerical aperture for each of the optical fibers, D2 represents a distance between the object to be measured and the surface of the measurement part, r represents a reflectivity of the surface of the measurement part, F represents a view factor, α represents a multiplex reflection coefficient, $\epsilon_{\mathit{eff}}$ represents an effective radiation rate of the object to be measured at each value of NA, and N1 and N2 are parameters.

7. A heat treatment method, comprising:

a step for heating an object to be treated by using a heating source;

a step for measuring a temperature of the object to be treated by using a radiation thermometer;

a step for controlling heating power of the heating source based on the temperature of the object to be treated as measured by the radiation thermometer;

wherein the radiation thermometer includes a rod that is embedded in a measurement part and can receive radiation from the object to be treated, a first optical fiber connected to the rod, a second optical fiber having a different numerical aperture from the first optical fiber and connected to the rod, a first detector for detecting the radiation passing through the first optical fiber, a second detector for detecting the radiation passing through the second optical fiber; and wherein in the step for measuring, a radiation rate ε and the temperature of the object to be treated are calculated based on a result of a measurement of the first and second detectors and a calculation that includes the following equations $$\alpha = 1 - (1 - NA*N1)^{N2(D1/D2)}$$

$$\epsilon_{\mathit{eff}} = (1-\alpha)*\epsilon + \alpha*\epsilon/\{1 - F*r*(1-\epsilon)\}$$

wherein D1 represents a diameter of the rod of the radiation thermometer, NA represents the numerical aperture for each of the optical fibers, D2 represents a distance between the object to be treated and the surface of the measurement part, r represents a reflectivity of a surface of the measurement part, F represents a view factor, α represents a multiplex reflection coefficient, $\epsilon_{\mathit{eff}}$ represents an effective radiation rate of the object to be treated at each value of NA, and N1 and N2 are parameters.

8. A heat treatment apparatus, comprising:

a process chamber where a designated heat treatment is implemented for an object to be treated;

a heating source for heating the object to be treated;

a radiation thermometer connected to a measurement part of the process chamber, by which a temperature of the object to be treated is measured; and a control part for controlling heating power of the heating source based on the temperature of the object to be treated as measured by the radiation thermometer;

wherein the radiation thermometer includes a rod that is embedded in the measurement part and can receive radiation from the object to be treated, a first optical fiber connected to the rod, a second optical fiber having a different numerical aperture from the first optical fiber and connected to the rod, a first detector for detecting the radiation passing through the first optical fiber, a second detector for detecting the radiation passing through the second optical fiber; and wherein the control part calculates a radiation rate e and the temperature of the object to be treated based on a result of a measurement taken by the first and second detectors and a calculation that includes the following equations $$\alpha = 1 - (1 - NA*N1)^{N2(D1/D2)}$$

$$\epsilon_{\mathit{eff}} = (1-\alpha)*\epsilon + \alpha*\epsilon/\{1 - F*r*(1-\epsilon)\}$$

wherein D1 represents a diameter of the rod of the radiation thermometer, NA represents the numerical aperture for each of the optical fibers, D2 represents a distance between the object to be treated and a surface of the measurement part, r represents a reflectivity of the surface of the measurement part, F represents a view factor, α represents a multiplex reflection coefficient, $\epsilon_{\mathit{eff}}$ represents an effective radiation rate of the object to be treated at each value of NA, and N1 and N2 are parameters.

9. A program for implementing a temperature measurement for measuring a temperature T of an object to be measured that is heated by a heating source in a multiplex reflection environment by a radiation thermometer, wherein the radiation thermometer includes a rod that is embedded in a measurement part and can receive radiation from the object to be measured, a first optical fiber connected to the rod, a second optical fiber having a different numerical aperture from the first optical fiber and connected to the rod, a first detector for detecting the radiation passing through the first optical fiber, and a second detector for detecting the radiation passing through the second optical fiber; and wherein the program implements a method comprising:

calculating a radiation rate ε of the object to be measured based on a result of a measurement of the first and second detectors and the following equations $$\alpha = 1 - (1 - NA*N1)^{N2(D1/D2)}$$

$$\epsilon_{\mathit{eff}} = (1-\alpha)*\epsilon + \alpha*\epsilon/\{1 - F*r*(1-\epsilon)\}$$

wherein D1 represents a diameter of the rod of the radiation thermometer, NA represents the numerical aperture for each of the optical fibers, D2 represents a distance between the object to be measured and a surface of the measurement part, r represents a reflectivity of the surface of the measurement part, F represents a view factor, α represents a multiplex reflection coefficient, $\epsilon_{\mathit{eff}}$ represents an effective radiation rate of the object to be measured at each value of NA, and N1 and N2 are parameters; and calculating the temperature of the object to be measured based on the calculated radiation rate.

* * * * *